(12) United States Patent
Shimada et al.

(10) Patent No.: US 6,625,938 B1
(45) Date of Patent: Sep. 30, 2003

(54) SYSTEM AND METHOD FOR CONVERTING A HEX-DOMINANT MESH TO AN ALL-HEXAHEDRAL MESH

(75) Inventors: Kenji Shimada, Pittsburgh, PA (US); Soji Yamakawa, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 56 days.

(21) Appl. No.: 09/877,966

(22) Filed: Jun. 8, 2001

(51) Int. Cl.$^7$ ................................................ G06T 17/20

(52) U.S. Cl. ............................ 52/81.1; 52/81.3; 52/81.5

(58) Field of Search ............................ 52/81.1, 81.3, 52/81.5, 82

(56) References Cited

U.S. PATENT DOCUMENTS

| | | | | | |
|---|---|---|---|---|---|
| 1,425,114 | A | * | 8/1922 | Luard | 405/257 |
| 2,908,236 | A | * | 10/1959 | Kiewitt | 52/81.2 |
| 3,646,718 | A | * | 3/1972 | McKenna | 52/79.4 |
| D224,522 | S | * | 8/1972 | Amie, Jr. | D25/3 |
| 4,059,932 | A | * | 11/1977 | Resch | 52/81.1 |
| 4,551,726 | A | * | 11/1985 | Berg | 342/7 |
| 5,560,151 | A | * | 10/1996 | Roberts | 52/81.1 |
| 5,768,156 | A | | 6/1998 | Tautges et al. | |
| 6,098,347 | A | * | 8/2000 | Jaeger et al. | 52/81.3 |
| 6,192,634 | B1 | * | 2/2001 | Lopez | 52/81.2 |

OTHER PUBLICATIONS

"Open Problem," printed from http://www–users.informa-tik.rwth–aachen.de/~roberts/open.html on Feb. 27, 2001.

Blacker et al., "Seams and Wedges in Plastering: A 3–D Hexahedral Mesh Generation Algorithm," Engineering with Computers, 1993, 2(a), pp. 83–93.

Owen, S., "Non–Simplical Unstructured Mesh Generation," Ph.D. Thesis, The Department of Civil and Environmental Engineering, Carnegie Mellon University, Apr. 1999.

Owen et al., "Pyramid Elements for Maintaining Tetrahedra to Hexahedra Conformability," AMD–vol. 220, Trend in Unstructued Mesh Generation ASME, 1997, pp. 123–129.

Shepherd et al., "Methods for Multisweep Automation," Proceedings of $9^{th}$ International Meshing Reoundtable, 2000.

(List continued on next page.)

Primary Examiner—Carl D. Friedman
Assistant Examiner—Basil Katcheves
(74) Attorney, Agent, or Firm—Kirkpatrick & Lockhart LLP

(57) ABSTRACT

A modular approach to designing all-hex mesh conversion templates where triangular and rectangular subdivision patterns may arbitrarily be combined on the exterior faces of the templates. The templates can be created for any arbitrary-shaped, complex geometric domain. The all-hex conversion software according to the present invention take as input any type of a hex-dominant mesh and converts it to an all-hex mesh automatically. An all-hex template according to the present invention is a family of modular sub-templates. These sub-templates can be assembled to form all-hex conversion templates for hexes, pyramids, and prisms. There are two types of modular sub-templates, called a core and a cap. For a hex or prism element, one core is defined, which specifies the subdivision patterns of two faces of the input hex or prism. Then four caps are defined for a hex and three caps for a prism to specify the subdivision patterns of the other faces. One can mix and combine two subdivision patterns, rectangular and triangular, freely on the exterior surfaces of a hex, prism, and a pyramid. The all-hex conversion process according to the present invention is suitable for parallel implementation. Using the modular approach of the present invention, a hex-dominant mesh can be converted into an all-hex mesh successfully without losing the mesh conformity.

12 Claims, 32 Drawing Sheets

OTHER PUBLICATIONS

Sederberg, et al., "Free-Form Deformation of Solid Geometric Models," Proceedings of SIGGRAPH, vol. 20, No. 4, 1986, pp. 151–160.

Li et al., "New Method for Graded Mesh Generation of All Hexahedral Finite Elements," Computers and Structures 76, 2000, pp. 729–740.

Carbonera, C., "Constrained Mesh Generation," printed from http://www-users.informatik.rwth-aachen.de/~roberts/SchPyr/index.html on Feb. 27, 2001.

Schneiders, R., "A Grid-Based Algorithm for the Generation of Hexahedral Element Meshes," Engineering With Computers, vol. 12, 1995, pp. 168–177.

Owen et al., "H–Morph: An Indirect Approach to Advancing Front Hex Meshing," International Journal for Numerical Methods in Engineering, 49, 2000, pp. 289–312.

Tautges, T., The Whisker Weaving Algorithm: A Connectivity-Based Method for Constructing All-Hexahedral Finite Element Meshes, International Journal for Numerical Methods in Engineering, 39, 1996, pp. 3327–3349.

Mitchell, S., "The All–Hex Geode–Template for Conforming a Diced Tetrahedral Mesh to Any Diced Hexahedral mesh," Proceedings of the 7$^{th}$ International Meshing Roundtable, 1998.

S. A. Mitchell, "The All–Hex Geode–Template for Conforming a Diced Tetrahedral Mesh to any Diced Hexahedral Mesh," *Engineering With Computers*, 1999, pp. 228–235, vol. 15, No. 3, Springer–Verlag London Limited.

Carlos D. Carbonera, "Constrained mesh generation.".

R. Schneiders, "A Grid–based Algorithm for the Generation of Hexahedral Element Meshes," *Engineering With Computers*, 1996, pp. 168–177, vol. 12, No. 3–4, Springer–Verlag London Limited.

Steven J. Owen, "Hex–dominant mesh generation using 3D constrained triangulation," *Computer–Aided Design* 33, 2001, pp. 211–220, vol. 33, No. 3, Parellel Computing Science Department, Sandia National Laboratories, Albuquerque, NM.

T. Blacker, "Automated Conformal Hexahedral Meshing Constraints, Challenges and Opportunites," *Engineering With Computers*, 2001, pp. 201–210, vol. 17, No. 3, Springer–Verlag London Limited.

* cited by examiner

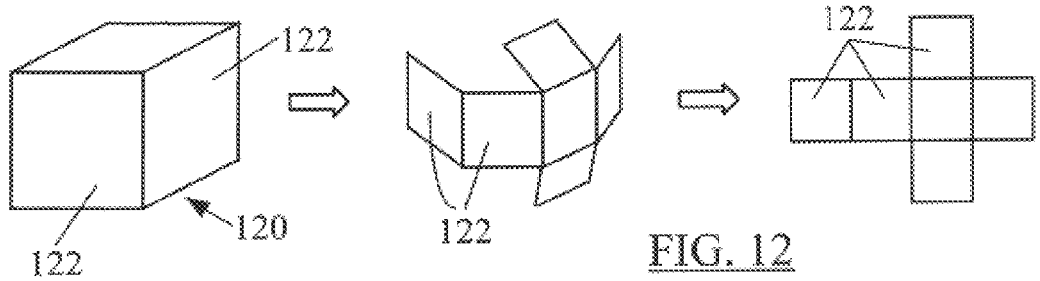
FIG. 12
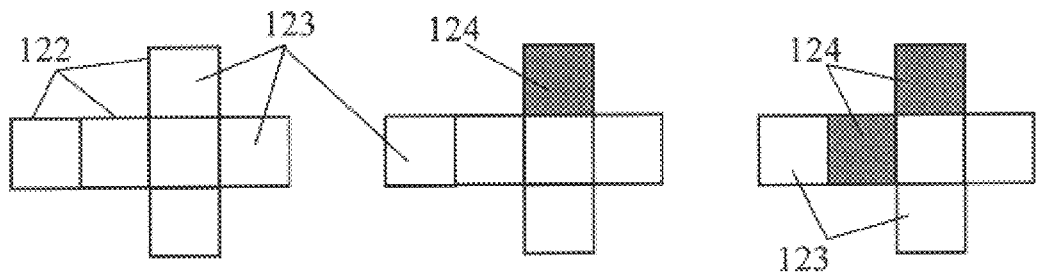
FIG. 13A　　　　FIG. 13B　　　　FIG. 13C
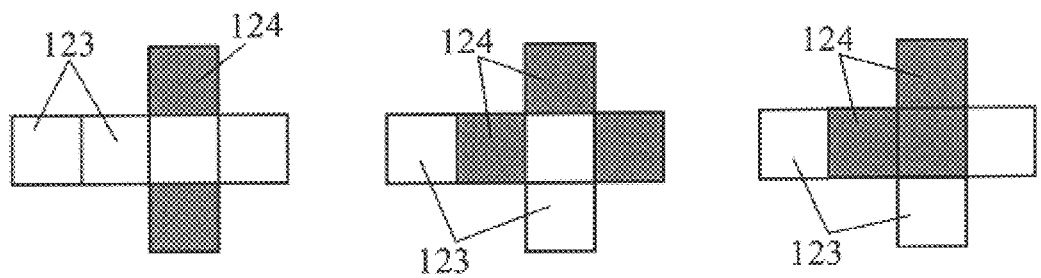
FIG. 13D　　　　FIG. 13E　　　　FIG. 13F
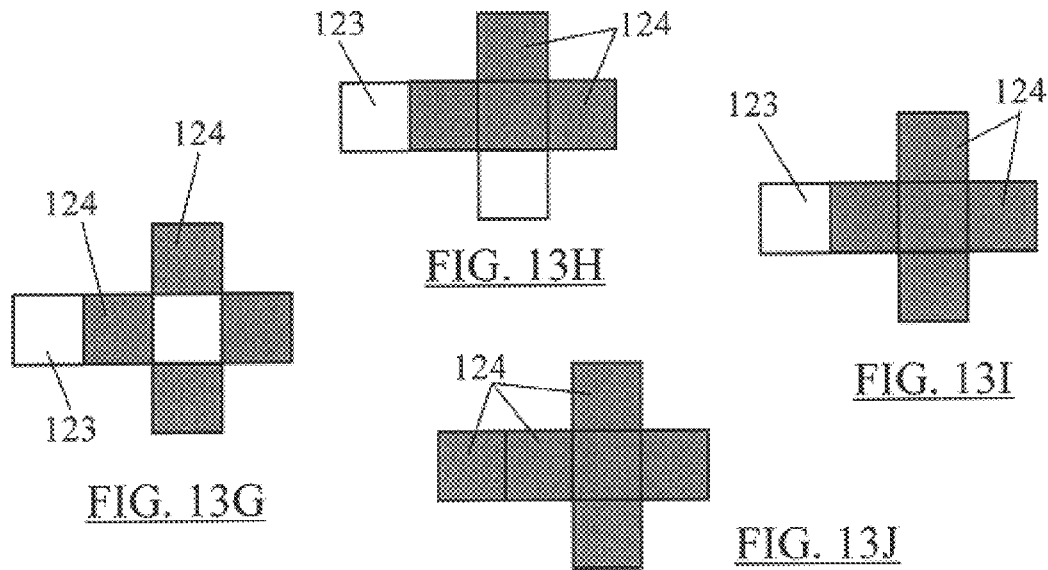
FIG. 13H
FIG. 13G　　　FIG. 13J　　　FIG. 13I 1x4 Rectangular Cap 2x4 Rectangular Cap 4x4 Rectangular Cap 2x4 Triangular Cap 4x4 Triangular Cap

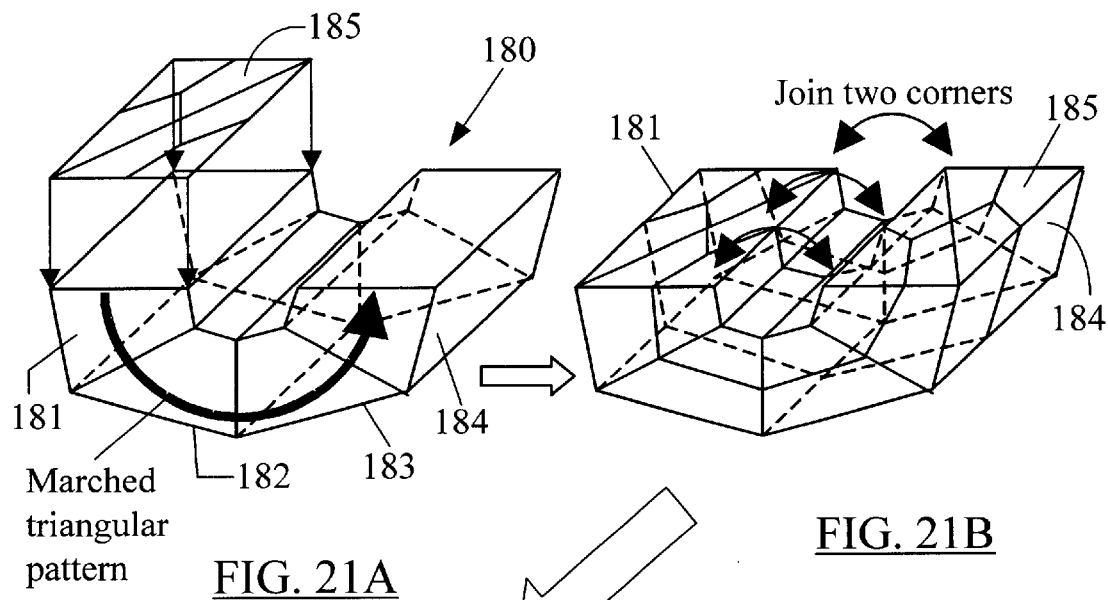
FIG. 21A
FIG. 21B
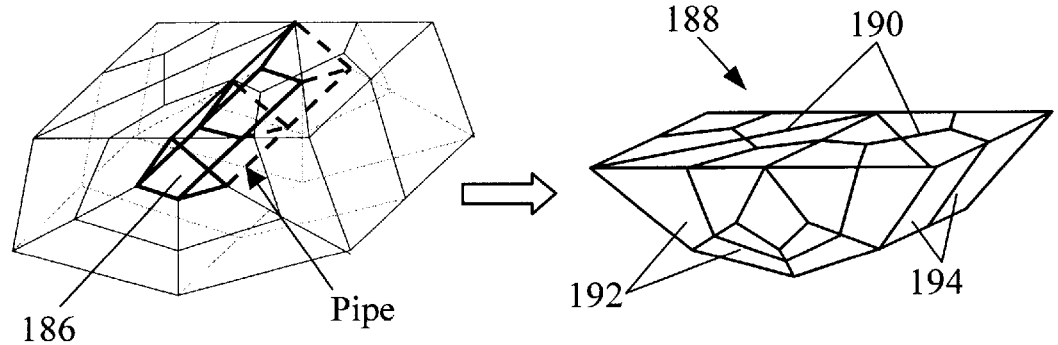
FIG. 21C
FIG. 21D
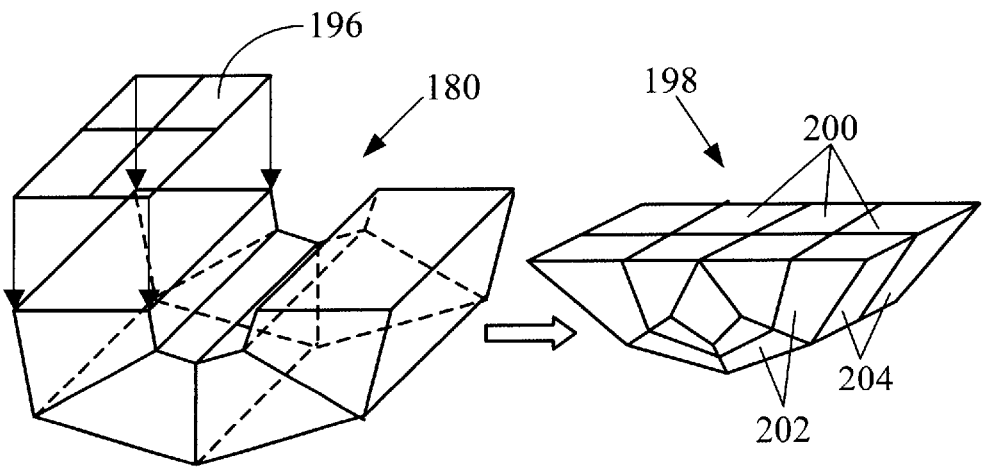
FIG. 22A
FIG. 22B

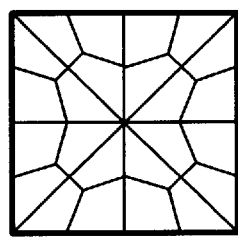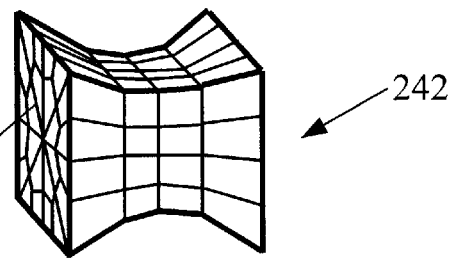
FIG. 27A   FIG. 27B
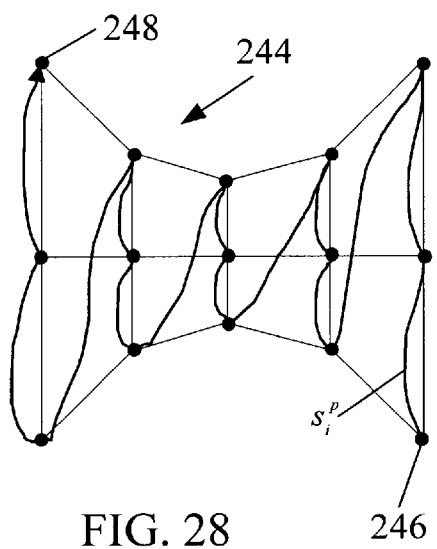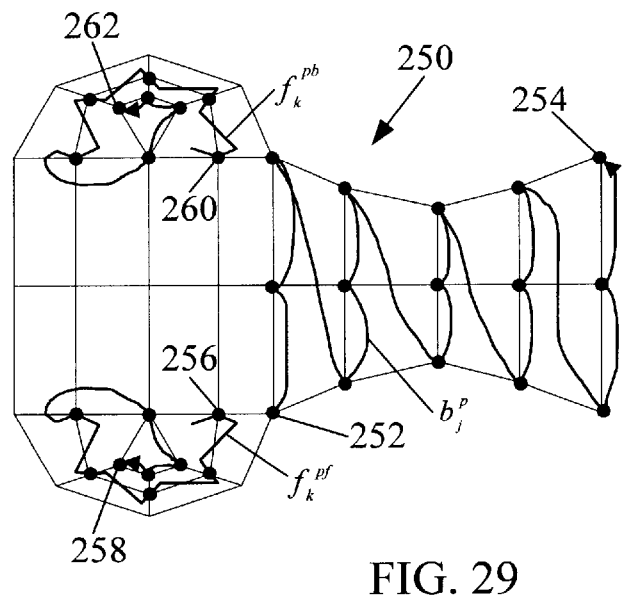
FIG. 28   FIG. 29
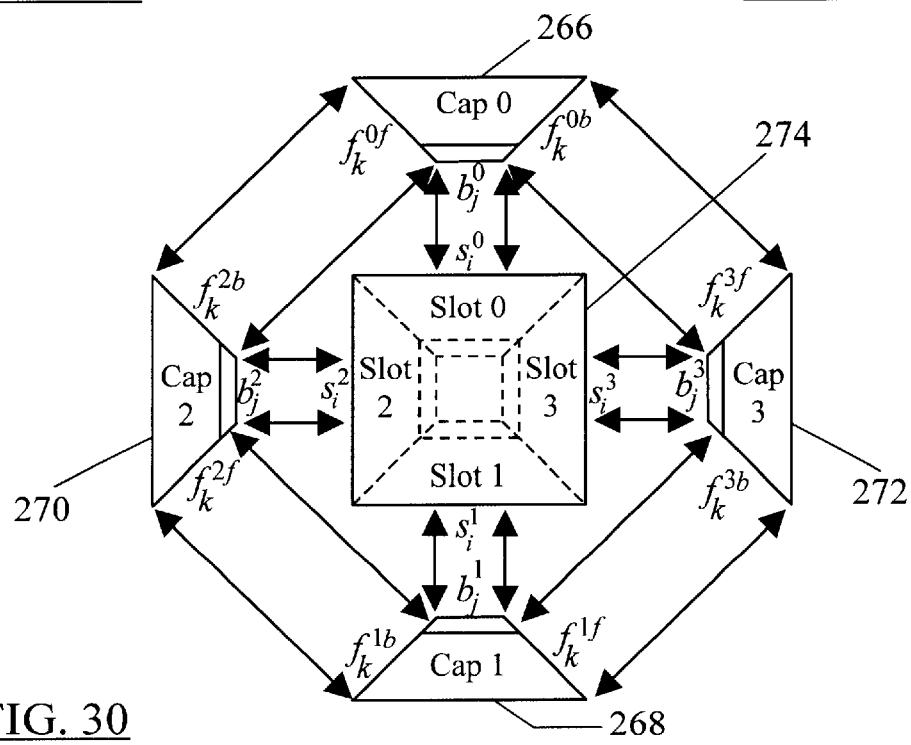
FIG. 30

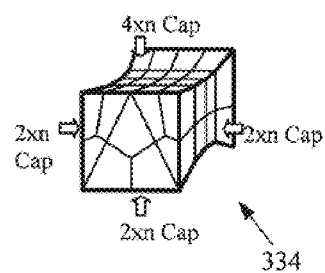
FIG. 37A
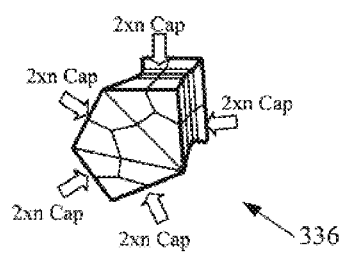
FIG. 37B
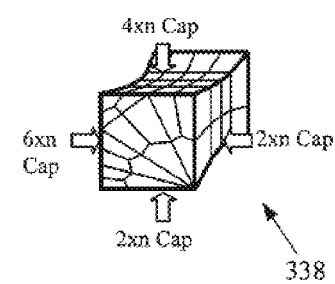
FIG. 37C
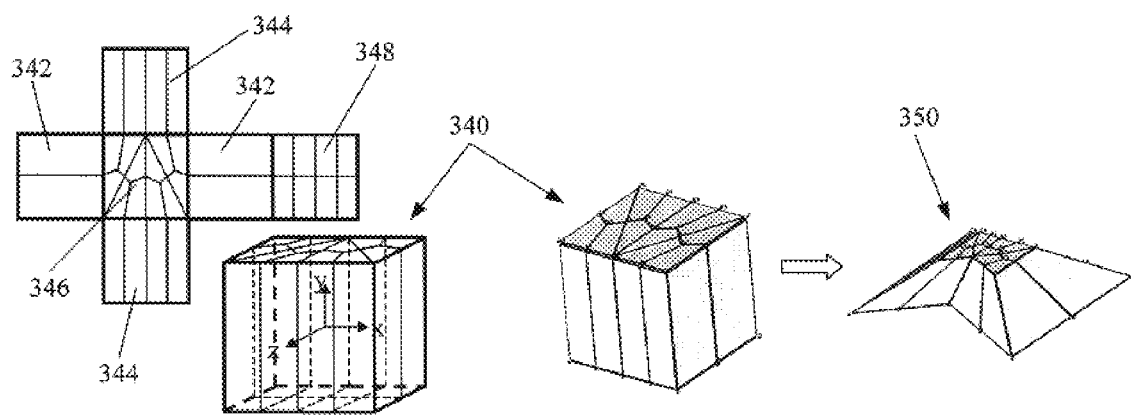
FIG. 38
FIG. 39

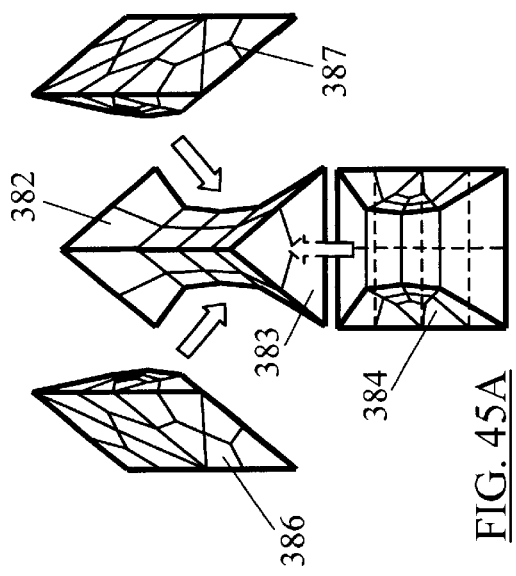
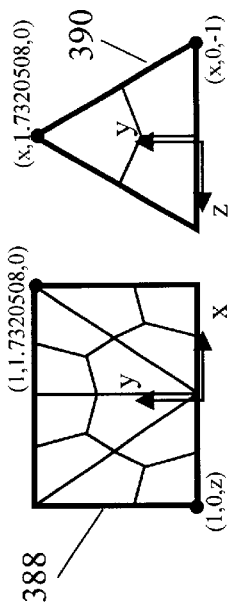
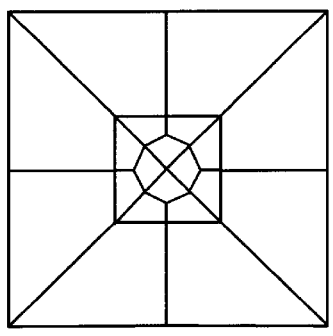
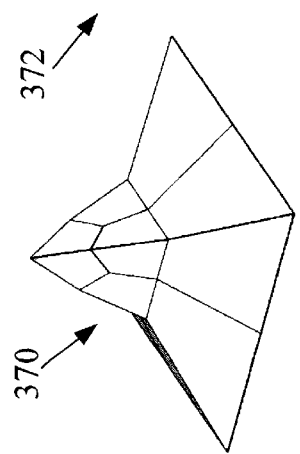
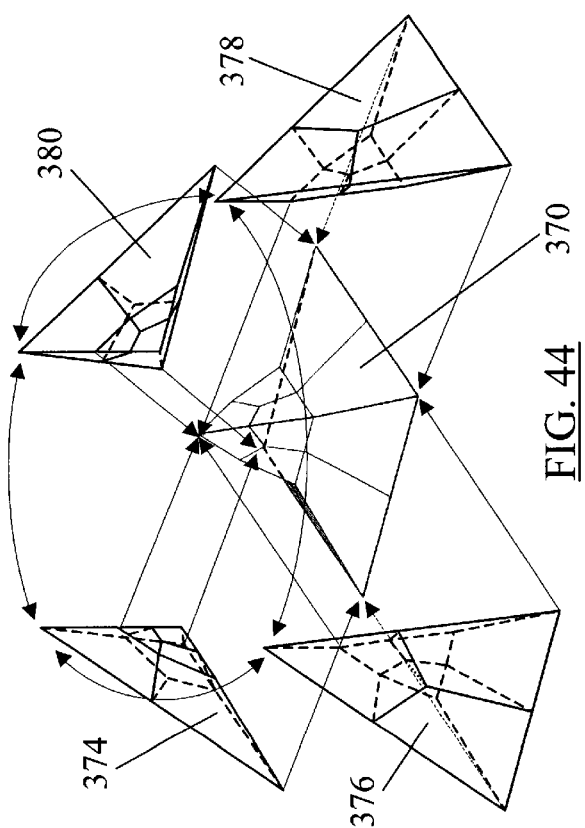
FIG. 45A
FIG. 45B
FIG. 43A
FIG. 43B
FIG. 44

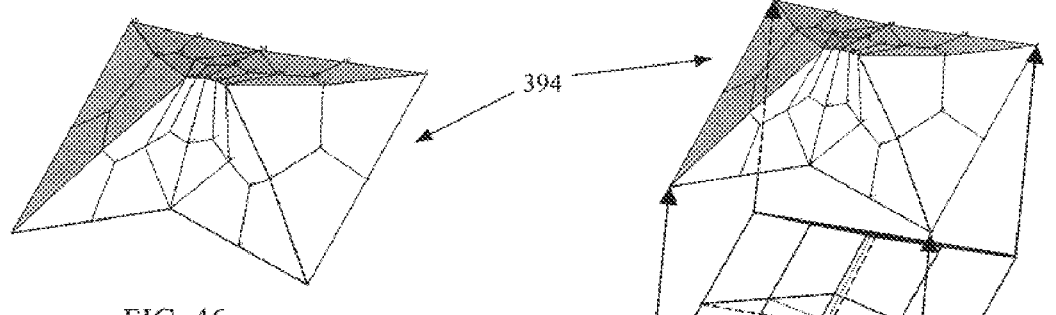
FIG. 46
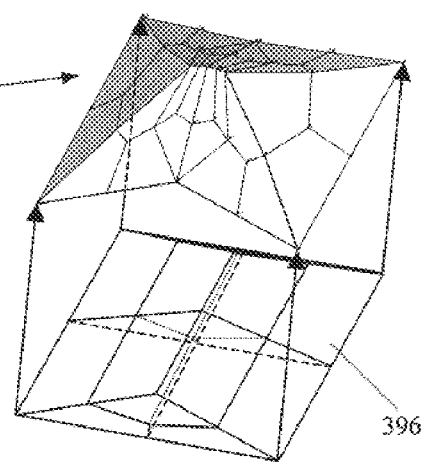
FIG. 47
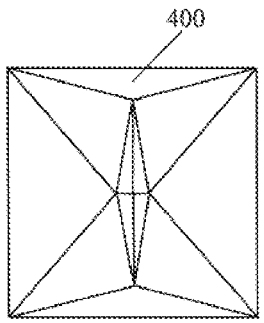
FIG. 48A
FIG. 48B
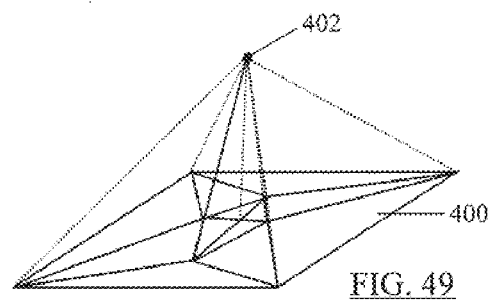
FIG. 49

| | |
|---|---|
| V<x><y><z> | A node location. Node index begins with 0 (i.e., first 'V' defines node0). |
| H<v1><v2><v3><v4><v5><v6><v7><v8> | An element. Node ordering is as shown below. |
| CN1<n₁> | n₁ of a core |
| CN2<n₂> | n₂ of a core |
| SLOT<p> | Begin table $s_i^p$, followed by node indexes of the table. The table length is $5(n_1+1)$ if $0 \leq p \leq 1$, $5(n_1+1)$ if $2 \leq p \leq 3$ |
| CNF<n_f> | n_f of a cap |
| CNS<n_s> | n_s of a cap |
| BFACE | Begin table $b_j$, followed by node indexes of the table. The table length is $5(n_s+1)$. |
| FFACE<w> | Begin table $f_k^w$, followed by node indexes of the table. The table length is $5\left(\frac{n_f}{2}-1\right)+4$. |
| # | Comment line |

DATA FORMAT
510

FIG. 50

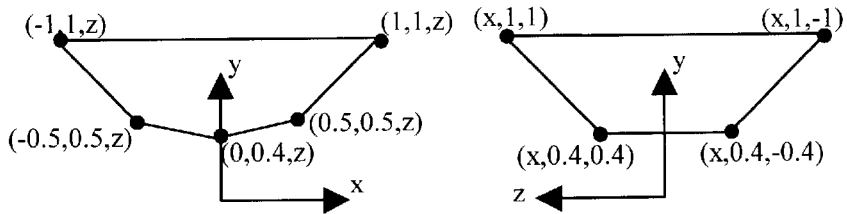

FIG. 53

| 512 | Slot 0 | Slot 1 | Slot 2 | Slot3 |
|---|---|---|---|---|
| | $x' = x$ | $x' = x$ | $x' = x$ | $x' = x$ |
| | $y' = y$ | $y' = -y$ | $y' = -z$ | $y' = z$ |
| | $z' = z$ | $z' = -z$ | $z' = y$ | $z' = -y$ |

FIG. 54

| 514 | Slot 0 | Slot 1 | Slot 2 |
|---|---|---|---|
| | $x' = x$ | $x' = x$ | $x' = x$ |
| | $y' = 0.57735y$ | $y' = -0.288675y - 0.866025z$ | $y' = -0.288675y + 0.866025z$ |
| | $z' = z$ | $z' = 0.5y - 0.5z$ | $z' = -0.5y - 0.5z$ |

FIG. 55

```
// Assemble.cpp include <stdio.h>
include <string.h>
#include <stdlib.h>
include <math.h> define NOERR 0
define ERROR 1 class Hex
{
public:
        int ndId[8];
};

class Node
{
public:
        double x,y,z;
};

class HexMesh
{
public:
        HexMesh();
        ~HexMesh();

int nHex,nNode;
        Hex *hex;
        Node *node;
```

FIG. 56A

Copyright 2001 Soji Yamakawa

```
        int Load(const char fn[]);                                              n1=0;
        int Save(const char fn[]);                                              n2=0;
        void DeleteUnused(void);                                                slot[0]=NULL;
                                                                                slot[1]=NULL;
        // For a cap                                                            slot[2]=NULL;
        int nf,ns;                                                              slot[3]=NULL;
        int *bface,*fface[2];                                                }

// For a core                                                        HexMesh::~HexMesh()
        int n1,n2;                                                           {
        int *slot[4];                                                            int i;

protected:                                                                       if(hex!=NULL)
        void CountNodeAndHex(int &nNode,int &nHex,FILE *fp);                     {
};                                                                                   delete [] hex;
                                                                                 }
HexMesh::HexMesh()                                                               if(node!=NULL)
{                                                                                {
        nHex=0;                                                                      delete [] node;
        nNode=0;                                                                 }
        hex=NULL;                                                                if(bface!=NULL)
        node=NULL;                                                               {
                                                                                     delete [] bface;
        nf=0;                                                                    }
        ns=0;
        bface=NULL;                                                              for(i=0; i<2; i++)
        fface[0]=NULL;                                                           {
        fface[1]=NULL;                                                               if(fface[i]!=NULL)
                                                                                     {
                                                                                         delete [] fface[i];
                                                                                     }
                                                                                 }
                                                                             }

Copyright 2001 Soji Yamakawa
```

FIG. 56B

```
for(i=0; i<4; i++)
{
    if(slot[i]!=NULL)
    {
        delete [] slot[i];
    }
}
} int HexMesh::Load(const char fn[])
{
    FILE *fp;

printf("Loading %s\n",fn);

// Pass 1 Count
    fp=fopen(fn,"r");
    if(fp==NULL)
    {
        fprintf(stderr,"Cannot open %s.\n",fn);
        return ERROR;
    }
    CountNodeAndHex(nNode,nHex,fp);
    fclose(fp);

hex=new Hex [nHex];
    node=new Node [nNode];

printf("# of elements %d\n",nHex);
    printf("# of nodes %d\n",nNode);

// Pass 2 Actually Read
    int nodeCtr;
    int hexCtr;
    char buf[256],dummy[256];

nodeCtr=0;
    hexCtr=0;
    fp=fopen(fn,"r");

while(fgets(buf,256,fp)!=NULL)
    {
        if(buf[0]=='#')
        {
            // Nothing to do.  Skip a comment line.
        }
        else if(buf[0]=='V')
        {
            sscanf(buf,"%s%lf%lf%lf",dummy,&node[nodeCtr].x,
                &node[nodeCtr].y,&node[nodeCtr].z);
            nodeCtr++;
        }
        else if(buf[0]=='H')
        {
            sscanf(buf,"%s%d%d%d%d%d%d%d%d",
                dummy,
                &hex[hexCtr].ndId[0],&hex[hexCtr].ndId[1],&hex[hexCtr].ndId[2],
                &hex[hexCtr].ndId[3],
```

FIG. 56C

Copyright 2001 Soji Yamakawa

```
&hex[hexCtr].ndId[4],&hex[hexCtr].ndId[5],&hex[hexCtr].ndId[6],
&hex[hexCtr].ndId[7]);
        hexCtr++;
    }
    else if(strncmp(buf,"CN1",3)==0)
    {
        sscanf(buf,"%s%d",dummy,&n1);
    }
    else if(strncmp(buf,"CN2",3)==0)
    {
        sscanf(buf,"%s%d",dummy,&n2);
    }
    else if(strncmp(buf,"CNS",3)==0)
    {
        sscanf(buf,"%s%d",dummy,&ns);
    }
    else if(strncmp(buf,"CNF",3)==0)
    {
        sscanf(buf,"%s%d",dummy,&nf);
    }
    else if(strncmp(buf,"BFACE",5)==0)
    {
        int i,j,n;
        bface=new int [(ns+1)*5];
        n=0;
        for(i=0; i<5; i++)
        {
            char buf[256],prev;
            fgets(buf,256,fp);
            prev=' ';
            for(j=0; buf[j]!=0; j++)
            {
                if(prev==' ' && '0'<=buf[j]
                    && buf[j]<='9')
                {
                    bface[n++]=atoi(buf+j);
                }
                prev=buf[j];
            }
        }
    }
    else if(strncmp(buf,"FFACE",5)==0)
    {
        int i,j,n,ff;
        sscanf(buf,"%s%d",dummy,&ff);
        fface[ff]=new int [(nf/2-1)*5+4];
        n=0;
        for(i=0; i<6; i++)
        {
            char buf[256],prev;
            fgets(buf,256,fp);
            prev=' ';
            for(j=0; buf[j]!=0; j++)
            {
                if(prev==' ' && '0'<=buf[j]
                    && buf[j]<='9')
                {
                    fface[ff][n++]=atoi(buf+j);
                }
            }
        }
```

FIG. 56D         Copyright 2001 Soji Yamakawa

```
            prev=buf[j];
        }
        if(prev==' ' && '0'<=buf[j] &&buf[j]<='9')
        {
            slot[sl][idx++]=atoi(buf+j);
        }
        prev=buf[j];
    }
}
else if(strncmp(buf,"SLOT",4)==0)
{
    int sl;
    int i,j,n,idx;
    sscanf(buf,"%s%d",dummy,&sl);
    if(sl==0 || sl==1)
    {
        n=n1;
    }
    else
    {
        n=n2;
    }
    slot[sl]=new int [(n+1)*5];
    idx=0;
    for(i=0; i<5; i++)
    {
        char buf[256],prev;
        fgets(buf,256,fp);
        prev=' ';
        for(j=0; buf[j]!=0; j++)
        {
```
fclose(fp);
return NOERR;
} int HexMesh::Save(const char fn[])
{
    FILE *fp;
    fp=fopen(fn,"w");
    if(fp!=NULL)
    {
        int i,j;
        for(i=0; i<nNode; i++)
        {
            fprintf(fp,"V %lf %lf %lf\n",
                node[i].x,node[i].y,node[i].z);
        }
        for(i=0; i<nHex; i++)
        {
            fprintf(fp,"H");
            for(j=0; j<8; j++)
```

FIG. 56E

Copyright 2001 Soji Yamakawa

```
            for(i=0; i<nHex; i++)
            {
                fprintf(fp, " %d",hex[i].ndId[j]);
            }
            fprintf(fp,"\n");
        }
        fclose(fp);
        printf("Output filename=%s\n",fn);
        return NOERR;
    }
    else
    {
        fprintf(stderr,"Cannot open %s for writing.\n");
        return ERROR;
    }
} void HexMesh::DeleteUnused(void)
{
    int i,j;
    int *used,nToDelete, *toDelete;

used=new int [nNode];
    toDelete=new int [nNode];

nToDelete=0;
    for(i=0; i<nNode; i++)
    {
        used[i]=0;
    }
    for(i=0; i<nHex; i++)
    {
        for(j=0; j<8; j++)
        {
            used[hex[i].ndId[j]]=1;
        }
    }
    for(i=0; i<nNode; i++)
    {
        if(used[i]!=1)
        {
            toDelete[nToDelete++]=i;
        }
    }
    for(i=nToDelete-1; i>=0; i--)
    {
        for(j=toDelete[i]; j<nNode-1; j++)
        {
            node[j]=node[j+1];
        }
        int hexId;
        for(hexId=0; hexId<nHex; hexId++)
        {
            for(j=0; j<8; j++)
            {
                if(hex[hexId].ndId[j]>
                    toDelete[i])
```

Copyright 2001 Soji Yamakawa

FIG. 56F

```
                hex[hexId].ndId[j]--;
            }
        }
        nNode--;
    } delete [] used;
    delete [] toDelete;
} void HexMesh::CountNodeAndHex(int &nNode,
                int &nHex,FILE *fp)
{
    char buf[256];

nNode=0;
    nHex=0;
    while(fgets(buf,256,fp)!=NULL)
    {
        if(buf[0]=='V')
        {
            nNode++;
        }
        else if(buf[0]=='H')
        {
            nHex++;
        }
    }
}
```

```
///////////////////////////////
int ValidityCheck(HexMesh &core,int nCap,HexMesh cap[])
{
    int res;

printf("\n");
    printf("Validity Check.\n");

res=NOERR;

int i;
    for(i=0; i<nCap; i++)
    {
        if(cap[i].nf!=cap[(i+1)%nCap].nf)
        {
            fprintf(stderr,"NF must be common for all
                                                caps.\n");
            res=ERROR;
        }
    } if(cap[0].ns!=core.n1)
    {
        fprintf(stderr,"NS of cap0 must be same as N1 of
                                                core.\n");
        res=ERROR;
    }
    if(cap[1].ns!=core.n1)
    {
```

Copyright 2001 Soji Yamakawa

FIG. 56G

```
        fprintf(stderr,"NS of cap1 must be same as N1 of core.\n");
        res=ERROR;
    }
    if(cap[2].ns!=core.n2)
    {
        fprintf(stderr,"NS of cap2 must be same as N2 of core.\n");
        res=ERROR;
    }
    if(nCap==4 && cap[3].ns!=core.n2)
    {
        fprintf(stderr,"NS of cap3 must be same as N2 of core.\n");
        res=ERROR;
    }
    if(nCap==3 && core.n1!=core.n2)
    {
        fprintf(stderr,"This program assumes n1=n2=ns for prism
                HEXHOOP.\n");
        res=ERROR;
    }
    if(res!=NOERR)
    {
        fprintf(stderr,"The combination is INVALID!\n");
    }
    else
    {
        printf("The combination is valid.\n");
    }
    return res;
}
```

```
void OrientCapForCube(HexMesh cap[])
{
    int i;
    double y,z;
    for(i=0; i<cap[0].nNode; i++)
    {
        y=cap[0].node[i].y;
        z=cap[0].node[i].z;
        cap[0].node[i].y=y;
        cap[0].node[i].z=z;
    }
    for(i=0; i<cap[1].nNode; i++)
    {
        y=cap[1].node[i].y;
        z=cap[1].node[i].z;
        cap[1].node[i].y=-y;
        cap[1].node[i].z=-z;
    }
    for(i=0; i<cap[2].nNode; i++)
    {
        y=cap[2].node[i].y;
        z=cap[2].node[i].z;
        cap[2].node[i].y=-z;
        cap[2].node[i].z=y;
    }
    for(i=0; i<cap[3].nNode; i++)
    {
        y=cap[3].node[i].y;
        z=cap[3].node[i].z;
        cap[3].node[i].y=z;
        cap[3].node[i].z=-y;
    }
}
```

Copyright 2001 Soji Yamakawa

FIG. 56H

```
void OrientCapForPrism(HexMesh cap[])
{
    int i;
    double y,z;

for(i=0; i<cap[0].nNode; i++)
    {
        y=cap[0].node[i].y;
        z=cap[0].node[i].z;
        cap[0].node[i].y=0.57735*y;
        cap[0].node[i].z=z;
    }
    for(i=0; i<cap[1].nNode; i++)
    {
        y=cap[1].node[i].y;
        z=cap[1].node[i].z;
        cap[1].node[i].y=-0.288675*y-0.866025*z;
                      // c120*0.57735*y-s120*z;
        cap[1].node[i].z= 0.5*y   -0.5*z;
                      // s120*0.57735*y+c120*z;
    }
    for(i=0; i<cap[2].nNode; i++)
    {
        y=cap[2].node[i].y;
        z=cap[2].node[i].z;
        cap[2].node[i].y=-0.288675*y+0.866025*z;
                      // c240*0.57735*y-s240*z;
        cap[2].node[i].z=-0.5*y   -0.5*z ;
                      // s240*0.57735*y+c240*z;
    }
} void Dump(HexMesh &hexhoop,int capNdIdBase[],
          HexMesh &core,int nCap,HexMesh cap[])
{
    int i,j,k;
    int nNodeTotal,nHexTotal;

nNodeTotal=core.nNode;
    nHexTotal=core.nHex;
    for(i=0; i<nCap; i++)
    {
        nNodeTotal+=cap[i].nNode;
        nHexTotal+=cap[i].nHex;
    } hexhoop.nNode=nNodeTotal;
    hexhoop.node=new Node [nNodeTotal];
    hexhoop.nHex=nHexTotal;
    hexhoop.hex=new Hex [nHexTotal];

int nodeCtr,hexCtr;
    nodeCtr=0;
    hexCtr=0;
    for(j=0; j<core.nNode; j++)
    {
        hexhoop.node[nodeCtr++]=core.node[j];
    }
    for(j=0; j<core.nHex; j++)
    {
        hexhoop.hex[hexCtr++]=core.hex[j];
    }
    for(i=0; i<nCap; i++)
    {
```

FIG. 56I

Copyright 2001 Soji Yamakawa

```
capNdIdBase[i]=nodeCtr;
    for(j=0; j<cap[i].nNode; j++)
    {
        hexhoop.node[nodeCtr++]=cap[i].node[j];
    }
    for(j=0; j<cap[i].nHex; j++)
    {
        for(k=0; k<8; k++)
        {
            hexhoop.hex[hexCtr].ndId[k]=
                cap[i].hex[j].ndId[k]+capNdIdBase[i];
        }
        hexCtr++;
    }
} void Tie(HexMesh &hexhoop,int n,int table0[],int table1[],int ndIdBase0,
                                                int ndIdBase1)
{
    int ndId,i,j;
    int *mapping;
    mapping=new int [hexhoop.nNode];
    for(ndId=0; ndId<hexhoop.nNode; ndId++)
    {
        mapping[ndId]=ndId;
    }
    for(i=0; i<n; i++)
    {
        mapping[ndIdBase1+table1[i]]=ndIdBase0+table0[i];
    }
    for(i=0; i<hexhoop.nHex; i++)
    {
        for(j=0; j<8; j++)
        {
            hexhoop.hex[i].ndId[j]=
                mapping[hexhoop.hex[i].ndId[j]];
        }
    }
    delete [] mapping;
}
//////////////////////////////////////////////////
int main(int ac,char *av[])
{
    HexMesh core,cap[4],hexhoop;
    int capNdIdBase[4];

double x;
    x=10.0;  // <- Dummy operation to escape
             //    from Visual C++ 6.0's bug
    if(ac==6)
    {
        printf("Assume assembly of a cube.\n");
        if(core.Load(av[1])==NOERR &&
            cap[0].Load(av[2])==NOERR &&
            cap[1].Load(av[3])==NOERR &&
            cap[2].Load(av[4])==NOERR &&
            cap[3].Load(av[5])==NOERR)
        {
            if(ValidityCheck(core,4,cap)==
                             NOERR)
```

FIG. 56J        Copyright 2001 Soji Yamakawa

```
    OrientCapForCube(cap);
    Dump(hexhoop,capNdIdBase,core,4,cap);
    Tie(hexhoop,5*(core.n1+1),core.slot[0],0,cap[0].bface,
                                          capNdIdBase[0]);
    Tie(hexhoop,5*(core.n1+1),core.slot[1],0,cap[1].bface,
                                          capNdIdBase[1]);
    Tie(hexhoop,5*(core.n2+1),core.slot[2],0,cap[2].bface,
                                          capNdIdBase[2]);
    Tie(hexhoop,5*(core.n2+1),core.slot[3],0,cap[3].bface,
                                          capNdIdBase[3]);
    Tie(hexhoop,(cap[0].nf/2-1)*5+4,cap[0].fface[0],
            capNdIdBase[0],cap[2].fface[1],capNdIdBase[2]);
    Tie(hexhoop,(cap[2].nf/2-1)*5+4,cap[2].fface[0],
            capNdIdBase[2],cap[1].fface[1],capNdIdBase[1]);
    Tie(hexhoop,(cap[1].nf/2-1)*5+4,cap[1].fface[0],
            capNdIdBase[1],cap[3].fface[1],capNdIdBase[3]);
    Tie(hexhoop,(cap[3].nf/2-1)*5+4,cap[3].fface[0],
            capNdIdBase[3],cap[0].fface[1],capNdIdBase[0]);
    hexhoop.DeleteUnused();
    hexhoop.Save("hexhoop.dat");
  }
  }
  else
  {
    fprintf(stderr,"Error in loading meshes.\n");
    return 1;
  }
  return 0;
  }
  else if(ac==5)
  {
    printf("Assume assembly of a prism.\n");
    if(core.Load(av[1])==NOERR &&
      cap[0].Load(av[2])==NOERR &&
      cap[1].Load(av[3])==NOERR &&
      cap[2].Load(av[4])==NOERR)
    {
    if(ValidityCheck(core,3,cap)==NOERR)
    {
      OrientCapForPrism(cap);
      Dump(hexhoop,capNdIdBase,core,3,cap);
      Tie(hexhoop,5*(core.n1+1),core.slot[0],0,
                      cap[0].bface,capNdIdBase[0]);
      Tie(hexhoop,5*(core.n1+1),core.slot[1],0,
                      cap[1].bface,capNdIdBase[1]);
      Tie(hexhoop,5*(core.n1+1),core.slot[2],0,
                      cap[2].bface,capNdIdBase[2]);
      Tie(hexhoop,(cap[0].nf/2-1)*5+4,cap[0].fface[0],
           capNdIdBase[0],cap[1].fface[1],capNdIdBase[1]);
      Tie(hexhoop,(cap[1].nf/2-1)*5+4,cap[1].fface[0],
           capNdIdBase[1],cap[2].fface[1],capNdIdBase[2]);
      Tie(hexhoop,(cap[2].nf/2-1)*5+4,cap[2].fface[0],
           capNdIdBase[2],cap[0].fface[1],capNdIdBase[0]);
      hexhoop.DeleteUnused();
      hexhoop.Save("hexhoop.dat");
    }
    }
    else
    {
      fprintf(stderr,"Error in loading meshes.\n");
      return 1;
    }
    return 0;
  }
  else
  {
    printf("Assemble <cubecore.dat> <cap0.dat> <cap1.dat> <cap2.dat>
                                               <cap3.dat>\n");
    printf("   Or\n");
    printf("Assemble <prismcore.dat> <cap0.dat> <cap1.dat>
                                               <cap2.dat>\n");
    return 1;
  }
}
                                         Copyright 2001 Soji Yamakawa
```

SYSTEM AND METHOD FOR CONVERTING A HEX-DOMINANT MESH TO AN ALL-HEXAHEDRAL MESH

STATEMENT REGARDING FEDERALLY SPONSORED RESEARCH OR DEVELOPMENT

The present invention was partly sponsored by the National Science Foundation (NSF) through the NSF Career Award No. 9985288. The Government of the United States of America may have certain rights in the present invention.

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention broadly relates to automatic volume discretization of a geometric object using hexahedral elements, and, more particularly, to a system and method to convert a hex-dominant mesh structure into an all-hex mesh structure using all-hex templates where each template is composed of a family of modular hexahedral sub-templates and where triangular and rectangular patterns can be freely combined on the template's exterior faces.

2. Description of the Related Art

Finite element analysis is a numerical method that solves mathematical problems in engineering and physics for determining the physical behavior of a geometric object or region. Finite element analysis is used in approximating any continuous physical characteristic or behavior (such as structural mechanics, effect of temperature, pressure, heat, or an electric field, etc.) of a geometric region by a discrete model of a set of piece-wise continuous functions. The geometric region is broken into discrete elements interconnected at discrete node points. Typically, finite element analysis is performed on a computer in a three-step procedure comprising the steps of pre-processing, processing, and post-processing. In the pre-processing step, geometric boundary data representing the geometric region to be analyzed is taken, and a mesh of geometrical elements covering the domain of the geometric region is generated. Thus, mesh generation is the process of discretizing a continuous geometry into small elements for use in the finite element analysis. In the processing step, the element data are taken and mathematical equations are applied to solve for the characteristic of interest across the domain through use of matrix equations. For example, a stimulus is applied to the mesh data and the reaction of the mesh data to the stimulus is analyzed. In the post-processing step, the results of this finite element analysis are output, for example, in a graphical representation of the characteristic of interest.

Traditionally, generating a mesh for a given geometry has been very tedious, time consuming, and error prone. However, with the advent of sophisticated computing machines, the mesh generation process is substantially automated. The automated meshing systems for general three-dimensional (3D) volumes traditionally give tetrahedral- or hexahedral-shaped elements, or a combination of the two types. A mesh is constrained in terms of how elements share subfacets within the mesh. This problem is much less constrained for tetrahedral or mixed element meshes, hence tetrahedral and mixed element meshing algorithms have received the most attention in the past. However, due to increased- accuracy and efficiency of eight-node hexahedral elements for non-linear structural mechanics and other applications, there is a growing demand for all-hex meshing systems. The discussion hereinbelow refers to a hexahedral element as a "hex." FIG. 1 shows a hex-dominant mesh 10 and its constituent elements. A hex-dominant mesh (e.g., the mesh 10) is a three-dimensional mesh that consists of four types of elements—hexahedral elements (e.g., elements 16 in the mesh 10), prism elements (e.g., elements 18 in the mesh 10), pyramid elements (e.g., elements 12 in the mesh 10) and tetrahedral elements (e.g., elements 14 in the mesh 10)—as illustrated in FIG. 1. An all-hex mesh is a mesh that consists of exclusively hexahedral elements.

Although it would be ideal if an all-hex mesh could be generated for an arbitrary three-dimensional shape without going through a hex-dominant mesh, the direct all-hex meshing problem is known to be highly challenging, and none of the existing methods always succeeds to create a valid all-hex mesh for a complex three-dimensional geometry. A few of such existing methods of all-hex mesh creation are described in the following: (1) Blacker, T. D. and R. J. Meyers, "Seams and Wedges in Plastering: A 3-D Hexahedral Mesh Generation Algorithm," Engineering with Computers, 1993, 2(9), pp. 83–93 (hereinafter, "Meyers"); (2) Tautges, T. J., T. Blacker, and S. A. Mitchell, "The Whisker Weaving Algorithm: A Connectivity-Based Method for Constructing All-Hexahedral Finite Element Meshes", International Journal for Numerical Methods in Engineering, 1996, vol. 39, pp. 3327–3349 (hereafter, "Blacker"); and (3) U.S. Pat. No. 5,768,156, issued on Jun. 16, 1998 to Tautges et al. (hereafter, "Tautges"). Although there exists a trivial solution—reating a tetrahedral mesh first and subdividing each of the tetrahedral elements (hereafter, "tet") into four smaller hex elements—topological and geometric irregularity of such an all-hex mesh is so poor that this method is not used in practice. Creating a quality hex-dominant mesh, on the other hand, is an easier problem, either by hand or by an automated algorithm as described in (1) Owen, S. J., S. A. Canann, and S. Saigal, "Pyramid Elements for Maintaining Tetrahedra to Hexahedra Conformability", AMD-Vol. 220, Trend in Unstructured Mesh Generation, ASME, 1997, pp. 123–129 (hereafter "Owen"); and (2) Owen, S. J. and S. Saigal, "H-Morph: An Indirect Approach to Advancing Front Hex Meshing", International Journal for Numerical Methods in Engineering, 2000, 49, pp. 289–312 (hereafter "Saigal"). The disclosures of Owen and Saigal are incorporated herein by reference in their entireties.

In order to highlight the difficulty in developing conversion templates for all-hex meshing, it is important to take a look at a much easier, two-dimensional problem of converting a quad-dominant mesh to an all-quad mesh. FIG. 2 illustrates conversion of a quad-dominant mesh 20 into an all-quad mesh 22. The input quad-dominant mesh 20 includes a number of quadrilaterals (or quads) 21 and triangles 23. FIG. 3 illustrates two types of templates for converting a quad-dominant mesh into an all-quad mesh. The template quadrilateral 30 is shown with its constituent all-quad elements 32, and the, template triangle 34 is shown with its constituent all-quad elements 36. The conversion of the mesh 20 in FIG. 2 is accomplished with only these two types of templates shown in FIG. 3. In FIG. 2, the quad elements for quadrilaterals 21 are depicted by the numeral 25, and the quad elements for triangles 23 are depicted by the numeral 27. With the two types of templates shown in FIG. 3, it is guaranteed that any quad-dominant mesh can be converted to an all-quad mesh.

During this all-quad mesh conversion it is important to maintain the interface conformity, or the topological and geometric conformity between adjacent mesh elements. To maintain the conformity each of the all interior edges of a final mesh must be shared by exactly two elements. By using the two templates shown in FIG. 3, it is trivial to satisfy such conformity in the all-quad mesh conversion because all the edges of an input quad-dominant mesh are always split into two segments.

In the all-hex mesh conversion problem, a similar interface comformity requirement still exists. The common method for converting a hex-dominant mesh into an all-hex mesh is to subdivide, or dice, a non-hex element into a set of smaller hexes. A hex in the original mesh is also subdivided into a set of smaller hexes. However, it is noted that in a final all-hex mesh, all the interfaces between adjacent hexes must be quadrilaterals, and each of the quadrilaterals must be shared by exactly two hexes in order to maintain the conformity.

Despite the apparent similarity of the problem statement, the all-hex mesh conversion problem turns out significantly more challenging than the all-quad mesh conversion problem discussed hereinabove because of the following two reasons: (1) An input hex-dominant mesh consists of four different types of elements—hexes, prisms, pyramids and tets—as opposed to only two types as in a quad-dominant mesh; and (2) A hex-dominant mesh has two types of interfaces—triangles and quadrilaterals—which make it more difficult to maintain the topological and geometric conformity at the interfaces, compared with the all-quad mesh conversion problem in which there is only one type of interface—a line segment.

Among the four types of elements in a hex-dominant mesh, hexes, tets, and prisms have the following well-known, simple conversion templates: (1) A hex element can be split into eight smaller hex elements by adding a node at the center of the volume, six nodes at the centers of six quadrilateral faces, and twelve nodes at the centers of twelve edges of the original hex; (2) A tet element can be split into four smaller hex elements by adding a node at the center of the volume, four nodes at the centers of four triangular faces, and six nodes at the centers of six edges of the original tet; and (3) A prism element can be split into six smaller hex elements by adding a node at the center of the volume, five nodes at the centers of two triangular faces and three quadrilateral faces, and nine nodes at the centers of nine edges of the original prism. It is noted that all of these three templates apply aforementioned all-quad templates shown in FIG. 3—splitting a triangular face of the original element into three smaller quadrilaterals, and a quadrilateral face into four smaller quadrilaterals.

One problem is that there is no such template known for a pyramid. FIG. 4 shows a pyramid element 40 with four triangular faces 42 and one quadrilateral face 44 (not visible) at the bottom of the pyramid 40. If it exists, a template for such a pyramid 40 should subdivide each of the four triangular faces 42 of the pyramid 40 into three smaller quadrilateral faces and the bottom quadrilateral face 44 into four smaller quadrilaterals. FIG. 5 illustrates a layout 50 depicting the all-quad division of the faces of the pyramid 40 in FIG. 4. Each all-quad element for a triangular face 42 is given by the reference numeral 52 and each all-quad element for the quadrilateral face 44 is given by the reference numeral 54. Given this boundary mesh consisting of 16 (sixteen) quadrilaterals, finding a valid internal structure that dices the pyramid into a set of smaller hex elements is difficult, and there is no valid solution published for this open problem as discussed in Schneiders, R., "A grid-based algorithm for the generation of hexahedral element meshes", Engineering with Computers, 1996, 12, pp. 168–177, and as posted at http://www-users.informatik.rwth-aachen.de/~roberts/open.html (hereafter collectively referred to as "Schneiders"). This problem is referred to as Schneiders' Open Problem. Although a solution to the Schneiders' problem is proposed in Carbonera, C.D., "Constrained Mesh Generation", posted at http://www-users.informatik.rwth-aachen.de/~roberts/SchPyr/index.html (hereafter "Carbonera"), this solution is not valid because some interior faces are not shared by two hexes.

FIG. 6 illustrates some examples of how a quadrilateral face 60 of a pyramid is split into rectangular patterns 62,64,66 and 68. The pattern 62 shows a 2×2 split, the pattern 64 shows a 2×1 split, the pattern 66 shows a 4×2 split, and the pattern 68 shows a 4×4 split. One known simple template for a pyramid is the one that first splits the pyramid into two tet elements and then applies the known tet template to each tet. FIG. 7 illustrates splitting of the bottom quadrilateral face 70 of a pyramid using the known tet template. With this template, the bottom quadrilateral face 70 is split into the 2×2 triangular pattern 72. Other variations of the pattern 72 include the 4×2 triangular pattern 74 and the 4×4 triangular pattern 76.

If the bottom face of a pyramid is subdivided into a triangular pattern, however, a hex element or a prism element adjacent to the pyramid must have a triangular pattern on one face in order to maintain the interface conformity. This brings up another unsolved problem of finding conversion templates for a hex and a prism that have both rectangular patterns and triangular patterns mixed on the exterior surface of the hex and the prism. A partial solution to this problem is presented in Mitchell, S. A., "The All-Hex Geode-Template for Conforming a Diced Tetrahedral Mesh to any Diced Hexahedral Mesh", Proceedings of $7^{th}$ International Meshing Roundtable, 1998 (hereafter "Mitchell"), the disclosure of which is incorporated herein by reference in its entirety. FIG. 8 illustrates the Geode template 80. The Geode template 80 has a top face 82, four side faces 86, and a bottom face 84. As illustrated in FIG. 8, the Geode template 80 has a triangular subdivision pattern on the top face 82, a rectangular subdivision pattern on the bottom face 84, and an irregular subdivision pattern on each side face 86. The irregular subdivision pattern limits the application and practical value of the Geode template 80.

In summary, there are two approaches to the all-hex conversion template, but no complete solution to these two approaches has been published: (1) to find a template for a pyramid that has a rectangular subdivision pattern on the bottom face, as pointed out in Schneiders, and (2) to find templates for a hex and a prism that have mixed subdivision patterns, rectangular and triangular, as pointed out in Mitchell.

There are several hex-meshing algorithms that are a variation of the advancing front method. Meyers presents an algorithm called plastering, which creates hex elements one by one by starting from domain boundaries and moving inward. Blacker and Tautges present a method called whisker weaving. The whisker weaving method creates a topology of a hex mesh first and then constructs the geometry of the mesh based on the topological information. Saigal presents an algorithm called H-Morph, which converts a tet mesh to a hex-dominant mesh by creating hex elements one by one starting from domain boundaries and moving inward. The method in Saigal is different from plastering in Meyers in that Saigal's method starts with a tetrahedral mesh and always maintains a valid hex-tet mixed mesh during the process.

Schneiders presents an algorithm that creates a hex-mesh using an overlay grid. Schneiders' method creates a structured grid that contains a target geometric domain and then converts all interior cells that are inside the domain into hex elements. After converting all interior cells into hex elements, the method subdivides cells that intersect a boundary into hex elements when it is possible. Finally, locations of the nodes that are close to the boundary are adjusted in order to conform the mesh to the target domain boundary. While the concept is straightforward, the robust implementation of this method for a complex geometric domain is difficult, and the final mesh has poor quality elements around the domain boundary, which is often the most critical part in engineering analysis.

An algorithm, called multisweep, is presented in Shepherd, J., et al., "Methods for Multisweep Automation", Proceedings of $9^{th}$ International Meshing Roundtable, 2000 (hereafter "Shepherd"). Shepherd's multisweep method creates hex elements by sweeping a quadrilateral mesh. When a target domain can be decomposed into sweepable sub-domains, the multisweep algorithm successfully creates an all-hex mesh. For a complex geometric domain, however, there is no guarantee that a target domain can be decomposed into sweepable sub-domains.

One practical alternative to all-hex meshing is hex-dominant meshing. A hex-dominant mesh is much easier to generate by hand or by an automatic method. For example, one could use the advancing front method or one of its variations to create hex elements near the domain boundary. For a remaining volume, one can fill non-hex elements, such as pyramids, prisms, and tets. Owen presents a method that places pyramids on the faces of the hex elements that are exposed to a remaining volume. After pyramids are placed, the remaining volume is enclosed only by triangles. The remaining volume is then filled with tet elements to yield a hex-dominant mesh.

Because it is much easier to create a quality hex-dominant mesh than a quality all-hex mesh, it is desirable to pursue a method for converting a hex-dominant mesh to an all-hex mesh. Mitchell proposes such a conversion method with the Geode template 80 mentioned hereinbefore with reference to FIG. 8. As noted hereinbefore, the Geode template 80 is an all-hex conversion template that has one triangular pattern on the top face 82, one rectangular pattern on the bottom face 84, and four irregular patterns on the side faces 86. When an advancing front method stops and leaves an unmeshed volume, a layer of Geode is laid on the boundary of the remaining volume. This has to be performed in such a way that a face on the Geode template with the rectangular pattern (e.g., the face 84 in FIG. 8) is shared with another hex created by the advancing front method and that a face on the Geode template with a triangular pattern (e.g., the face 82 in FIG. 8) is exposed to the remaining volume. In a way similar to Owen's hex-dominant method, Mitchell's method places tets on the triangular side of the Geode template. The remaining volume enclosed by triangles of the pyramids is also meshed into a set of tet elements. Finally tets are diced into hexes to complete a conversion of the input hex-dominant mesh to an all-hex mesh.

While Mitchell's Geode template is a novel approach to the all-hex mesh conversion problem, it has a major limitation: because of the irregular subdivision pattern on its side faces, the Geode template is applicable only to a closed shell-like volume. Mitchell's Geode tempalate would be more powerful and easier-to-use if the side faces had a rectangular pattern.

It is therefore desirable to provide a mesh conversion template that fully automates the conversion from a hex-dominant mesh to an all-hex mesh. It is also desirable to be able to freely combine triangular and rectangular patterns on the mesh conversion template's exterior faces regardless of the type of the constituent element (i.e., a hex, a prism, a pyramid, or a tet) in the input hex-dominant mesh.

SUMMARY OF THE INVENTION

In one embodiment, the present invention contemplates a method to convert a hex-dominant mesh structure into an all-hex mesh structure, wherein the hex-dominant mesh structure includes at least one of the following constituent elements: one or more hexahedral elements, one or more prism elements, one or more pyramid elements, and one or more tetrahedral elements. The method comprises identifying a template shape corresponding to each constituent element in the hex-dominant mesh structure, wherein each template shape has the same number of external surfaces as in the corresponding constituent element; modularly constructing a plurality of sub-templates corresponding to each said template shape identified, wherein all sub-templates in the plurality of sub-templates, when assembled, produce a corresponding template shape identified, wherein each of the plurality of sub-templates is constituted of a plurality of hexahedral elements and supplies at least one of the external surfaces for the corresponding template shape, and wherein at least one of the external surfaces supplied by each of the plurality of sub-templates has a subdivision pattern selected from the group consisting of a rectangular subdivision pattern and a triangular subdivision pattern; assembling all sub-templates in the plurality of sub-templates to compose the corresponding template shape; and combining all template shapes composed by assembling corresponding sub-templates in the shape of the hex-dominant mesh structure, thereby generating the all-hex mesh structure for the hex-dominant mesh structure. The method to generate the all-hex mesh structure may be coded in software and executed on a computer. Furthermore, two or more sub-templates may be generated in parallel to reduce processing time and avoid any memory size restrictions.

In another embodiment, the present invention contemplates a method for providing a three-dimensional (3D) all-hex mesh for a geometric region. The method comprises receiving configuration data about the geometric region in a predetermined format (e.g., as a hex-dominant mesh structure) from a remote user over a communication network (e.g., the Internet); generating the 3D all-hex mesh for the geometric region using the configuration data in the predetermined format; and sending the 3D all-hex mesh to the remote user over the communication network.

The present invention describes a modular approach to designing all-hex mesh conversion templates where triangular and rectangular subdivision patterns may arbitrarily be combined on the exterior faces of the templates. The templates can be created for any arbitrary-shaped, complex geometric domain. The all-hex conversion software according to the present invention take as input any type of a hex-dominant mesh and converts it to an all-hex mesh automatically. An all-hex template according to the present invention is not a single specific template. Instead, it is a family of modular sub-templates. These sub-templates can be assembled to form all-hex conversion templates for hexes, pyramids, and prisms. There are two types of modular sub-templates according to the present invention, called a core and a cap. For a hex or prism element, one core is defined, which specifies the subdivision patterns of two faces of the input hex or prism. Then four caps are defined for a hex and three caps for a prism to specify the subdivision patterns of the other faces. One can mix and combine two subdivision patterns, rectangular and triangular, freely on the exterior surfaces of a hex, prism, and a pyramid.

The methodology of the present invention may be used in mesh generation for finite element analysis in any engineering field and also in other applications using 3D meshes, such as, for example, volume rendering in computer graphics. Using the modular approach of the present invention, a hex-dominant mesh can be converted into an all-hex mesh successfully without losing the mesh conformity. The methodology of the present invention can be applied to any hex-dominant mesh created by various hex-dominant meshing methods presently available. Furthermore, the all-hex conversion software according to the present invention allows easy detection if any all-hex templates are used or not. In other words, if an all-hex mesh is created using the conversion software of the present invention, then one can easily detect the all-hex templates by parsing the mesh.

BRIEF DESCRIPTION OF THE DRAWINGS

Further advantages of the present invention may be better understood by referring to the following description taken in conjunction with the accompanying drawings, in which:

FIG. 12 shows an exemplary hex template with six exterior faces;

FIGS. 13A–13J show different combinations of rectangular and triangular patterns on exterior faces of the hex template shown in FIG. 12;

FIGS. 21A–21D illustrate an exemplary construction process for a cap with a triangular pattern on its T-faces;

FIGS. 22A–22B illustrate an exemplary construction process for a cap with a rectangular pattern on its T-faces;

FIG. 27A shows an exemplary 4×4 triangular subdivision pattern;

FIG. 27B shows an exemplary 4×4 triangular core with the 4×4 triangular subdivision pattern of FIG. 27A on its wing faces;

FIG. 28 illustrates an example of how a core is assembled;

FIG. 29 illustrates how a cap is assembled as part of the complete construction of an all-hex template (for a hex element) according to the present invention;

FIG. 30 illustrates an example of how nodes on a core and four caps are joined to form an all-hex template;

FIGS. 37A–37C illustrate three examples of irregular cores created according to the present invention;

FIG. 38 shows a template for a hex element along with a layout of that template;

FIG. 39 shows the template in FIG. 38 before and after deformation;

FIG. 43A illustrates the second intermediate mesh;

FIG. 43B illustrates the top view of the second intermediate mesh shown in FIG. 43A;

FIG. 44 shows the addition of four diced prisms to the second intermediate mesh shown in FIG. 43A;

FIG. 45A shows creation of an all-hex template for a prism element according to the present invention;

FIG. 45B shows an orientation and scaling of the template created in FIG. 45A;

FIG. 46 shows a deformed mesh generated after the template shown in FIG. 45A is oriented and scaled according to FIG. 45B and then deformed;

FIG. 47 shows how a diced prism is attached to the deformed mesh of FIG. 46 from the bottom;

FIG. 48A illustrates the exterior surface of the combined mesh generated as shown in FIG. 47;

FIG. 48B shows the topology of a quadrilateral mesh derived from a triangular mesh;

FIG. 49 illustrates how a point and the triangular mesh shown in FIG. 48B are connected to create a tet mesh;

FIG. 50 shows a data format table that identifies the parameters used in some examples of sub-template tables generated for various cores and caps according to the present invention;

FIG. 53 shows an exemplary dimension layout for a cap that is to be referred to when interpreting the coordinate entries in respective sub-template tables for different caps;

FIG. 54 depicts a table that shows the transformations necessary to move a cap to a slot of an n×4 core;

FIG. 55 depicts a table that shows the transformations necessary to move a cap to a slot of an n× prism core;

FIGS. 56A–56K provide some exemplary program instructions that assemble an all-hex template from a core and caps;

DETAILED DESCRIPTION OF PREFERRED EMBODIMENTS

Figure 9:
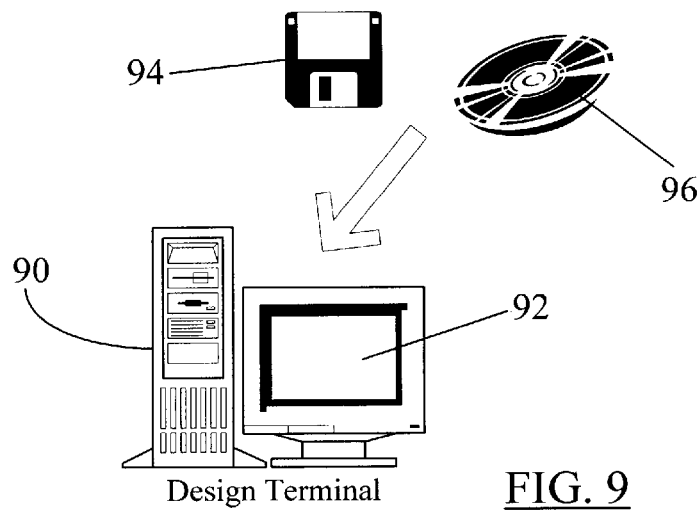
FIG. 9 depicts an exemplary design terminal that performs the all-hex conversion according to the present invention.
Figure 10:
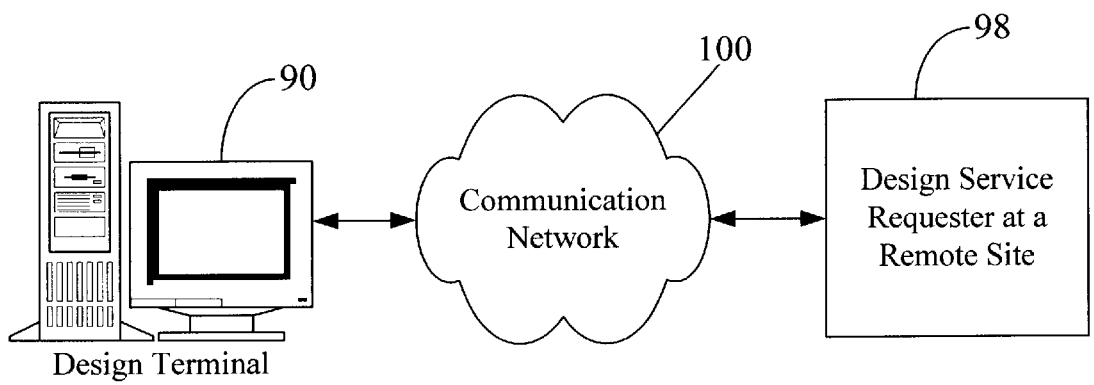
FIG. 10 shows an exemplary setup to remotely perform the all-hex conversion according to the present invention.

FIG. 9 depicts an exemplary design terminal 90 that performs the all-hex conversion according to the present invention. FIG. 10 shows an exemplary setup to remotely perform the all-hex conversion according to the present invention. The design terminal 90 may be accessible to a design service requester at a remote site 98 via a communication network 100 as shown in FIG. 10. The all-hex conversion of an input three-dimensional (3D)geometric structure may be performed by the design terminal 90 and the results displayed on the display screen 92 and, in case of the arrangement in FIG. 10, also sent to the remote site 98 over the communication network 100. In one embodiment, the communication network 100 may be an ethernet LAN (local area network) connecting all the computers within a research/design facility, e.g., a university or a corporate research/product testing laboratory. In that case, the design requester and the design terminal 90 may be physically located in the same site, e.g., the site 98. In alternative embodiments, the communication network 100 may include, independently or in combination, any of the present or future wireline or wireless data communication networks, e.g., the Internet (including the world wide web portion of the Internet), the PSTN (public switched telephone network), a cellular telephone network, a WAN (wide area network), a satellite-based communication link, a MAN (metropolitan area network) etc.

The design terminal 90 may be, e.g., a personal computer (PC) or may be a graphics workstation. Similarly, the user (or design service requester) at the remote site 98 may have access to a computer terminal (not shown) to view and manipulate three-dimensional (3D) all-hex meshes transmitted by the design terminal 90. In one embodiment, the design terminal 90 may function as the remote requester's computer when the remote site includes the design terminal 98. Each computer—the design terminal 90 and the remote requester's computer (not shown) at the remote site 98—may include requisite data storage capability in the form of one or more volatile and non-volatile memory modules. The memory modules may include RAM (random access memory), ROM (read only memory) and HDD (hard disk drive) storage. Memory storage is desirable in view of sophisticated computer simulation and graphics performed by the all-hex conversion software according to the present invention.

The all-hex conversion software according to the present invention may be initially stored on a portable data storage medium, e.g., a floppy diskette 94, a compact disc 96, a data cartridge (not shown) or any other magnetic or optical data storage medium. The design terminal 90 may include appropriate disk drives to receive the portable data storage medium and to read the program code stored thereon, thereby facilitating execution of the all-hex conversion software. In one embodiment, the all-hex conversion software is written in C and C++ and executed on any of Windows® 95/98/NT/2000 operating systems. It is noted, however, that any suitable computer programming language may be used to write the all-hex conversion software. The all-hex conversion software, upon execution by the design terminal 90, may cause the design terminal 90 to perform a variety of data processing and display tasks including, for example, display of an input hex-dominant mesh and a 3D all-hex mesh generated by converting the input hex-dominant mesh (using the methodology discussed later hereinbelow) on the computer screen 92, rotation (on the screen 92) of the 3D all-hex mesh or the input hex-dominant mesh in response to the commands received from the user operating the design terminal 90 or the commands received from the remote user at the site 98, transmitting the 3D all-hex mesh to the computer (not shown) at the remote site 98 so as to enable the remote user to view the 3D all-hex mesh and perform further analysis, etc.

Before discussing how the all-hex conversion software (and the all-hex conversion methodology of the present invention) generates 3D all-hex meshes, it is noted that the arrangement depicted in FIG. 10 may be used to provide a commercial, network-based all-hex mesh creation service. The network may be any communication network 100 including, for example, the Internet. In one embodiment, the user performing design and simulation at the remote site 98 may log into the all-hex mesh creation service provider's website and then send digital graphic files containing one or more hex-dominant meshes or 3D geometric structures for whom all-hex meshes are to be generated to the computer operator located at and operating the design terminal 90. The "local" computer operator may then use the all-hex conversion software residing on the design terminal 90 to generate the requested all-hex meshes. Thereafter, the local computer operator may transmit the resultant all-hex meshes to the service user at the remote site 98. Such a network-based all-hex mesh creation and engineering consultancy service may be offered to individuals, corporations, universities, etc., on a fixed-fee basis, on a per-operation basis or on any other payment plan mutually convenient to the service provider and the service recipient.

In an alternative embodiment, the network-based all-hex mesh creation service may be implemented without the aid of the all-hex conversion software of the present invention. Here, the operator at the design terminal 90 may utilize the all-hex conversion methodology of the present invention to manually perform the requested all-hex conversion and then to transmit the response back to the service user at the remote site 98.

Figure 11:
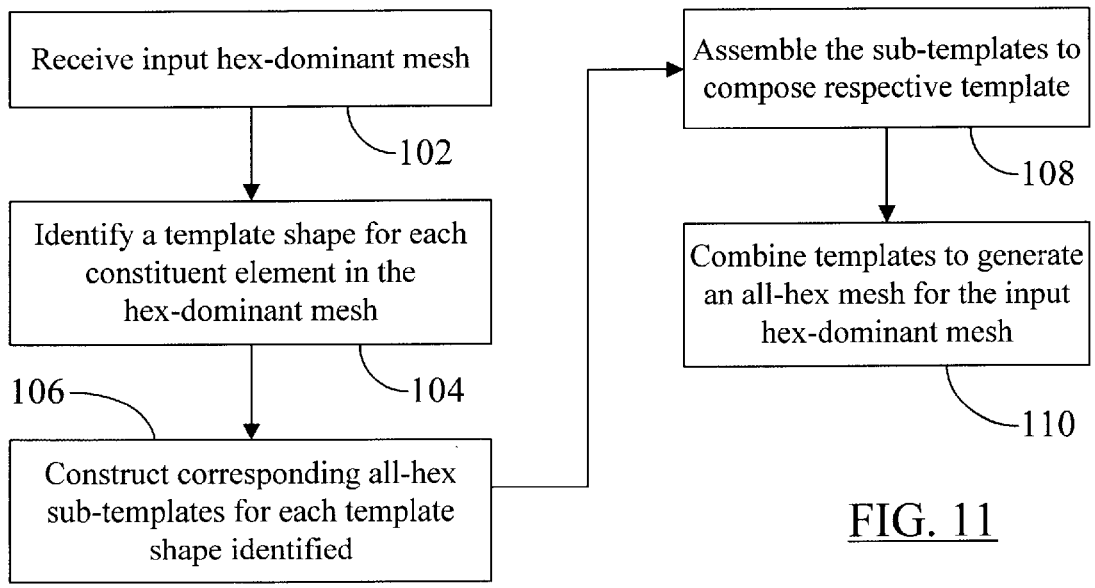
FIG. 11 illustrates a flowchart generally depicting the operations performed as part of the all-hex conversion methodology of the present invention.

FIG. 11 illustrates a flowchart generally depicting the operations performed as part of the all-hex conversion methodology of the present invention. It is noted that although the discussion given hereinbelow focuses on the all-hex conversion method of the present invention, it is evident that such a method may be easily embodied in a computer program code or software so as to automate the all-hex conversion process. As shown in FIG. 11, the all-hex conversion process according to the present invention operates on an input hex-dominant mesh received at block 102. At block 104, a corresponding template shape (e.g., a hex template for a hex element, a prism template for a prism element, etc.) is identified for each constituent element (e.g., a hex, a prism, a pyramid, etc.) in the input hex-dominant mesh. At block 106, the method includes constructing a group of sub-templates (called "cores" and "caps" as discussed in more detail hereinbelow) for each template shape identified at block 104. The sub-templates are modular in design and each of the sub-templates has either a rectangular or a triangular subdivision pattern on its external face. Because of the modular approach to all-hex template generation, the designer can mix and combine two subdivision patterns (rectangular and triangular) freely on the exterior surface of the final template. The sub-templates so defined are then assembled at block 108 to compose the corresponding template shape (e.g., a hex template, a prism template, etc.). It is noted that, after the assembly, the sub-templates closely fit with each other and maintain interface conformity at all sub-template interfaces within the resultant all-hex template. This provides a valid all-hex mesh when all the templates are combined to generate the all-hex mesh at block 110. The combining of templates at block 110 thus converts the input hex-dominant mesh into a mesh consisting of exclusively hexahedral elements. It is noted that the terms "template" and "template shape" are used interchangeably hereinbelow.

As noted hereinabove, the all-hex conversion method according to the present invention generates all-hex templates for hexes, prisms, and pyramids. However, as discussed hereinbefore, the difficulty of creating such all-hex templates comes from the fact that there exist two face subdivision patterns—a rectangular pattern and a triangular pattern—that may be mixed on the exterior faces of a hex, a prism, and a pyramid. The following discussion starts with a description of a modular template generation process for hexes according to the present invention. FIG. 12 shows an exemplary hex template 120 with six exterior faces 122. FIGS. 13A–13J show different combinations of rectangular and triangular patterns on exterior faces of the hex template 120 shown in FIG. 12. There are ten different hex templates in FIGS. 13A–13J because a hex template has six exterior faces, and each of the faces in FIGS. 13A–13J has either a rectangular or a triangular pattern. The number of exterior faces with a triangular pattern ranges from 0 to 6. In FIGS. 13A–13J, an exterior face with a triangular pattern is denoted by the numeral 124 and represented shaded. An exterior face with a rectangular pattern, on the other hand, is denoted by the numeral 123 and is unshaded. For example, in the hex template shown in FIG. 13A, all the exterior faces have a rectangular pattern thereon; and in the template shown in FIG. 13J, all the exterior faces have a triangular pattern thereon. In the hex template of FIG. 13E, three exterior faces have a rectangular pattern, and three other exterior faces have a triangular pattern.

For the cases where the number of exterior faces with a triangular pattern is 2, 3, and 4, there exist two topologically different ways to choose the exterior faces as illustrated in FIGS. 13C–13D, 13E–13F, and 13H–13G respectively. Among the ten cases in FIGS. 13A–13J, there are two cases for which there exists a known, trivial solution. The two cases are: a hex template with six rectangular patterned faces (FIG. 13A), and a hex template with two triangular patterned faces, one on the top and one on the bottom (FIG. 13D). Solutions to the other eight cases that can provide valid templates are not trivial.

The present invention focuses on a modular approach that provides a systematic method of constructing a family of modular sub-templates that can be assembled to form all-hex conversion templates. An all-hex template according to the present invention is not a single specific template. Instead, as mentioned hereinbefore with reference to FIG. 11, the all-hex template generation methodology according to the present invention first defines sub-templates, each of which has either rectangular or triangular subdivision patterns on its external faces, and then assembles these sub-templates together.

Figure 14:
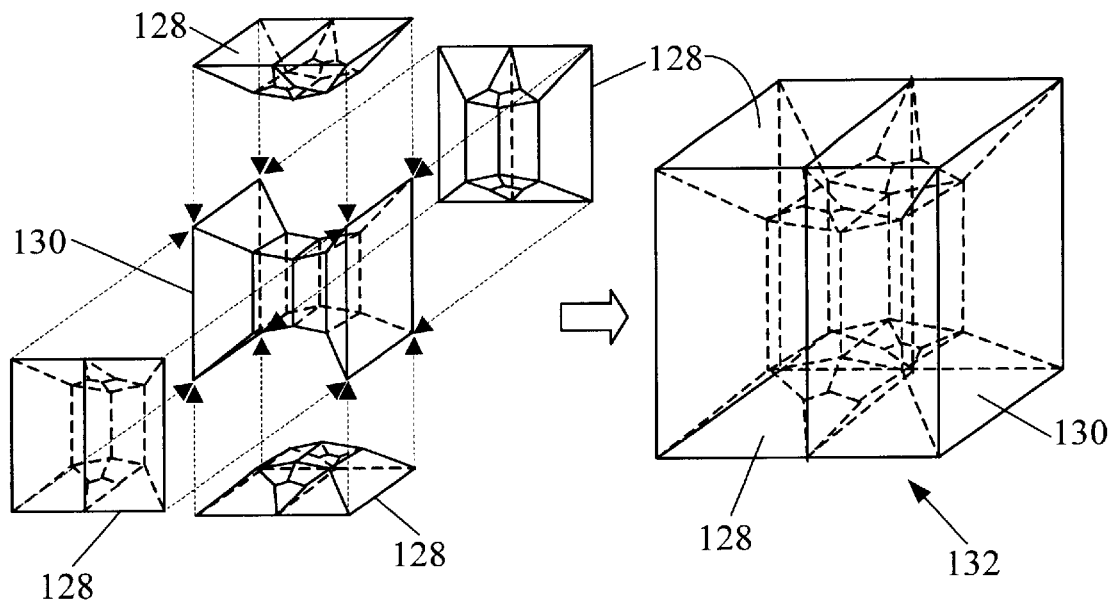
FIG. 14 shows assembly of an exemplary all-hex template (for a hex element) with modular sub-templates.

FIG. 14 shows assembly of an exemplary all-hex template 132 (for a hex element) with modular sub-templates 128, 130. The shape of the all-hex template (e.g., the template 132) is selected to correspond to the respective constituent element (here, a hex element for the template 132) in the input hex-dominant mesh structure. The all-hex template 132 uses two types of modular sub-templates, called cores 130 and caps 128. For a hex-element template (e.g., the template 132), one core 130 is defined to specify the subdivision patterns of two exterior faces of the corresponding hex element and four caps 128 are defined to specify the subdivision patterns of the other four faces of the corresponding hex element as shown in FIG. 14. The modular approach to all-hex template generation is powerful because one can mix and combine two subdivision patterns—rectangular and triangular subdivision patterns—freely on the exterior surfaces of the respective hex element.

Figure 15:
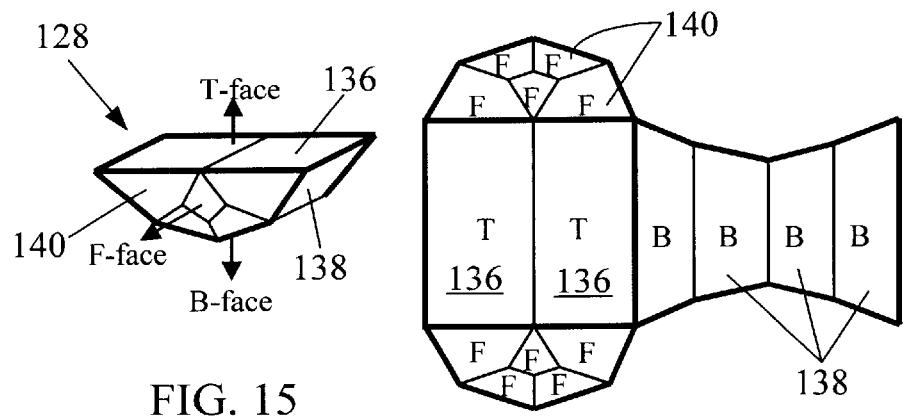
FIG. 15 illustrates different faces of a cap for a template for a hex element.

FIG. 15 illustrates different faces of a cap 128 for a template for a hex element. The cap 128 has three types of faces: T-faces (or top faces) 136, B-faces (or bottom faces) 138, and F-faces (or front/back faces) 140, as shown in FIG. 15. A layout of the faces for the cap 128 is also shown in the right-hand drawing in FIG. 15. For the embodiment illustrated in FIG. 15, there are two T-faces 136, ten F-faces 140, and four B-faces 138 in the cap 128. The T-faces (e.g., the faces 136 in FIG. 15) become a part of the exterior faces of the hex element for which an all-hex template (e.g., the template 132) is being generated. The B-faces 138 are connected to a core (e.g., the core 130 in FIG. 14), and the F-faces 140 are connected to an adjacent cap as illustrated in the structural view shown in FIG. 14. The design of a cap is very important to the modular template design according to the present invention. The F-faces 140 are on the front and back of the cap 128 as shown in FIG. 15.

Figure 16:
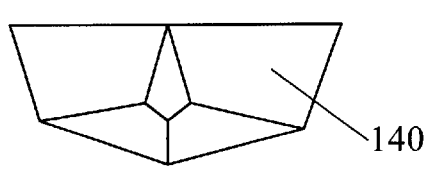
FIG. 16 shows a close-up view of a front side of a cap for a hex element containing an irregular subdivision pattern.

It is noted that each side of the cap 128 that contains the F-faces 140 (i.e., the front and the back of the cap 128) has an irregular subdivision pattern. FIG. 16 shows a close-up view of a front side of a cap (e.g., the cap 128 in FIG. 15) for a hex element containing an irregular subdivision pattern. Here, the reference numeral 140 is used to interchangeably refer to a front (or back) side of the cap 128 and an F-face of the cap 128. Thus, the cap 128 has the same problem that Mitchell's Geode template does-all the irregular faces need to be matched and shared with the next cap. Mitchell addressed this problem by assuming that all the Geodes are laid out in a closed shell-like volume, which is a strong restriction on the applicability of the template. In the present invention, this problem is solved by arranging four caps so that it forms a hoop, or a ring around the corresponding core as shown in FIG. 14. This way, all the irregular faces are matched and shared by adjacent caps without exposing them to the exterior of the template.

Figure 17:
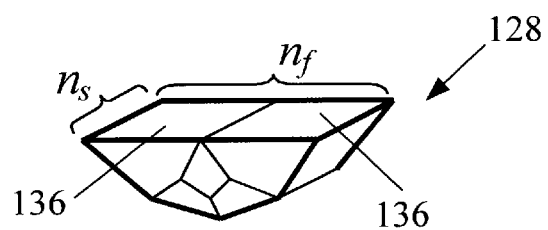
FIG. 17 reproduces the cap in FIG. 15 to illustrate some of the characteristics of a cap according to the present invention.
Figure 18:
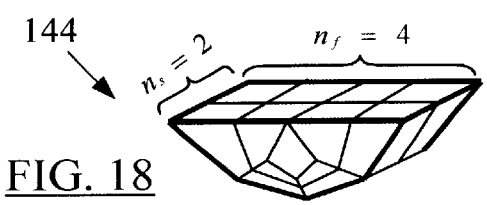
FIG. 18 shows an exemplary 2×4 rectangular cap.
Figure 19:
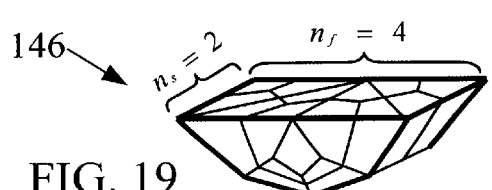
FIG. 19 shows an exemplary 2×4 triangular cap.

FIG. 17 reproduces the cap 128 in FIG. 15 to illustrate some of the characteristics of a cap according to the present invention. The characteristics of a cap are fully described by three factors: (1) the number of subdivision, $n_f$, of the two edges shared by a T-face and a B-face; (2) the number of subdivision, $n_s$, of the four edges shared by a T-face and an F-face; and (3) the type of the subdivision pattern (i.e., rectangular or triangular) of the T-faces. A cap is either an ($n_s \times n_f$) triangular cap or an ($n_s \times n_f$) rectangular cap. FIG. 18 shows an exemplary 2×4 rectangular cap 144, whereas FIG. 19 shows an exemplary 2×4 triangular cap 146.

It is noted that any two caps that have a same $n_f$ can be connected to each other with F-faces without losing the mesh conformity. Any cap whose $n_s$ is the same as $n_1$ of the corresponding core (see, for example, FIG. 25 for definition of parameter $n_1$) can be connected to slot-0 or slot-1 of that core. Similarly, any cap whose $n_s$ is the same as $n_2$ of the corresponding core (see, for example, FIG. 25 for a definition of parameter $n_2$) can be connected to slot-2 or slot-3 of that core. If T-faces of a cap have a triangular pattern, a triangular face of a pyramid, tet or prism can be attached to these T-faces. On the other hand, if T-faces have a rectangular pattern, a quadrilateral face of a hex or a prism can be attached to these T-faces.

Figure 20A:
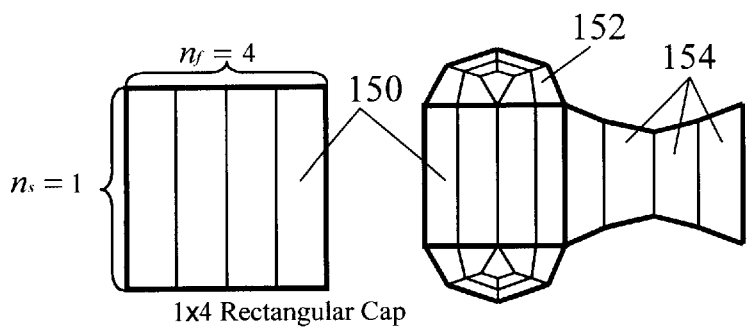
FIGS. 20A–20E illustrate five examples of some practically useful caps.
Figure 20B:
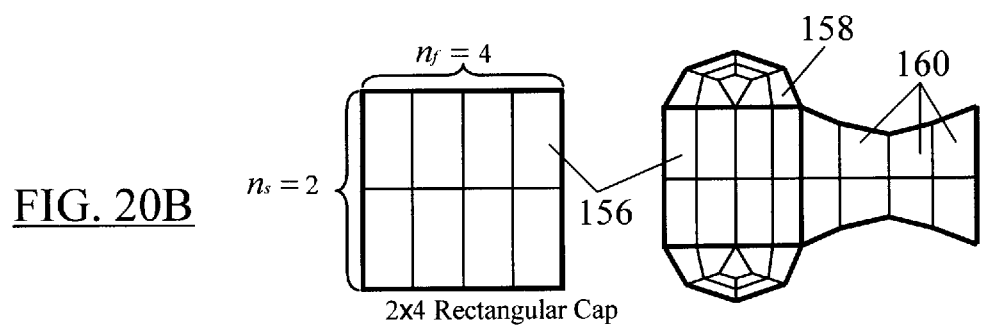
Figure 20C:
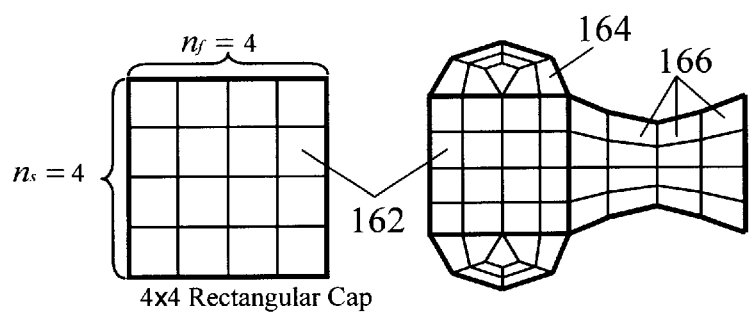
Figure 20D:
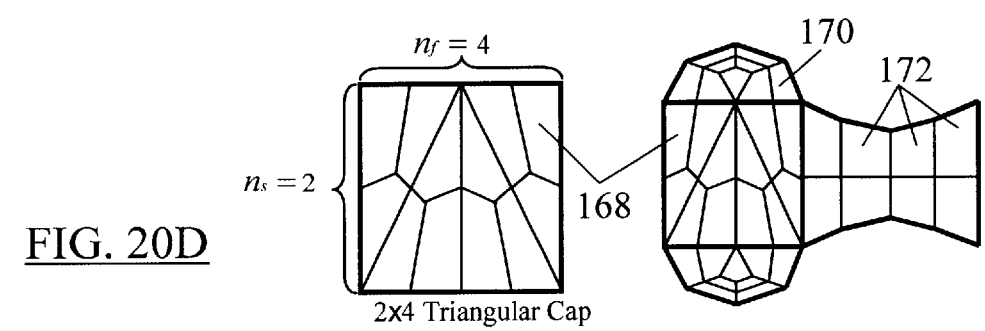
Figure 20E:
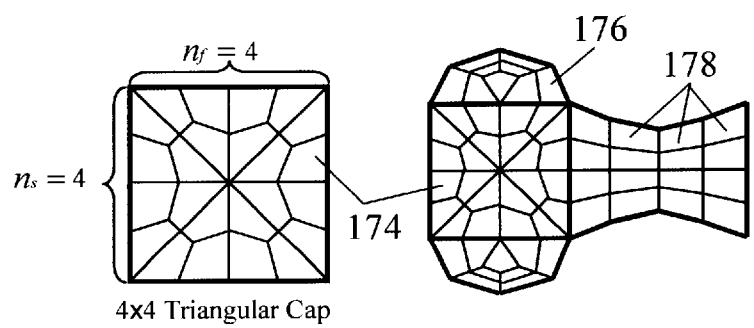

FIGS. 20A–20E illustrate five examples of some practically useful caps. FIG. 20A shows an exemplary 1×4 rectangular cap with corresponding T-faces 150, F-faces 152, and B-faces 154. FIG. 20B shows an exemplary 2×4 rectangular cap with corresponding T-faces 156, F-faces 158, and B-faces 160. FIG. 20C shows an exemplary 4×4 rectangular cap with corresponding T-faces 162, F-faces 164, and B-faces 166. FIG. 20D illustrates an exemplary 2×4 triangular cap with corresponding T-faces 168, F-faces 170, and B-faces 172. Finally, FIG. 20E illustrates an exemplary 4×4 triangular cap with corresponding T-faces 174, F-faces 176, and B-faces 178. Since each cap in FIGS. 20A–20E has $n_f$=4, each cap in FIGS. 20A–20E can be connected to the other one in FIGS. 20A–20E without losing the mesh conformity.

FIGS. 21A–21D illustrate an exemplary construction process for a cap 188 (FIG. 21D) with a triangular pattern on its T-faces 190 (FIG. 21D). As noted hereinbefore, each cap according to the present invention has one exterior face subdivided into either a rectangular or a triangular pattern. To distinguish between two different types of caps, a cap with a triangular pattern on its T-faces is referred to hereinbelow as a triangular cap and a cap with a rectangular pattern is referred to as a rectangular cap. A construction process for each type of cap is described now. Initially, as illustrated in FIG. 21A, an all-hex mesh 180 consisting of four hex elements 181, 182, 183 and 184 is selected and its one end (here, the top of element 181) is subdivided into a triangular pattern 185. Thereafter, the triangular pattern 185 is marched through the mesh 180 as illustrated in FIG. 21A. The triangular pattern 185 then reaches at the other end of the mesh 180 (here, the top surface of element 184) as shown in FIG. 21B. Next, the corners of the two ends of the respective top surfaces of elements 181 and 184 are joined as also shown in FIG. 21B. By joining two corners in this manner, the cap construction process creates a volumetric region 186 surrounded by inside faces of the mesh 180 as shown in FIG. 21C. The volumetric region 186 may be called a "pipe." The construction process then adds some hexes (in the embodiment of FIG. 21C, two hexes are added) and fills the pipe. Finally, an appropriate deformation, such as the free-form deformation described in Sederberg, T. W. and S. R. Parry, "Free-Form Deformation of Solid Geometric Models", Proceedings of SIGGRAPH, vol. 20, no. 4, 1986, pp. 151–160 (hereafter "Sederberg"), is applied to the pipe-filled mesh in FIG. 21C to obtain a new all-hex mesh (i.e., the cap 188) as shown in FIG. 21D. The disclosure of Sederberg is incorporated herein by reference in its entirety. The cap 188 may thus function as an all-hex sub-template for appropriate template (e.g., the template 132 in FIG. 14).

The cap 188 has T-faces 190, F-faces 192, and B-faces 194. Because the top faces 190 of the cap 188 form a triangular pattern, one can connect (to the cap 188) a diced tet, pyramid, or prism without losing the mesh conformity.

Similarly, FIGS. 22A–22B illustrate an exemplary construction process for a cap 198 (FIG. 22B) with a rectangular pattern on its T-faces 200 (FIG. 22B). Using a construction process similar to that discussed hereinbefore with reference to FIGS. 21A–21D, one end face of the all-hex mesh 180 can be subdivided into a rectangular pattern 196 to obtain a cap 198 with a rectangular pattern on its external face (here, the T-faces 200) as illustrated in FIGS. 22A and 22B. The rectangular cap 198 is also shown with its F-faces 202 and B-faces 204.

Figure 23:
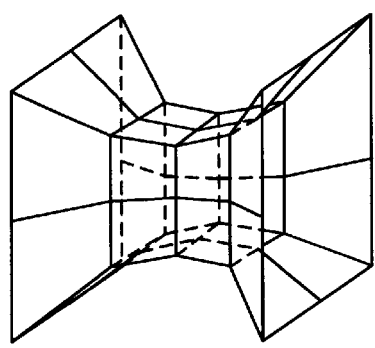
FIG. 23 illustrates an exemplary sub-template, called a "core"
Figure 24:
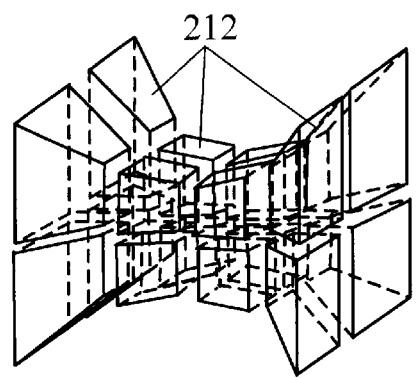
FIG. 24 shows an example of a subdivision of the core shown in FIG. 23.

An important property of this cap design is that both rectangular and triangular caps share the identical boundary face subdivision patterns (i.e., the subdivision patterns on the F-faces and the B-faces) except on the top face. It is especially convenient to have a simple rectangular pattern on both types of caps on the bottom face. A volumetric region surrounded by four 'hooped' caps (as illustrated in FIG. 14) is therefore a region surrounded by four rectangular patterns as shown in FIG. 23, which illustrates an exemplary sub-template 210 for the volumetric region surrounded by four hooped caps. The sub-template 210 shown in FIG. 23 is referred to as a "core", and the core 210 can be subdivided easily into a set of hexes. FIG. 24 shows an example of a subdivision of the core 210 shown in FIG. 23. The set of hexes 212 is clearly visible in the subdivided core 210 in FIG. 24.

Figure 25:
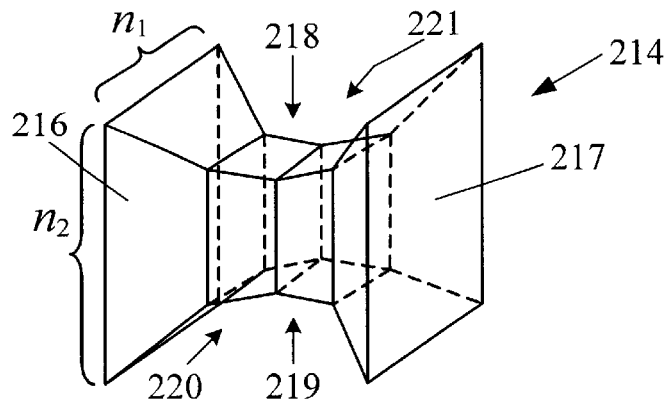
FIG. 25 shows details of an exemplary core according to the present invention.
Figure 26E:
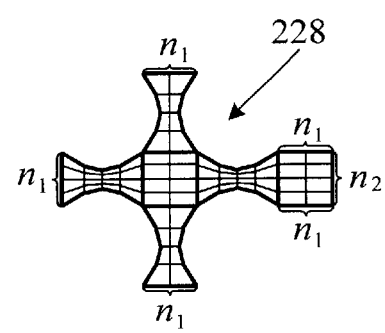
FIGS. 26A–26E illustrate an example of a 2×4 rectangular core.
Figure 26C:
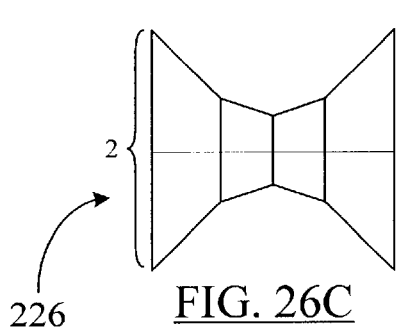
Figure 26A:
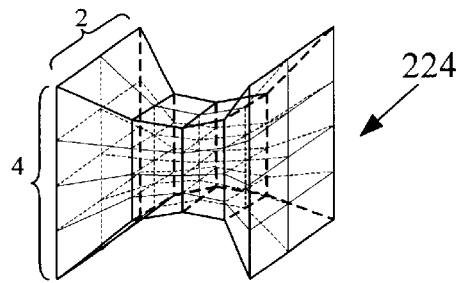
Figure 26D:
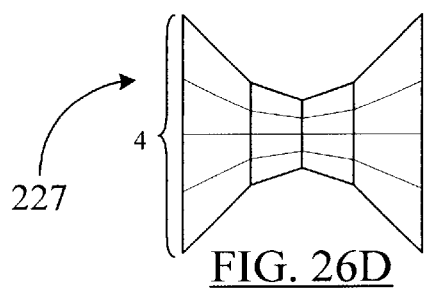
Figure 26B:
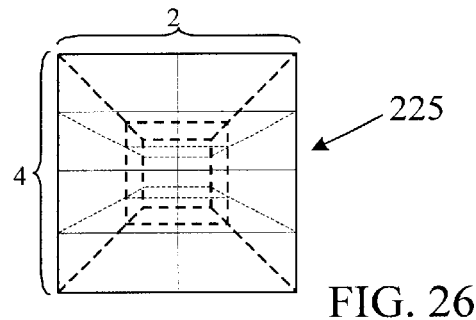

FIG. 25 shows details of an exemplary core 214 according to the present invention. The core 214 has two wing faces 216, 217 and four slots (slot-0 218, slot-1 219, slot-2 220, and slot-3 221) as shown in FIG. 25. Slots are spaces or "gaps" created when hexes of different shapes and sizes are combined to form a core as shown, for example, in FIG. 24. A cap "sits" in the corresponding "slot" as noted hereinbefore. Slot-0 218 and slot-1 219 are located on the top and bottom of the core 214 respectively, whereas slot-2 220 and slot-3 221 are located at the front and back of the core 214 respectively as shown in FIG. 25. The two wing faces 216–217 and three vertical, cross-sectional faces in FIG. 25 are all rectangles. In order to dice such a core into a set of smaller hexes, one can subdivide two sets of parallel edges (vertical and horizontal) into a same number of line segments. This will subdivide the two wing faces and three cross-sectional faces into a structured rectangular grid pattern. The parameter "$n_1$" is used to denote the number of sub-edges in the horizontal direction, and the parameter "$n_2$" is used to denote the number of sub-edges in the vertical direction as shown in FIG. 25. Then, the number of subdivisions of slot-0 218 and slot-1 219 is given by $n_1$, and the number of subdivisions of slot-2 220 and slot-3 221 is given by $n_2$. Such a core may be called an ($n_1 \times n_2$) rectangular core. FIGS. 26A–26E illustrate an example of a 2×4 rectangular core 224. FIG. 26B shows the side view 225, FIG. 26C shows the top view 226, and FIG. 26D shows the front view 227 of the 2×4 rectangular core 224 shown in FIG. 26A. FIG. 26E shows a layout 228 depicting all the faces of the 2×4 rectangular core 224 in FIG. 26A.

Figure 7:
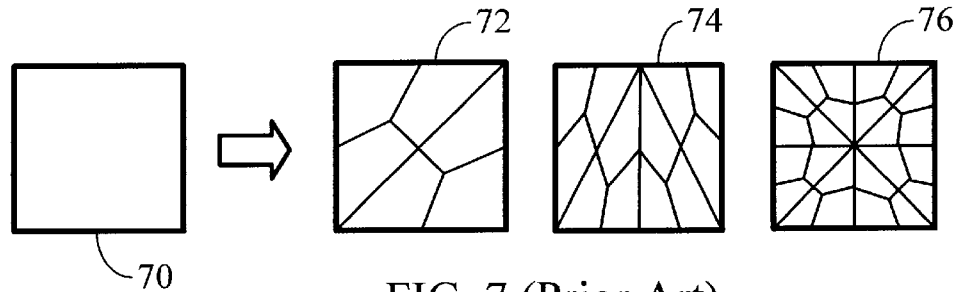
FIG. 7 illustrates splitting of the bottom quadrilateral face of a pyramid using the known tet template.

Another type of core is a triangular core, which has a triangular subdivision pattern on the two wing faces. FIG. 27A shows an exemplary 4×4 triangular subdivision pattern 240, and FIG. 27B shows an exemplary 4×4 triangular core 242 with the 4×4 triangular subdivision pattern 240 of FIG. 27A on its wing faces. Because the core 242 in FIG. 27B has a 4×4 triangular pattern on its wing faces, the core 242 is called a 4×4 triangular core. By choosing a different triangular subdivision pattern (some examples of which are shown in FIG. 7), and by applying the selected triangular subdivision pattern to the wing faces of a core, one can create different types of triangular cores such as a 4×2 triangular core (not shown), 2×2 triangular core (not shown), etc.

The foregoing described how to construct various caps and cores. FIG. 28 illustrates an example of how a core 244 is assembled, and FIG. 29 illustrates how a cap 250 is assembled as part of the complete construction of an all-hex template (for a hex element) according to the present invention. As noted hereinbefore, one core and four caps may need to be assembled to construct a complete template for a hex. In order to assemble a core and caps the following node tables may be needed: (1) nodes on each slot of the core (e.g., the core 244), (2) nodes on B-faces of a cap (e.g., the cap 250), and (3) nodes on F-faces of a cap (e.g., the cap 250). The following notations are used hereinbelow: (1) The node tables of slot "p" ($0 \leq p \leq 3$) are denoted as $s_i^p$ (as shown, for example, in FIG. 28); (2) the nodes on the B-faces are denoted as $b_j^p$ (as shown, for example, in FIG. 29); (3) the nodes on the front F-faces are denoted as $f_k^{pf}$ (as shown, for example, in FIG. 29); (4) the nodes on the back F-faces are denoted as $f_k^{pb}$ (as shown, for example, in FIG. 29); (5) "$n_1$" denotes the number of subdivision of slot-0 and slot-1 of the core; (6) "$n_2$" denotes the number of subdivision of slot-2 and slot-3 of the core; (7) $n_s^p$ denotes "$n_s$" of cap "p"; and (8) $n_f^p$ denotes "$n_f$" of cap "p".

The node tables are used to generate a core and a cap, and all the nodes should be ordered consistently according to the order illustrated in FIGS. 28 and 29. For example, as shown in FIG. 28, the nodes on the core 244 are ordered starting with node 246 and ending with node 248. In FIG. 29, the nodes on the B-faces of the cap 250 are ordered starting with node 252 and ending with node 254, the nodes on the front F-faces of the cap 250 are ordered starting with the node 256 and ending with the node 258, and the nodes on the back F-faces of the cap 250 are ordered starting with the node 260 and ending with the node 262. The length of table $s_i^p$ is 5 ($n_1$+1) for p=0,1, and 5($n_2$+1) for p=2,3. The length of table bi is 5($n_s^p$+1). The length of $f_k^{pb}$ is $$5\left(\frac{n_f^p}{2} - 1\right) + 4.$$

Some exemplary node tables are provided hereinbelow as part of the examples of the data for various cores and caps generated according to the present invention.

Because cap "p" is connected to slot "p", the following conditions must be satisfied:

$$n_s^0 = n_s^1 = n_1, \; n_s^2 = n_s^3 = n_2 \tag{1}$$

If the conditions in equation (1) are not satisfied, the length of table $s_i^p$ does not match the length of table $b_j^p$, and thus the cap and the slot cannot be connected. Also, in order to form a hoop of caps, the following conditions must be satisfied:

$$n_f^0 = n_f^1 = n_f^2 = n_f^3 \tag{2}$$

If the conditions in equation (2) are not satisfied, the length of tables $f_k^{pf}$ does not match the length of the corresponding $f_k^{pb}$ (and vice-versa), and thus caps cannot be connected.

The foregoing provides sufficient information necessary to assemble an all-hex template for a hex element. FIG. 30 illustrates an example of how nodes on a core 274 and four caps 266, 268, 270, 272 are joined to form an all-hex template. After each cap (i.e., each of the caps 266, 268, 270 and 272) is formed (using the construction process described hereinbefore) and oriented properly so that it fits its matching slot on the core 274, nodes are joined together as shown in FIG. 30.

It is again noted that the interior pattern of T-faces (of a cap) has nothing to do with this assembly process. Thus, one can choose the combination of caps arbitrarily as long as equation (1) and equation (2) are both satisfied.

The foregoing explains how to generate two types of standard cores, a triangular core and a rectangular core, and two types of caps, triangular caps and rectangular caps. By combining these two types of cores and caps one can obtain various all-hex templates for a hex element. The foregoing discussion covers all the ten triangular and rectangular pattern combinations listed in FIGS. 13A–13J, except the one shown in FIG. 13F. The combination of three triangular patterned faces and three rectangular patterned faces shown in FIG. 13F requires a non-standard core that has one triangular wing face and one rectangular wing face. The discussion given hereinbelow explains how to realize such a non-standard core.

Figure 31:
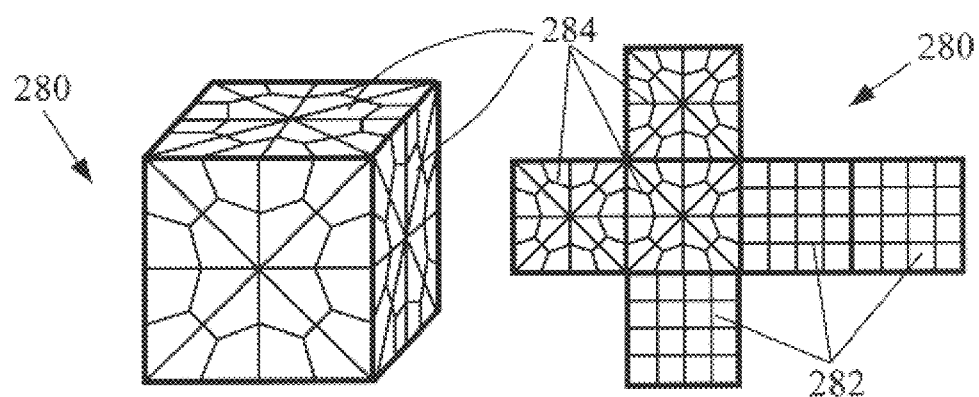
FIG. 31 shows an example of an all-hex template (for a hex element) with three 4×4 triangular patterns and three 4×4 rectangular patterns.
Figure 32A:
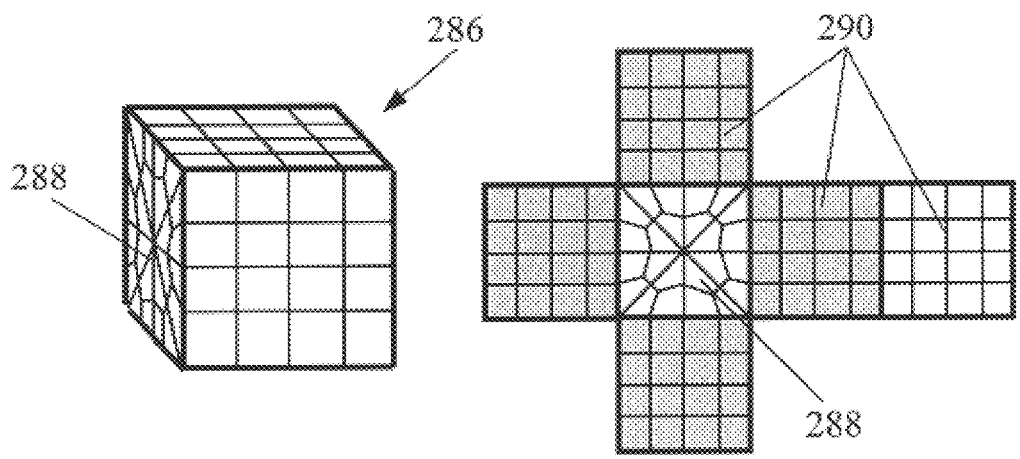
FIG. 32A shows an example of an all-hex template (for a hex element) that is assembled with a 4×4 rectangular core, a 4×4 triangular cap and three 4×4 rectangular caps and then rotated 90 degrees to the left.
Figure 32B:
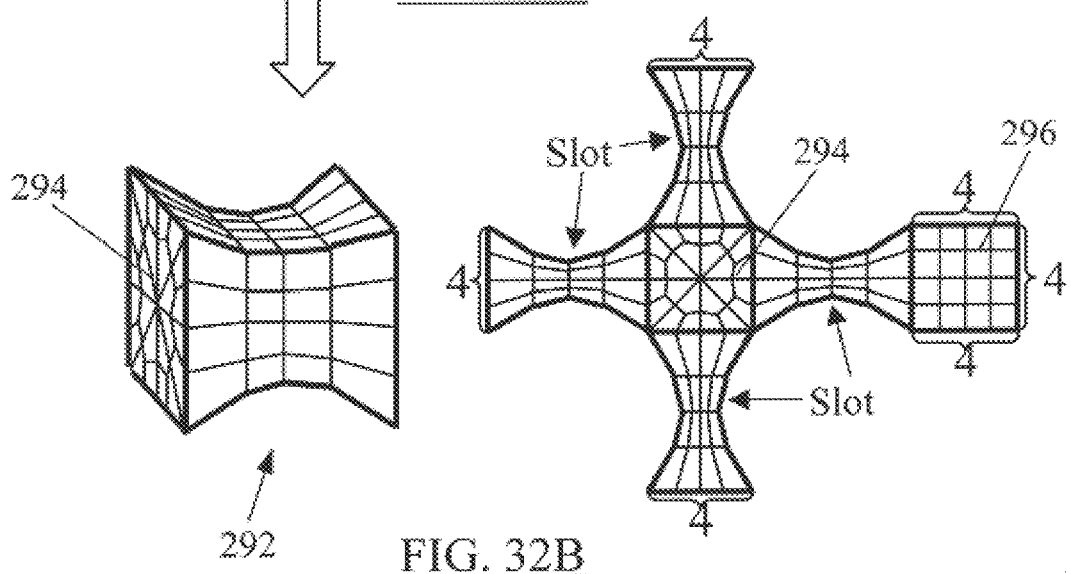
FIG. 32B shows the all-hex template of FIG. 32A with the narrowed center.
Figure 33:
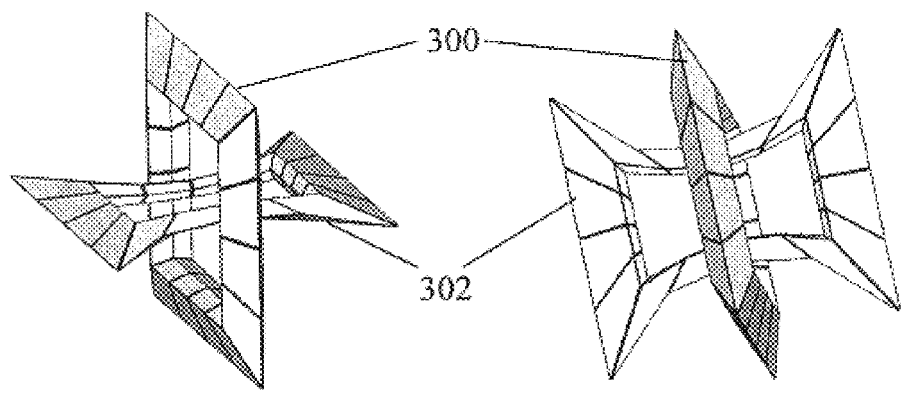
FIG. 33 shows the two hoops of caps present in the non-standard core of FIG. 32B.

The non-standard cores are required in: (1) covering all the ten combinations of triangular and rectangular patterned faces shown in FIGS. 13A–13J, and (2) generating all-hex templates for a prism element. As pointed out earlier, a combination of three triangular patterned faces and three rectangular patterned faces, as shown in FIG. 13F, requires a non-standard core with one triangular patterned face and one rectangular patterned face. FIG. 31 shows an example of an all-hex template (for a hex element) 280 with three 4×4 triangular patterns 284 and three 4×4 rectangular patterns 282. The all-hex template 280 requires a non-standard core with one rectangular patterned face and one triangular patterned face. In order to make this new core with one triangular wing face and one rectangular wing face, an all-hex template (for a hex element) is first assembled with a 4×4 rectangular core, a 4×4 triangular cap and three 4×4 rectangular caps. FIG. 32A shows an example of an all-hex template (for a hex element) 286 that is assembled with a 4×4 rectangular core, a 4×4 triangular cap and three 4×4 rectangular caps and then rotated 90 degrees to the left. As shown in FIG. 32A, only one face of the template 286 has a 4×4 triangular pattern 288 and all other faces have a 4×4 rectangular pattern 290. After assembling the template 286, the center of the mesh is narrowed. FIG. 32B shows the all-hex template 286 of FIG. 32A with the narrowed center. With the narrowing of the center, the mesh in FIG. 32A becomes a 4×4 core 292 that has only one wing face with a 4×4 triangular pattern 294. The other wing face has a 4×4 rectangular pattern 296 as shown in FIG. 32B. The core 292 in FIG. 32B may be called a 4×4 "double hoop core" because two hoops of caps exist in this template. FIG. 33 shows the two hoops of caps 300, 302 present in the non-standard core 292 of FIG. 32B. The non-standard core 292 may then be used with two 4×4 triangular caps and two 4×4 rectangular caps to generate the all-hex template 280 shown in FIG. 31.

Figures 34A, 34B:
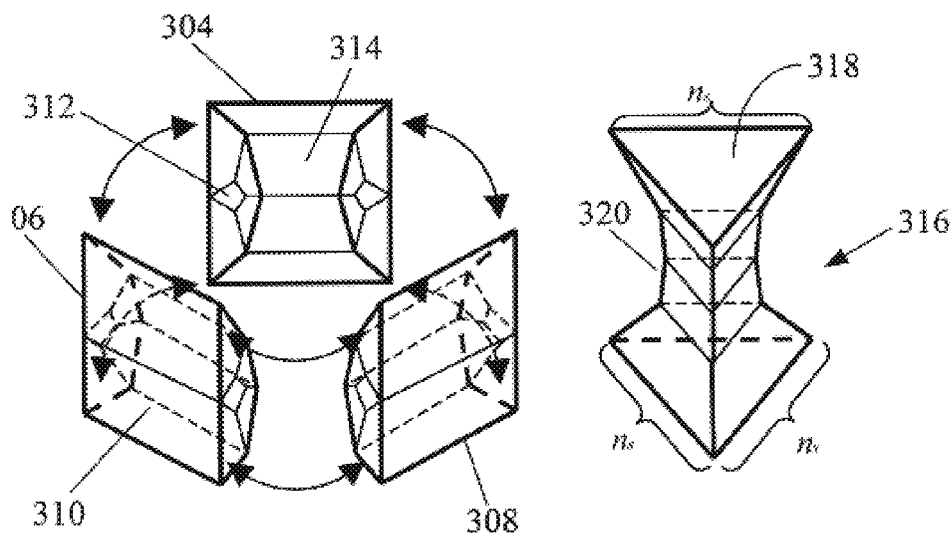
FIG. 34A shows a hoop of three exemplary caps for an all-hex template for a prism element.
FIG. 34B shows an exemplary core for an all-hex template for a prism element.

The discussion so far has focused on all-hex templates for a hex element. However, it is noted that all-hex templates for a prism element can be developed in a way similar to that discussed for the hex element. However, there are two differences between an all-hex template for a prism element and an all-hex template for a hex element. They are: (1) the two wing faces of a core for a prism element are triangles, and (2) a hoop of caps in an all-hex template for a prism element consists of only three caps. FIG. 34A shows a hoop of three exemplary caps 304, 306, 308 for an all-hex template for a prism element; and FIG. 34B shows an exemplary core 316 for an all-hex template for a prism element. For the caps shown in FIG. 34A, the T-faces 310 of each cap have a rectangular subdivision pattern, the F-faces 312 have an irregular subdivision pattern, and the B-faces 314 have a rectangular subdivision pattern. Each wing face 318 (the bottom wing face is not visible in FIG. 34B) in the core 316 has a triangular subdivision pattern thereon, whereas each slot 320 has a rectangular subdivision pattern as shown in FIG. 34B.

Figures 35, 36:
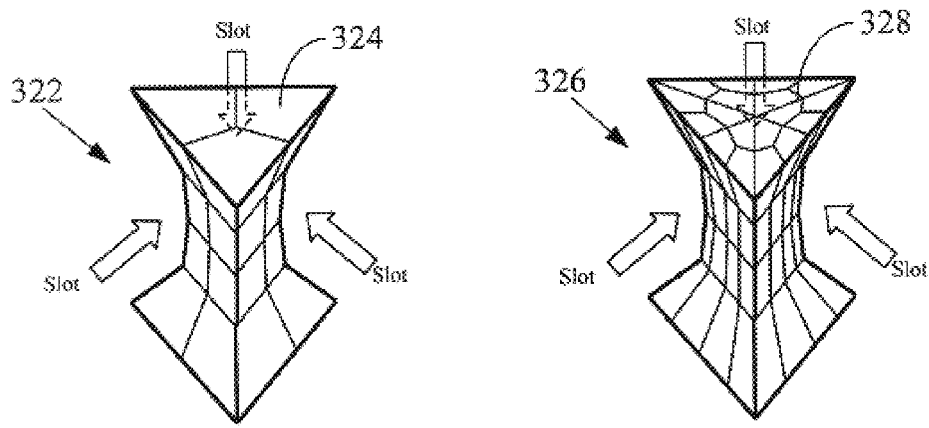
FIGS. 35 and 36 illustrate two examples of how the two wing faces in a core for a prism element can be subdivided in various ways.

FIGS. 35 and 36 illustrate two examples of how the two wing faces in a core for a prism element can be subdivided in various ways. FIG. 35 shows a prism core 322 with one type of triangular pattern on the wing faces 324 (the bottom wing face is not visible); and FIG. 36 shows another prism core 326 with a different type of triangular pattern on the wing faces 328 (the bottom wing face is not visible). By sweeping the two wing faces' subdivision pattern throughout the respective core, one can obtain an all-hex mesh. Thereafter, three 4×n caps can be attached to the respective prism core's three slots. The subdivision pattern of each cap's (e.g., caps 304, 306 and 308 in FIG. 34A) T-faces can be either triangular or rectangular, similar to the patterns on the T-faces of caps in an all-hex template for a hex element discussed hereinbefore. The core shown in FIG. 35 may be referred to as a "2×prism core" and the core in FIG. 36 may be referred to as a "4×prism core."

In a similar manner, other types of irregular cores can also be created. FIGS. 37A–37C illustrate three examples of irregular cores created according to the present invention. The core 334 in FIG. 37A takes one 4×n cap and three 2×n caps. The core 338 in FIG. 37C takes one 4×n cap, one 6×n cap and two 2×n caps. FIG. 37B shows a more irregular core 336 that has five-sided wing faces and takes five 2×n caps. The basic scheme of the core shown in FIG. 37B can be extended to make all-hex templates for a general prism with n-sided wing faces.

The discussion given hereinbelow provides two different solutions to Schneiders' Open Problem using the all-hex templates according to the present invention. The first solution uses all-hex templates for hexes, and the second solution uses all-hex templates for prisms. In the first solution to Schneiders' Open Problem, a template 340 shown in FIG. 38 is created. FIG. 38 shows the template 340 for a hex element along with a layout of that template. The template 340 is an all-hex template (for a hex element) created according to the present invention by combining a 2×1 rectangular core 342, two 1×4 rectangular caps 344, a 2×4 triangular cap 346, and a 2×4 rectangular cap 348. The x-y-z axes are shown within the template 340 for reference, and the x,y,z coordinates are denoted by the triplet (x,y,z). The template 340 may be oriented along the x-y-z axes in such a manner that a bounding box for the template 340 is (−1.0,−1.0,−1.0) to (1.0,1.0,1.0). The template 340 is then deformed by applying the following coordinate transformation:

$$s_x = \frac{|2-y|}{2} \quad (3)$$

$$s_z = \frac{s_x \cdot |x+2|}{3} \quad (4)$$

$$d_y = \frac{1-|x|\cdot s_x}{5} \quad (5)$$

-continued $$x' = x \cdot s_x \quad (6)$$

$$y' = \frac{y+1}{4} + d_y \quad (7)$$

$$z' = z \cdot s_z \quad (8)$$

Figures 40A, 40B, 40C:
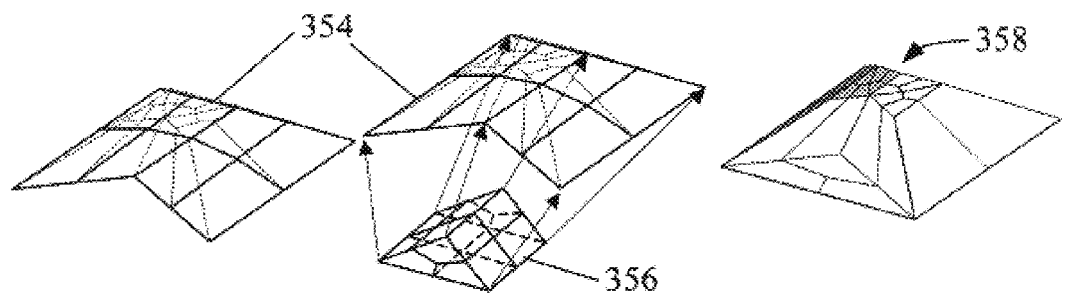
FIG. 40A shows the bottom face of the deformed template shown in FIG. 39.
FIG. 40B shows a diced prism attached to the deformed template of FIG. 39 from the bottom.
FIG. 40C shows the resulting mesh created after the diced prism is attached to the deformed template from the bottom as shown in FIG. 40B.
Figures 41A, 41B:
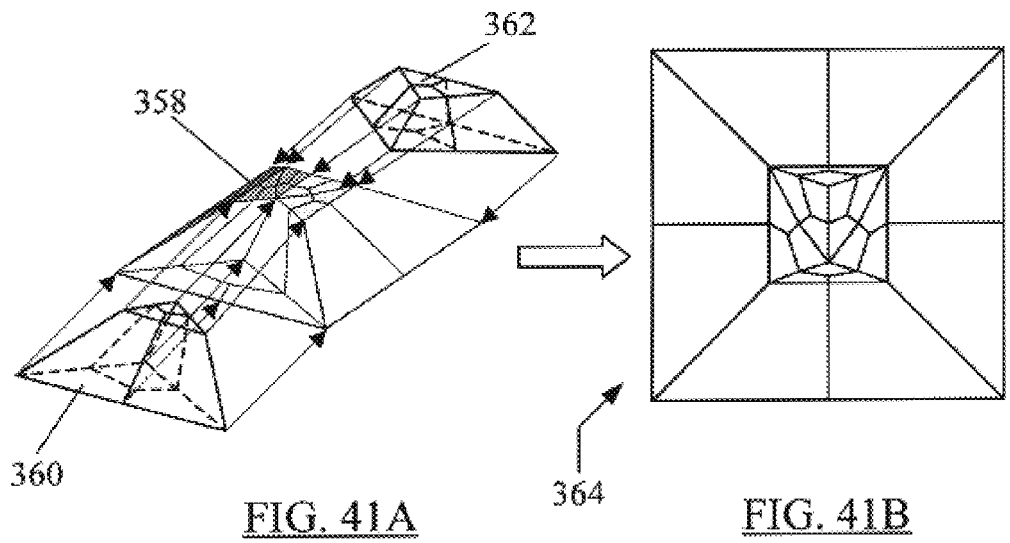
FIG. 41A illustrates how two more diced prisms are attached to the resulting mesh shown in FIG. 40C.
FIG. 41B shows the top view of the first intermediate mesh after the assembly shown in FIG. 41A is performed.

FIG. 39 shows the template 340 in FIG. 38 before and after deformation. The deformation given by equations (3)–(8) transforms the all-hex template 340 to the deformed template 350 shown in FIG. 39. At this point, it is observed that the bottom face of the deformed template 350 has a 2×4 rectangular pattern. FIG. 40A shows the bottom face 354 of the deformed template 350 shown in FIG. 39. The 2×4 rectangular pattern is visible in FIG. 40A. Thereafter, a diced prism 356 is attached to the deformed template 350 from the bottom as illustrated in FIG. 40B. FIG. 40C shows the resulting mesh 358 created after the diced prism 356 is attached to the deformed template 350 (of FIG. 39) from the bottom. After the diced prism is attached on the bottom, the bottom face becomes a 2×2 rectangular pattern, and this is the pattern that Schneiders' Open Problem demands. Next, two more diced prisms 360, 362 are attached to the resulting mesh 358 as shown in FIG. 41A. One of the diced prisms 360 is attached from the front and the other 362 is attached from the back as shown in FIG. 41A. The final mesh after attachment of diced prism 360, 362 is referred to hereinbelow as the "first intermediate mesh."

Figure 42:
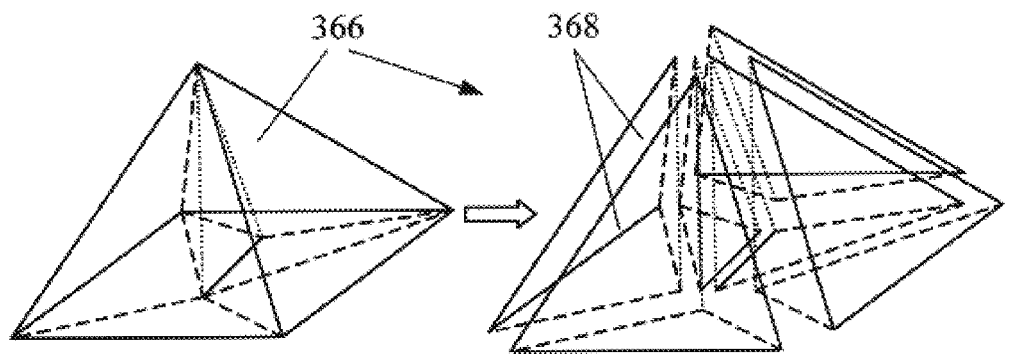
FIG. 42 shows a tet mesh and the hexes generated upon dicing the tet mesh.

FIG. 41B shows the top view 364 of the first intermediate mesh after the assembly shown in FIG. 41A is performed. In the top-view pattern 364, the inner square has a triangular pattern as shown in FIG. 41B. Thus, obviously one can attach six diced tets on the inner square. FIG. 42 shows a tet mesh 366 and the hexes 368 generated upon dicing the tet mesh 366. The tet mesh 366 in FIG. 42 is first made, and then diced into hexes 368. The hexes 368 are then attached to the inner square of the first intermediate mesh. The resulting mesh is referred to hereinbelow as the "second intermediate mesh." FIG. 43A illustrates the second intermediate mesh 370. FIG. 43B illustrates the top view 372 of the second intermediate mesh 370 shown in FIG. 43A. FIG. 44 shows the addition of four diced prisms 374, 376, 378, 380 to the second intermediate mesh 370 in FIG. 43A. Adding four diced prisms 374–380 from the four sides as shown in FIG. 44 gives a solution to Schneiders' Open Problem. During the procedure discussed hereinbefore with reference to FIGS. 38–44, because each interior face is always shared by two hexahedral elements, the final mesh (assembled as shown in FIG. 44) is valid.

As noted hereinbefore, the second solution to Schneiders' Open Problem is based on an all-hex template for a prism element. FIG. 45A shows creation of an all-hex template for a prism element according to the present invention. As illustrated in FIG. 45A, a 2×prism core 382, a 2×4 rectangular cap 384 and two 2×4 triangular caps 386, 387 are first combined to make an all-hex template for a prism. Thereafter, the template is oriented and scaled into the size shown in FIG. 45B. As shown in FIG. 45B, the T-faces of one of the 2×4 triangular caps are oriented in the position 388 on the x-y axis, and one of the wing faces of the core 382 is oriented in the position 390 on the y-z axis. After orientation and scaling, the template is deformed using the following coordinate transformation:

$$xx = x(1 - 0.5y) \quad (9)$$

$$yy = y/4 \quad (10)$$

$$zz = z \quad (11)$$

$$x' = xx \quad (12)$$

$$y' = yy + \frac{|1 - xx|}{5} \quad (13)$$

$$z' = zz\left(\frac{|xx|}{4} + 0.75\right) \quad (14)$$

FIG. 46 shows a deformed mesh 394 generated after the template shown in FIG. 45A is oriented and scaled according to FIG. 45B and then deformed using equations (9)–(14). Next, a diced prism 396 is attached to the deformed mesh 394 from the bottom as shown in FIG. 47. After attaching the diced prism, the bottom face of the combined mesh (in FIG. 47) has a 2×2 rectangular pattern, which Schneiders' Open Problem demands. FIG. 48A illustrates the exterior surface of the combined mesh 398 generated as shown in FIG. 47. The view in FIG. 48A illustrates the exterior surface seen when the mesh 398 is looked-at from the top. The topology of the exterior surface shown in FIG. 48A is exactly the same as the topology of a quadrilateral mesh derived from a triangular mesh 400 shown in FIG. 48B. Now, a point 402 and the triangular mesh 400 shown in FIG. 48B are connected to create a tet mesh as shown in FIG. 49. Thereafter, the tet mesh is diced and the node locations are moved so that they fit the mesh 398 shown in FIG. 48A. Finally, merging the diced tet mesh onto the mesh 398 shown in FIG. 48A results in another solution to Schneiders' Open Problem.

Figure 51:
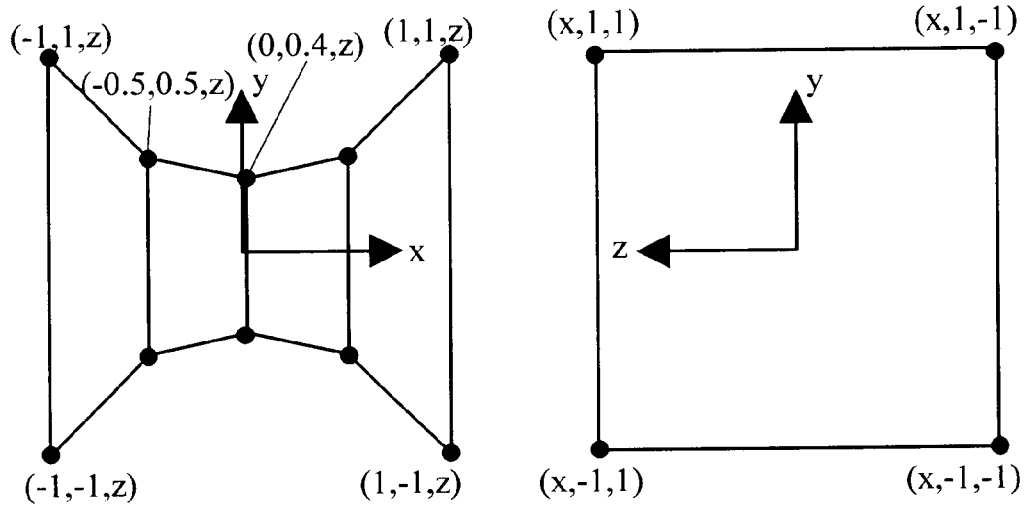
FIG. 51 shows an exemplary dimension layout for a non-prism core that is to be referred to when interpreting the coordinate entries in respective sub-template tables for non-prism cores.
Figure 52:
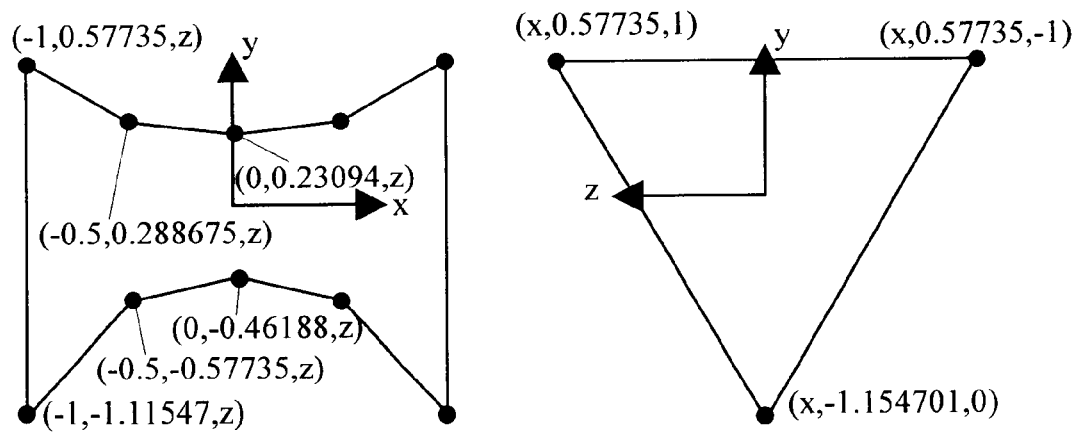
FIG. 52 shows an exemplary dimension layout for a prism core that is to be referred to when interpreting the coordinate entries in respective sub-template tables for prism cores.

FIG. 50 shows a data format table 510 that identifies the parameters used in some examples of sub-template tables generated for various cores and caps according to the present invention. Some of the parameters identified in the table 510 are also used in an example of a computer program (FIGS. 56A–56K) that assembles an all-hex template from a core and caps. In one embodiment, the program for the sub-template table generation and that given in FIGS. 56A–56K are part of the all-hex conversion software according to the present invention. Some exemplary sub-template tables 1–17 are given later hereinbelow. It is noted that some of these sub-template tables −17 show the topological connectivity of hex elements as well as the geometric data for nodes. FIG. 51 shows an exemplary dimension layout for a non-prism core that is to be referred to when interpreting the coordinate entries in respective sub-template tables for non-prism cores. FIG. 52 shows an exemplary dimension layout for a prism core that is to be referred to when interpreting the coordinate entries in respective sub-template tables for prism cores. FIG. 53 shows an exemplary dimension layout for a cap that is to be referred to when interpreting the coordinate entries in respective sub-template tables for different caps. FIG. 54 depicts a table 512 that shows the transformations necessary to move a cap to a slot of an n×4 core. FIG. 55 depicts a table 514 that shows the transformations necessary to move a cap to a slot of an n× prism core.

Sub-template Table-1 (2 × 1 Rectangular Core)

V 1.000000 1.000000 1.000000
V 1.000000 1.000000 0.000000
V 1.000000 1.000000 −1.000000
V 1.000000 −1.000000 1.000000
V 1.000000 −1.000000 0.000000

| Sub-template Table-1 (2 × 1 Rectangular Core) |
| --- |
| V 1.000000 −1.000000 −1.000000 |
| V 0.500000 0.500000 0.500000 |
| V 0.500000 0.500000 0.000000 |
| V 0.500000 0.500000 −0.500000 |
| V 0.500000 −0.500000 0.500000 |
| V 0.500000 −0.500000 0.000000 |
| V 0.500000 −0.500000 −0.500000 |
| V 0.000000 0.400000 0.400000 |
| V 0.000000 0.400000 0.000000 |
| V 0.000000 0.400000 −0.400000 |
| V 0.000000 −0.400000 0.400000 |
| V 0.000000 −0.400000 0.000000 |
| V 0.000000 −0.400000 −0.400000 |
| V −0.500000 0.500000 0.500000 |
| V −0.500000 0.500000 0.000000 |
| V −0.500000 0.500000 −0.500000 |
| V −0.500000 −0.500000 0.500000 |
| V −0.500000 −0.500000 0.000000 |
| V −0.500000 −0.500000 −0.500000 |
| V −1.000000 1.000000 1.000000 |
| V −1.000000 1.000000 0.000000 |
| V −1.000000 1.000000 −1.000000 |
| V −1.000000 −1.000000 1.000000 |
| V −1.000000 −1.000000 0.000000 |
| V −1.000000 −1.000000 −1.000000 |
| H 6 7 10 9 0 1 4 3 |
| H 7 8 11 10 1 2 5 4 |
| H 12 13 16 15 6 7 10 9 |
| H 13 14 17 16 7 8 11 10 |
| H 18 19 22 21 12 13 16 15 |
| H 19 20 23 22 13 14 17 16 |
| H 24 25 28 27 18 19 22 21 |
| H 25 26 29 28 19 20 23 22 |
| CN1 2 |
| CN2 1 |
| SLOT 0 |
| 0 1 2 |
| 6 7 8 |
| 12 13 14 |
| 18 19 20 |
| 24 25 26 |
| SLOT 1 |
| 5 4 3 |
| 11 10 9 |
| 17 16 15 |
| 23 22 21 |
| 29 28 27 |
| SLOT 2 |
| 3 0 |
| 9 6 |
| 15 12 |
| 21 18 |
| 27 24 |
| SLOT 3 |
| 2 5 |
| 8 11 |
| 14 17 |
| 20 23 |
| 26 29 |

| Sub-template Table-2 (4 × 1 Rectangular Core) |
| --- |
| V 1.000000 1.000000 1.000000 |
| V 1.000000 1.000000 0.500000 |
| V 1.000000 1.000000 0.000000 |
| V 1.000000 1.000000 −0.500000 |
| V 1.000000 1.000000 −1.000000 |
| V 1.000000 −1.000000 1.000000 |
| V 1.000000 −1.000000 0.500000 |
| V 1.000000 −1.000000 0.000000 |
| V 1.000000 −1.000000 −0.500000 |
| V 1.000000 −1.000000 −1.000000 |

| Sub-template Table-2 (4 × 1 Rectangular Core) |
| --- |
| V 0.500000 0.500000 0.500000 |
| V 0.500000 0.500000 0.250000 |
| V 0.500000 0.500000 0.000000 |
| V 0.500000 0.500000 −0.250000 |
| V 0.500000 0.500000 −0.500000 |
| V 0.500000 −0.500000 0.500000 |
| V 0.500000 −0.500000 0.250000 |
| V 0.50000Q −0.500000 0.000000 |
| V 0.500000 −0.500000 −0.250000 |
| V 0.500000 −0.500000 −0.500000 |
| V 0.000000 0.400000 0.400000 |
| V 0.000000 0.400000 0.200000 |
| V 0.000000 0.400000 0.000000 |
| V 0.000000 0.400000 −0.200000 |
| V 0.000000 0.400000 −0.400000 |
| V 0.000000 −0.400000 0.400000 |
| V 0.000000 −0.400000 0.200000 |
| V 0.000000 −0.400000 0.000000 |
| V 0.000000 −0.400000 −0.200000 |
| V 0.000000 −0.400000 −0.400000 |
| V −0.500000 0.500000 0.500000 |
| V −0.500000 0.500000 0.250000 |
| V −0.500000 0.500000 0.000000 |
| V −0.500000 0.500000 −0.250000 |
| V −0.500000 0.500000 −0.500000 |
| V −0.500000 −0.500000 0.500000 |
| V −0.500000 −0.500000 0.250000 |
| V −0.500000 −0.500000 0.000000 |
| V −0.500000 −0.500000 −0.250000 |
| V −0.500000 −0.500000 −0.500000 |
| V −1.000000 1.000000 1.000000 |
| V −1.000000 1.000000 0.500000 |
| V −1.000000 1.000000 0.000000 |
| V −1.000000 1.000000 −0.500000 |
| V −1.000000 1.000000 −1.000000 |
| V −1.000000 −1.000000 1.000000 |
| V −1.000000 −1.000000 0.500000 |
| V −1.000000 −1.000000 0.000000 |
| V −1.000000 −1.000000 −0.500000 |
| V −1.000000 −1.000000 −1.000000 |
| H 10 11 16 15 0 1 6 5 |
| H 11 12 17 16 1 2 7 6 |
| H 12 13 18 17 2 3 8 7 |
| H 13 14 19 18 3 4 9 8 |
| H 20 21 26 25 10 11 16 15 |
| H 21 22 27 26 11 12 17 16 |
| H 22 23 28 27 12 13 18 17 |
| H 23 24 29 28 13 14 19 18 |
| H 30 31 36 35 20 21 26 25 |
| H 31 32 37 36 21 22 27 26 |
| H 32 33 38 37 22 23 28 27 |
| H 33 34 39 38 23 24 29 28 |
| H 40 41 46 45 30 31 36 35 |
| H 41 42 47 46 31 32 37 36 |
| H 42 43 48 47 32 33 38 37 |
| H 43 44 49 48 33 34 39 38 |
| CN1 4 |
| CN2 1 |
| SLOT 0 |
| 0 1 2 3 4 |
| 10 11 12 13 14 |
| 20 21 22 23 24 |
| 30 31 32 33 34 |
| 40 41 42 43 44 |
| SLOT 1 |
| 9 8 7 6 5 |
| 19 18 17 16 15 |
| 29 28 27 26 25 |
| 39 38 37 36 35 |
| 49 48 47 46 45 |
| SLOT 2 |
| 5 0 |
| 15 10 |
| 25 20 |
| 35 30 |
| 45 40 |
| SLOT 3 |

Sub-template Table-2 (4 × 1 Rectangular Core)

4 9
14 19
24 29
34 39
44 49

Sub-template Table-3 (4 × 2 Rectangular Core)

V 1.000000 1.000000 1.000000
V 1.000000 1.000000 0.500000
V 1.000000 1.000000 0.000000
V 1.000000 1.000000 −0.500000
V 1.000000 1.000000 −1.000000
V 1.000000 0.000000 1.000000
V 1.000000 0.000000 0.500000
V 1.000000 0.000000 0.000000
V 1.000000 0.000000 −0.500000
V 1.000000 0.000000 −1.000000
V 1.000000 −1.000000 1.000000
V 1.000000 −1.000000 0.500000
V 1.000000 −1.000000 0.000000
V 1.000000 −1.000000 −0.500000
V 1.000000 −1.000000 −1.000000
V 0.500000 0.500000 0.500000
V 0.500000 0.500000 0.250000
V 0.500000 0.500000 0.000000
V 0.500000 0.500000 −0.250000
V 0.500000 0.500000 −0.500000
V 0.500000 0.000000 0.500000
V 0.500000 0.000000 0.250000
V 0.500000 0.000000 0.000000
V 0.500000 0.000000 −0.250000
V 0.500000 0.000000 −0.500000
V 0.500000 −0.500000 0.500000
V 0.500000 −0.500000 0.250000
V 0.500000 −0.500000 0.000000
V 0.500000 −0.500000 −0.250000
V 0.500000 −0.500000 −0.500000
V 0.000000 0.400000 0.400000
V 0.000000 0.400000 0.200000
V 0.000000 0.400000 0.000000
V 0.000000 0.400000 −0.200000
V 0.000000 0.400000 −0.400000
V 0.000000 0.000000 0.400000
V 0.000000 0.000000 0.200000
V 0.000000 0.000000 0.000000
V 0.000000 0.000000 −0.200000
V 0.000000 0.000000 −0.400000
V 0.000000 −0.400000 0.400000
V 0.000000 −0.400000 0.200000
V 0.000000 −0.400000 0.000000
V 0.000000 −0.400000 −0.200000
V 0.000000 −0.400000 −0.400000
V −0.500000 0.500000 0.500000
V −0.500000 0.500000 0.250000
V −0.500000 0.500000 0.000000
V −0.500000 0.500000 −0.250000
V −0.500000 0.500000 −0.500000
V −0.500000 0.000000 0.500000
V −0.500000 0.000000 0.250000
V −0.500000 0.000000 0.000000
V −0.500000 0.000000 −0.250000
V −0.500000 0.000000 −0.500000
V −0.500000 −0.500000 0.500000
V −0.500000 −0.500000 0.250000
V −0.500000 −0.500000 0.000000
V −0.500000 −0.500000 −0.250000
V −0.500000 −0.500000 −0.500000
V −1.000000 1.000000 1.000000
V −1.000000 1.000000 0.500000
V −1.000000 1.000000 0.000000
V −1.000000 1.000000 −0.500000

Sub-template Table-3 (4 × 2 Rectangular Core)

V −1.000000 1.000000 −1.000000
V −1.000000 0.000000 1.000000
V −1.000000 0.000000 0.500000
V −1.000000 0.000000 0.000000
V −1.000000 0.000000 −0.500000
V −1.000000 0.000000 −1.000000
V −1.000000 −1.000000 1.000000
V −1.000000 −1.000000 0.500000
V −1.000000 −1.000000 0.000000
V −1.000000 −1.000000 −0.500000
V −1.000000 −1.000000 −1.000000
H 15 16 21 20 0 1 6 5
H 16 17 22 21 1 2 7 6
H 17 18 23 22 2 3 8 7
H 18 19 24 23 3 4 9 8
H 20 21 26 25 5 6 11 10
H 21 22 27 26 6 7 12 11
H 22 23 28 27 7 8 13 12
H 23 24 29 28 8 9 14 13
H 30 31 36 35 15 16 21 20
H 31 32 37 36 16 17 22 21
H 32 33 38 37 17 18 23 22
H 33 34 39 38 18 19 24 23
H 35 36 41 40 20 21 26 25
H 36 37 42 41 21 22 27 26
H 37 38 43 42 22 23 28 27
H 38 39 44 43 23 24 29 28
H 45 46 51 50 30 31 36 35
H 46 47 52 51 31 32 37 36
H 47 48 53 52 32 33 38 37
H 48 49 54 53 33 34 39 38
H 50 51 56 55 35 36 41 40
H 51 52 57 56 36 37 42 41
H 52 53 58 57 37 38 43 42
H 53 54 59 58 38 39 44 43
H 60 61 66 65 45 46 51 50
H 61 62 67 66 46 47 52 51
H 62 63 68 67 47 48 53 52
H 63 64 69 68 48 49 54 53
H 65 66 71 70 50 51 56 55
H 66 67 72 71 51 52 57 56
H 67 68 73 72 52 53 58 57
H 68 69 74 73 53 54 59 58
CN1 4
CN2 2
SLOT 0
0 1 2 3 4
15 16 17 18 19
30 31 32 33 34
45 46 47 48 49
60 61 62 63 64
SLOT 1
14 13 12 11 10
29 28 27 26 25
44 43 42 41 40
59 58 57 56 55
74 73 72 71 70
SLOT 2
10 5 0
25 20 15
40 35 30
55 50 45
70 65 60
SLOT 3
4 9 14
19 24 29
34 39 44
49 54 59
64 69 74

| Sub-template Table-4 (4 × 4 Triangular Core) |
| --- |
| V 1.000000 −1.000000 −1.000000 |
| V 1.000000 1.000000 −1.000000 |
| V 1.000000 1.000000 1.000000 |
| V 1.000000 −1.000000 1.000000 |
| V 1.000000 0.000000 −1.000000 |
| V 1.000000 1.000000 0.000000 |
| V 1.000000 0.000000 1.000000 |
| V 1.000000 −1.000000 0.000000 |
| V 1.000000 −0.500000 −1.000000 |
| V 1.000000 0.500000 −1.000000 |
| V 1.000000 1.000000 −0.500000 |
| V 1.000000 1.000000 0.500000 |
| V 1.000000 0.500000 1.000000 |
| V 1.000000 −0.500000 1.000000 |
| V 1.000000 −1.000000 0.500000 |
| V 1.000000 −1.000000 −0.500000 |
| V 1.000000 0.000000 0.000000 |
| V 1.000000 0.000000 −0.500000 |
| V 1.000000 0.000000 0.500000 |
| V 1.000000 0.500000 0.000000 |
| V 1.000000 −0.500000 0.000000 |
| V 1.000000 −0.500000 −0.500000 |
| V 1.000000 0.500000 −0.500000 |
| V 1.000000 0.500000 0.500000 |
| V 1.000000 −0.500000 0.500000 |
| V 1.000000 −0.333333 0.666667 |
| V 1.000000 −0.666667 0.333333 |
| V 1.000000 −0.666667 −0.333333 |
| V 1.000000 −0.333333 −0.666667 |
| V 1.000000 0.333333 −0.666667 |
| V 1.000000 0.666667 −0.333333 |
| V 1.000000 0.666667 0.333333 |
| V 1.000000 0.333333 0.666667 |
| V 0.500000 −0.500000 −0.500000 |
| V 0.500000 0.500000 −0.500000 |
| V 0.500000 0.500000 0.500000 |
| V 0.500000 −0.500000 0.500000 |
| V 0.500000 0.000000 −0.500000 |
| V 0.500000 0.500000 0.000000 |
| V 0.500000 0.000000 0.500000 |
| V 0.500000 −0.500000 0.000000 |
| V 0.500000 −0.250000 −0.500000 |
| V 0.500000 0.250000 −0.500000 |
| V 0.500000 0.500000 −0.250000 |
| V 0.500000 0.500000 0.250000 |
| V 0.500000 0.250000 0.500000 |
| V 0.500000 −0.250000 0.500000 |
| V 0.500000 −0.500000 0.250000 |
| V 0.500000 −0.500000 −0.250000 |
| V 0.500000 0.000000 0.000000 |
| V 0.500000 0.000000 −0.250000 |
| V 0.500000 0.000000 0.250000 |
| V 0.500000 0.250000 0.000000 |
| V 0.500000 −0.250000 0.000000 |
| V 0.500000 −0.250000 −0.250000 |
| V 0.500000 0.250000 −0.250000 |
| V 0.500000 0.250000 0.250000 |
| V 0.500000 −0.250000 0.250000 |
| V 0.500000 −0.166667 0.333334 |
| V 0.500000 −0.333334 0.166667 |
| V 0.500000 −0.333334 −0.166667 |
| V 0.500000 −0.166667 −0.333334 |
| V 0.500000 0.166667 −0.333334 |
| V 0.500000 0.333334 −0.166667 |
| V 0.500000 0.333334 0.166667 |
| V 0.500000 0.166667 0.333334 |
| V 0.000000 −0.400000 −0.400000 |
| V 0.000000 0.400000 −0.400000 |
| V 0.000000 0.400000 0.400000 |
| V 0.000000 −0.400000 0.400000 |
| V 0.000000 0.000000 −0.400000 |
| V 0.000000 0.400000 0.000000 |
| V 0.000000 0.000000 0.400000 |
| V 0.000000 −0.400000 0.000000 |
| V 0.000000 −0.200000 −0.400000 |
| V 0.000000 0.200000 −0.400000 |
| V 0.000000 0.400000 −0.200000 |
| V 0.000000 0.400000 0.200000 |
| V 0.000000 0.200000 0.400000 |
| V 0.000000 −0.200000 0.400000 |
| V 0.000000 −0.400000 0.200000 |
| V 0.000000 −0.400000 −0.200000 |
| V 0.000000 0.000000 0.000000 |
| V 0.000000 0.000000 −0.200000 |
| V 0.000000 0.000000 0.200000 |
| V 0.000000 0.200000 0.000000 |
| V 0.000000 −0.200000 0.000000 |
| V 0.000000 −0.200000 −0.200000 |
| V 0.000000 0.200000 −0.200000 |
| V 0.000000 0.200000 0.200000 |
| V 0.000000 −0.200000 0.200000 |
| V 0.000000 −0.133333 0.266667 |
| V 0.000000 −0.266667 0.133333 |
| V 0.000000 −0.266667 −0.133333 |
| V 0.000000 −0.133333 −0.266667 |
| V 0.000000 0.133333 −0.266667 |
| V 0.000000 0.266667 −0.133333 |
| V 0.000000 0.266667 0.133333 |
| V 0.000000 0.133333 0.266667 |
| V −0.500000 −0.500000 −0.500000 |
| V −0.500000 0.500000 −0.500000 |
| V −0.500000 0.500000 0.500000 |
| V −0.500000 −0.500000 0.500000 |
| V −0.500000 0.000000 −0.500000 |
| V −0.500000 0.500000 0.000000 |
| V −0.500000 0.000000 0.500000 |
| V −0.500000 −0.500000 0.000000 |
| V −0.500000 −0.250000 −0.500000 |
| V −0.500000 0.250000 −0.500000 |
| V −0.500000 0.500000 −0.250000 |
| V −0.500000 0.500000 0.250000 |
| V −0.500000 0.250000 0.500000 |
| V −0.500000 −0.250000 0.500000 |
| V −0.500000 −0.500000 0.250000 |
| V −0.500000 −0.500000 −0.250000 |
| V −0.500000 0.000000 0.000000 |
| V −0.500000 0.000000 −0.250000 |
| V −0.500000 0.000000 0.250000 |
| V −0.500000 0.250000 0.000000 |
| V −0.500000 −0.250000 0.000000 |
| V −0.500000 −0.250000 −0.250000 |
| V −0.500000 0.250000 −0.250000 |
| V −0.500000 0.250000 0.250000 |
| V −0.500000 −0.250000 0.250000 |
| V −0.500000 −0.166667 0.333334 |
| V −0.500000 −0.333334 0.166667 |
| V −0.500000 −0.333334 −0.166667 |
| V −0.500000 −0.166667 −0.333334 |
| V −0.500000 0.166667 −0.333334 |
| V −0.500000 0.333334 −0.166667 |
| V −0.500000 0.333334 0.166667 |
| V −0.500000 0.166667 0.333334 |
| V −1.000000 −1.000000 −1.000000 |
| V −1.000000 1.000000 −1.000000 |
| V −1.000000 1.000000 1.000000 |
| V −1.000000 −1.000000 1.000000 |
| V −1.000000 0.000000 −1.000000 |
| V −1.000000 1.000000 0.000000 |
| V −1.000000 0.000000 1.000000 |
| V −1.000000 −1.000000 0.000000 |
| V −1.000000 −0.500000 −1.000000 |
| V −1.000000 0.500000 −1.000000 |
| V −1.000000 1.000000 −0.500000 |
| V −1.000000 1.000000 0.500000 |
| V −1.000000 0.500000 1.000000 |
| V −1.000000 −0.500000 1.000000 |
| V −1.000000 −1.000000 0.500000 |
| V −1.000000 −1.000000 −0.500000 |
| V −1.000000 0.000000 0.000000 |
| V −1.000000 0.000000 −0.500000 |
| V −1.000000 0.000000 0.500000 |
| V −1.000000 0.500000 0.000000 |
| V −1.000000 −0.500000 0.000000 |
| V −1.000000 −0.500000 −0.500000 |

| Sub-template Table-4 (4 × 4 Triangular Core) |
| --- |
| V −1.000000 0.500000 −0.500000 |
| V −1.000000 0.500000 0.500000 |
| V −1.000000 −0.500000 0.500000 |
| V −1.000000 −0.333333 0.666667 |
| V −1.000000 −0.666667 0.333333 |
| V −1.000000 −0.666667 −0.333333 |
| V −1.000000 −0.333333 −0.666667 |
| V −1.000000 0.333333 −0.666667 |
| V −1.000000 0.666667 −0.333333 |
| V −1.000000 0.666667 0.333333 |
| V −1.000000 0.333333 0.666667 |
| H 0 8 28 21 33 41 61 54 |
| H 8 4 17 28 41 37 50 61 |
| H 28 17 16 21 61 50 49 54 |
| H 4 9 29 17 37 42 62 50 |
| H 9 1 22 29 42 34 55 62 |
| H 17 29 22 16 50 62 55 49 |
| H 0 21 27 15 33 54 60 48 |
| H 15 27 20 7 48 60 53 40 |
| H 27 21 16 20 60 54 49 53 |
| H 22 1 10 30 55 34 43 63 |
| H 16 22 30 19 49 55 63 52 |
| H 30 10 5 19 63 43 38 52 |
| H 7 20 26 14 40 53 59 47 |
| H 20 16 24 26 53 49 57 59 |
| H 14 26 24 3 47 59 57 36 |
| H 24 16 18 25 57 49 51 58 |
| H 3 24 25 13 36 57 58 46 |
| H 25 18 6 13 58 51 39 46 |
| H 18 16 23 32 51 49 56 65 |
| H 6 18 32 12 39 51 65 45 |
| H 32 23 2 12 65 56 35 45 |
| H 16 19 31 23 49 52 64 56 |
| H 19 5 11 31 52 38 44 64 |
| H 31 11 2 23 64 44 35 56 |
| H 33 41 61 54 66 74 94 87 |
| H 41 37 50 61 74 70 83 94 |
| H 61 50 49 54 94 83 82 87 |
| H 37 42 62 50 70 75 95 83 |
| H 42 34 55 62 75 67 88 95 |
| H 50 62 55 49 83 95 88 82 |
| H 33 54 60 48 66 87 93 81 |
| H 48 60 53 40 81 93 86 73 |
| H 60 54 49 53 93 87 82 86 |
| H 55 34 43 63 88 67 76 96 |
| H 49 55 63 52 82 88 96 85 |
| H 63 43 38 52 96 76 71 85 |
| H 40 53 59 47 73 86 92 80 |
| H 53 49 57 59 86 82 90 92 |
| H 47 59 57 36 80 92 90 69 |
| H 57 49 51 58 90 82 84 91 |
| H 36 57 58 46 69 90 91 79 |
| H 58 51 39 46 91 84 72 79 |
| H 51 49 56 65 84 82 89 98 |
| H 39 51 65 45 72 84 98 78 |
| H 65 56 35 45 98 89 68 78 |
| H 49 52 64 56 82 85 97 89 |
| H 52 38 44 64 85 71 77 97 |
| H 64 44 35 56 97 77 68 89 |
| H 66 74 94 87 99 107 127 120 |
| H 74 70 83 94 107 103 116 127 |
| H 94 83 82 87 127 116 115 120 |
| H 70 75 95 83 103 108 128 116 |
| H 75 67 88 95 108 100 121 128 |
| H 83 95 88 82 116 128 121 115 |
| H 66 87 93 81 99 120 126 114 |
| H 81 93 86 73 114 126 119 106 |
| H 93 87 82 86 126 120 115 119 |
| H 88 67 76 96 121 100 109 129 |
| H 82 88 96 85 115 121 129 118 |
| H 96 76 71 85 129 109 104 118 |
| H 73 86 92 80 106 119 125 113 |
| H 86 82 90 92 119 115 123 125 |
| H 80 92 90 69 113 125 123 102 |
| H 90 82 84 91 123 115 117 124 |
| H 69 90 91 79 102 123 124 112 |
| H 91 84 72 79 124 117 105 112 |

| Sub-template Table-4 (4 × 4 Triangular Core) |
| --- |
| H 84 82 89 98 117 115 122 131 |
| H 72 84 98 78 105 117 131 111 |
| H 98 89 68 78 131 122 101 111 |
| H 82 85 97 89 115 118 130 122 |
| H 85 71 77 97 118 104 110 130 |
| H 97 77 68 89 130 110 101 122 |
| H 99 107 127 120 132 140 160 153 |
| H 107 103 116 127 140 136 149 160 |
| H 127 116 115 120 160 149 148 153 |
| H 103 108 128 116 136 141 161 149 |
| H 108 100 121 128 141 133 154 161 |
| H 116 128 121 115 149 161 154 148 |
| H 99 120 126 114 132 153 159 147 |
| H 114 126 119 106 147 159 152 139 |
| H 126 120 115 119 159 153 148 152 |
| H 121 100 109 129 154 133 142 162 |
| H 115 121 129 118 148 154 162 151 |
| H 129 109 104 118 162 142 137 151 |
| H 106 119 125 113 139 152 158 146 |
| H 119 115 123 125 152 148 156 158 |
| H 113 125 123 102 146 156 156 135 |
| H 123 115 117 124 156 148 150 157 |
| H 102 123 124 112 135 156 157 145 |
| H 124 117 105 112 157 150 138 145 |
| H 117 115 122 131 150 148 155 164 |
| H 105 117 131 111 138 150 164 144 |
| H 131 122 101 111 164 155 134 144 |
| H 115 118 130 122 148 151 163 155 |
| H 118 104 110 130 151 137 143 163 |
| H 130 110 101 122 163 143 134 155 |
| CN1 4 |
| CN2 4 |
| SLOT 0 |
| 2 11 5 10 1 |
| 35 44 38 43 34 |
| 68 77 71 76 67 |
| 101 110 104 109 100 |
| 134 143 137 142 133 |
| SLOT 1 |
| 0 15 7 14 3 |
| 33 48 40 47 36 |
| 66 81 73 80 69 |
| 99 114 106 113 102 |
| 132 147 139 146 135 |
| SLOT 2 |
| 3 13 6 12 2 |
| 36 46 39 45 35 |
| 69 79 72 78 68 |
| 102 112 105 111 101 |
| 135 145 138 144 134 |
| SLOT 3 |
| 1 9 4 8 0 |
| 34 42 37 41 33 |
| 67 75 70 74 66 |
| 100 108 103 107 99 |
| 133 141 136 140 132 |

| Sub-template Table-5 (4 × 4 Rectangular Core) |
| --- |
| V 1.000000 1.000000 1.000000 |
| V 1.000000 1.000000 0.500000 |
| V 1.000000 1.000000 0.000000 |
| V 1.000000 1.000000 −0.500000 |
| V 1.000000 1.000000 −1.000000 |
| V 1.000000 0.500000 1.000000 |
| V 1.000000 0.500000 0.500000 |
| V 1.000000 0.500000 0.000000 |
| V 1.000000 0.500000 −0.500000 |
| V 1.000000 0.500000 −1.000000 |
| V 1.000000 0.000000 1.000000 |
| V 1.000000 0.000000 0.500000 |
| V 1.000000 0.000000 0.000000 |

Sub-template Table-5 (4 × 4 Rectangular Core)

```
V  1.000000  0.000000 -0.500000
V  1.000000  0.000000 -1.000000
V  1.000000 -0.500000  1.000000
V  1.000000 -0.500000  0.500000
V  1.000000 -0.500000  0.000000
V  1.000000 -0.500000 -0.500000
V  1.000000 -0.500000 -1.000000
V  1.000000 -1.000000  1.000000
V  1.000000 -1.000000  0.500000
V  1.000000 -1.000000  0.000000
V  1.000000 -1.000000 -0.500000
V  1.000000 -1.000000 -1.000000
V  0.500000  0.500000  0.500000
V  0.500000  0.500000  0.250000
V  0.500000  0.500000  0.000000
V  0.500000  0.500000 -0.250000
V  0.500000  0.500000 -0.500000
V  0.500000  0.250000  0.500000
V  0.500000  0.250000  0.250000
V  0.500000  0.250000  0.000000
V  0.500000  0.250000 -0.250000
V  0.500000  0.250000 -0.500000
V  0.500000  0.000000  0.500000
V  0.500000  0.000000  0.250000
V  0.500000  0.000000  0.000000
V  0.500000  0.000000 -0.250000
V  0.500000  0.000000 -0.500000
V  0.500000 -0.250000  0.500000
V  0.500000 -0.250000  0.250000
V  0.500000 -0.250000  0.000000
V  0.500000 -0.250000 -0.250000
V  0.500000 -0.250000 -0.500000
V  0.500000 -0.500000  0.500000
V  0.500000 -0.500000  0.250000
V  0.500000 -0.500000  0.000000
V  0.500000 -0.500000 -0.250000
V  0.500000 -0.500000 -0.500000
V  0.000000  0.400000  0.400000
V  0.000000  0.400000  0.200000
V  0.000000  0.400000  0.000000
V  0.000000  0.400000 -0.200000
V  0.000000  0.400000 -0.400000
V  0.000000  0.200000  0.400000
V  0.000000  0.200000  0.200000
V  0.000000  0.200000  0.000000
V  0.000000  0.200000 -0.200000
V  0.000000  0.200000 -0.400000
V  0.000000  0.000000  0.400000
V  0.000000  0.000000  0.200000
V  0.000000  0.000000  0.000000
V  0.000000  0.000000 -0.200000
V  0.000000  0.000000 -0.400000
V  0.000000 -0.200000  0.400000
V  0.000000 -0.200000  0.200000
V  0.000000 -0.200000  0.000000
V  0.000000 -0.200000 -0.200000
V  0.000000 -0.200000 -0.400000
V  0.000000 -0.400000  0.400000
V  0.000000 -0.400000  0.200000
V  0.000000 -0.400000  0.000000
V  0.000000 -0.400000 -0.200000
V  0.000000 -0.400000 -0.400000
V -0.500000  0.500000  0.500000
V -0.500000  0.500000  0.250000
V -0.500000  0.500000  0.000000
V -0.500000  0.500000 -0.250000
V -0.500000  0.500000 -0.500000
V -0.500000  0.250000  0.500000
V -0.500000  0.250000  0.250000
V -0.500000  0.250000  0000000
V -0.500000  0.250000 -0.250000
V -0.500000  0.250000 -0.500000
V -0.500000  0.000000  0.500000
V -0.500000  0.000000  0.250000
V -0.500000  0.000000  0.000000
V -0.500000  0.000000 -0.250000
V -0.500000  0.000000 -0.500000
V -0.500000 -0.250000  0.500000
V -0.500000 -0.250000  0.250000
V -0.500000 -0.250000  0.000000
V -0.500000 -0.250000 -0.250000
V -0.500000 -0.250000 -0.500000
V -0.500000 -0.500000  0.500000
V -0.500000 -0.500000  0.250000
V -0.500000 -0.500000  0.000000
V -0.500000 -0.500000 -0.250000
V -0.500000 -0.500000 -0.500000
V -1.000000  1.000000  1.000000
V -1.000000  1.000000  0.500000
V -1.000000  1.000000  0.000000
V -1.000000  1.000000 -0.500000
V -1.000000  1.000000 -1.000000
V -1.000000  0.500000  1.000000
V -1.000000  0.500000  0.500000
V -1.000000  0.500000  0.000000
V -1.000000  0.500000 -0.500000
V -1.000000 -1.000000  0.500000
V -1.000000 -1.000000  0.000000
V -1.000000 -1.000000 -0.500000
V -1.000000 -1.000000 -1.000000
H 25 26 31 30 0 1 6 5
H 26 27 32 31 1 2 7 6
H 27 28 33 32 2 3 8 7
H 28 29 34 33 3 4 9 8
H 30 31 36 35 5 6 11 10
H 31 32 37 36 6 7 12 11
H 32 33 38 37 7 8 13 12
H 33 34 39 38 8 9 14 13
H 35 36 41 40 10 11 16 15
H 36 37 42 41 11 12 17 16
H 37 38 43 42 12 13 18 17
H 38 39 44 43 13 14 19 18
H 40 41 46 45 15 16 21 20
H 41 42 47 46 16 17 22 21
H 42 43 48 47 17 18 23 22
H 43 44 49 48 18 19 24 23
H 50 51 56 55 25 26 31 30
H 51 52 57 56 26 27 32 31
H 52 53 58 57 27 28 33 32
H 53 54 59 58 28 29 34 33
H 55 56 61 60 30 31 36 35
H 56 57 62 61 31 32 37 36
H 57 58 63 62 32 33 38 37
H 58 59 64 63 33 34 39 38
H 60 61 66 65 35 36 41 40
H 61 62 67 66 36 37 42 41
H 62 63 68 67 37 38 43 42
H 63 64 69 68 38 39 44 43
H 65 66 71 70 40 41 46 45
H 66 67 72 71 41 42 47 46
H 67 68 73 72 42 43 48 47
H 68 69 74 73 43 44 49 48
H 75 76 81 80 50 51 56 55
H 76 77 82 81 51 52 57 56
H 77 78 83 82 52 53 58 57
H 78 79 84 83 53 54 59 58
H 80 81 86 85 55 56 61 60
H 81 82 87 86 56 57 62 61
H 82 83 88 87 57 58 63 62
H 83 84 89 88 58 59 64 63
H 85 86 91 90 60 61 66 65
H 86 87 92 91 61 62 67 66
H 87 88 93 92 62 63 68 67
H 88 89 94 93 63 64 69 68
H 90 91 96 95 65 66 71 70
H 91 92 97 96 66 67 72 71
H 92 93 98 97 67 68 73 72
H 93 94 99 98 68 69 74 73
H 100 101 106 105 75 76 81 80
H 101 102 107 106 76 77 82 81
H 102 103 108 107 77 78 83 82
H 103 104 109 108 78 79 84 83
H 105 106 111 110 80 81 86 85
H 106 107 112 111 81 82 87 86
```

| Sub-template Table-5 (4 × 4 Rectangular Core) |
| --- |
| H 107 108 113 112 82 83 88 87 |
| H 108 109 114 113 83 84 89 88 |
| H 110 111 116 115 85 86 91 90 |
| H 111 112 117 116 86 87 92 91 |
| H 112 113 118 117 87 88 93 92 |
| H 113 114 119 118 88 89 94 93 |
| H 115 116 121 120 90 91 96 95 |
| H 116 117 122 121 91 92 97 96 |
| H 117 118 123 122 92 93 98 97 |
| H 118 119 124 123 93 94 99 98 |
| CN1 4 |
| CN2 4 |
| SLOT 0 |
| 0 1 2 3 4 |
| 25 26 27 28 29 |
| 50 51 52 53 54 |
| 75 76 77 78 79 |
| 100 101 102 103 104 |
| SLOT 1 |
| 24 23 22 21 20 |
| 49 48 47 46 45 |
| 74 73 72 71 70 |
| 99 98 97 96 95 |
| 124 123 122 121 120 |
| SLOT 2 |
| 20 15 10 5 0 |
| 45 40 35 30 25 |
| 70 65 60 55 50 |
| 95 90 85 80 75 |
| 120 115 110 105 100 |
| SLOT 3 |
| 4 9 14 19 24 |
| 29 34 39 44 49 |
| 54 59 64 69 74 |
| 79 84 89 94 99 |
| 104 109 114 119 124 |

| Sub-template Table-6 (2 × 2 Rectangular Core) |
| --- |
| V 1.000000 1.000000 1.000000 |
| V 1.000000 1.000000 0.000000 |
| V 1.000000 1.000000 −1.000000 |
| V 1.000000 0.000000 1.000000 |
| V 1.000000 0.000000 0.000000 |
| V 1.000000 0.000000 −1.000000 |
| V 1.000000 −1.000000 1.000000 |
| V 1.000000 −1.000000 0.000000 |
| V 1.000000 −1.000000 −1.000000 |
| V 0.500000 0.500000 0.500000 |
| V 0.500000 0.500000 0.000000 |
| V 0.500000 0.500000 −0.500000 |
| V 0.500000 0.000000 0.500000 |
| V 0.500000 0.000000 0.000000 |
| V 0.500000 0.000000 −0.500000 |
| V 0.500000 −0.500000 0.500000 |
| V 0.500000 −0.500000 0.000000 |
| V 0.500000 −0.500000 −0.500000 |
| V 0.000000 0.400000 0.400000 |
| V 0.000000 0.400000 0.000000 |
| V 0.000000 0.400000 −0.400000 |
| V 0.000000 0.000000 0.400000 |
| V 0.000000 0.000000 0.000000 |
| V 0.000000 0.000000 −0.400000 |
| V 0.000000 −0.400000 0.400000 |
| V 0.000000 −0.400000 0.000000 |
| V 0.000000 −0.400000 −0.400000 |
| V −0.500000 0.500000 0.500000 |
| V −0.500000 0.500000 0.000000 |
| V −0.500000 0.500000 −0.500000 |
| V −0.500000 0.000000 0.500000 |
| V −0.500000 0.000000 0.000000 |
| V −0.500000 0.000000 −0.500000 |

| Sub-template Table-6 (2 × 2 Rectangular Core) |
| --- |
| V −0.500000 −0.500000 0.500000 |
| V −0.500000 −0.500000 0.000000 |
| V −0.500000 −0.500000 −0.500000 |
| V −1.000000 1.000000 1.000000 |
| V −1.000000 1.000000 0.000000 |
| V −1.000000 1.000000 −1.000000 |
| V −1.000000 0.000000 1.000000 |
| V −1.000000 0.000000 0.000000 |
| V −1.000000 0.000000 −1.000000 |
| V −1.000000 −1.000000 1.000000 |
| V −1.000000 −1.000000 0.000000 |
| V −1.000000 −1.000000 −1.000000 |
| H 9 10 13 12 0 1 4 3 |
| H 10 11 14 13 1 2 5 4 |
| H 12 13 16 15 3 4 7 6 |
| H 13 14 17 16 4 5 8 7 |
| H 18 19 22 21 9 10 13 12 |
| H 19 20 23 22 10 11 14 13 |
| H 21 22 25 24 12 13 16 15 |
| H 22 23 26 25 13 14 17 16 |
| H 27 28 31 30 18 19 22 21 |
| H 28 29 32 31 19 20 23 22 |
| H 30 31 34 33 21 22 25 24 |
| H 31 32 35 34 22 23 26 25 |
| H 36 37 40 39 27 28 31 30 |
| H 37 38 41 40 28 29 32 31 |
| H 39 40 43 42 30 31 34 33 |
| H 40 41 44 43 31 32 35 34 |
| CN1 2 |
| CN2 2 |
| SLOT 0 |
| 0 1 2 |
| 9 10 11 |
| 18 19 20 |
| 27 28 29 |
| 36 37 38 |
| SLOT 1 |
| 8 7 6 |
| 17 16 15 |
| 26 25 24 |
| 35 34 33 |
| 44 43 42 |
| SLOT 2 |
| 6 3 0 |
| 15 12 9 |
| 24 21 18 |
| 33 30 27 |
| 42 39 36 |
| SLOT 3 |
| 2 5 8 |
| 11 14 17 |
| 20 23 26 |
| 29 32 35 |
| 38 41 44 |

| Sub-template Table-7 (2× Prism Core) |
| --- |
| V 1.000000 −1.154701 0.000000 |
| V 1.000000 0.577350 −1.000000 |
| V 1.000000 0.577350 1.000000 |
| V 1.000000 −0.288675 −0.500000 |
| V 1.000000 0.577350 0.000000 |
| V 1.000000 −0.288675 0.500000 |
| V 1.000000 0.000000 0.000000 |
| V 0.500000 −0.577350 0.000000 |
| V 0.500000 0.288675 −0.500000 |
| V 0.500000 0.288675 0.500000 |
| V 0.500000 −0.144338 −0.250000 |
| V 0.500000 0.288675 0.000000 |
| V 0.500000 −0.144338 0.250000 |
| V 0.500000 0.000000 0.000000 |
| V 0.000000 −0.461880 0.000000 |

| Sub-template Table-7 (2× Prism Core) |
|---|
| V 0.000000 0.230940 −0.400000 |
| V 0.000000 0.230940 0.400000 |
| V 0.000000 −0.115470 −0.200000 |
| V 0.000000 0.230940 0.000000 |
| V 0.000000 −0.115470 0.200000 |
| V 0.000000 0.000000 0.000000 |
| V −0.500000 −0.577350 0.000000 |
| V −0.500000 0.288675 −0.500000 |
| V −0.500000 0.288675 0.500000 |
| V −0.500000 −0.144338 −0.250000 |
| V −0.500000 0.288675 0.000000 |
| V −0.500000 −0.144338 0.250000 |
| V −0.500000 0.000000 0.000000 |
| V −1.000000 −1.154701 0.000000 |
| V −1.000000 0.577350 −1.000000 |
| V −1.000000 0.577350 1.000000 |
| V −1.000000 −0.288675 −0.500000 |
| V −1.000000 0.577350 0.000000 |
| V −1.000000 −0.288675 0.500000 |
| V −1.000000 0.000000 0.000000 |
| H 0 3 6 5 7 10 13 12 |
| H 6 3 1 4 13 10 8 11 |
| H 2 5 6 4 9 12 13 11 |
| H 7 10 13 12 14 17 20 19 |
| H 13 10 8 11 20 17 15 18 |
| H 9 12 13 11 16 19 20 18 |
| H 14 17 20 19 21 24 27 26 |
| H 20 17 15 18 27 24 22 25 |
| H 16 19 20 18 23 26 27 25 |
| H 21 24 27 26 28 31 34 33 |
| H 27 24 22 25 34 31 29 32 |
| H 23 26 27 25 30 33 34 32 |
| CN1 2 |
| CN2 2 |
| SLOT 0 |
| 2 4 1 |
| 9 11 8 |
| 16 18 15 |
| 23 25 22 |
| 30 32 29 |
| SLOT 1 |
| 0 5 2 |
| 7 12 9 |
| 14 19 16 |
| 21 26 23 |
| 28 33 30 |
| SLOT 2 |
| 1 3 0 |
| 8 10 7 |
| 15 17 14 |
| 22 24 21 |
| 29 31 28 |

| Sub-template Table-8 (4× prism Core) |
|---|
| V 1.000000 −1.154701 0.000000 |
| V 1.000000 0.577350 −1.000000 |
| V 1.000000 0.577350 1.000000 |
| V 1.000000 −0.288675 −0.500000 |
| V 1.000000 0.577350 0.000000 |
| V 1.000000 −0.288675 0.500000 |
| V 1.000000 −0.721688 −0.250000 |
| V 1.000000 0.144337 −0.750000 |
| V 1.000000 0.577350 −0.500000 |
| V 1.000000 0.577350 0.500000 |
| V 1.000000 0.144337 0.750000 |
| V 1.000000 −0.721688 0.250000 |
| V 1.000000 0.000000 0.000000 |
| V 1.000000 −0.577351 0.000000 |
| V 1.000000 −0.144338 −0.250000 |
| V 1.000000 0.288675 −0.500000 |
| V 1.000000 0.288675 0.000000 |
| V 1.000000 0.288675 0.500000 |
| V 1.000000 −0.144338 0.250000 |
| V 1.000000 −0.481126 −0.166667 |
| V 1.000000 0.096225 −0.500000 |
| V 1.000000 0.384900 −0.333333 |
| V 1.000000 0.384900 0.333333 |
| V 1.000000 0.096225 0.500000 |
| V 1.000000 −0.481126 0.166667 |
| V 0.500000 −0.577350 0.000000 |
| V 0.500000 0.288675 −0.500000 |
| V 0.500000 0.288675 0.500000 |
| V 0.500000 −0.144338 −0.250000 |
| V 0.500000 0.288675 0.000000 |
| V 0.500000 −0.144338 0.250000 |
| V 0.500000 −0.360844 −0.125000 |
| V 0.500000 0.072168 −0.375000 |
| V 0.500000 0.288675 −0.250000 |
| V 0.500000 0.288675 0.250000 |
| V 0.500000 0.072168 0.375000 |
| V 0.500000 −0.360844 0.125000 |
| V 0.500000 0.000000 0.000000 |
| V 0.500000 −0.288676 0.000000 |
| V 0.500000 −0.072169 −0.125000 |
| V 0.500000 0.144337 −0.250000 |
| V 0.500000 0.144337 0.000000 |
| V 0.500000 0.144337 0.250000 |
| V 0.500000 −0.072169 0.125000 |
| V 0.500000 −0.240563 −0.083334 |
| V 0.500000 0.048112 −0.250000 |
| V 0.500000 0.192450 −0.166667 |
| V 0.500000 0.192450 0.166667 |
| V 0.500000 0.048112 0.250000 |
| V 0.500000 −0.240563 0.083334 |
| V 0.000000 −0.461880 0.000000 |
| V 0.000000 0.230940 −0.400000 |
| V 0.000000 0.230940 0.400000 |
| V 0.000000 −0.115470 −0.200000 |
| V 0.000000 0.230940 0.000000 |
| V 0.000000 −0.115470 0.200000 |
| V 0.000000 −0.288675 −0.100000 |
| V 0.000000 0.057735 −0.300000 |
| V 0.000000 0.230940 −0.200000 |
| V 0.000000 0.230940 0.200000 |
| V 0.000000 0.057735 0.300000 |
| V 0.000000 −0.288675 0.100000 |
| V 0.000000 0.000000 0.000000 |
| V 0.000000 −0.230940 0.000000 |
| V 0.000000 −0.057735 −0.100000 |
| V 0.000000 0.115470 −0.200000 |
| V 0.000000 0.115470 0.000000 |
| V 0.000000 0.115470 0.200000 |
| V 0.000000 −0.057735 0.100000 |
| V 0.000000 −0.192450 −0.066667 |
| V 0.000000 0.038490 −0.200000 |
| V 0.000000 0.153960 −0.133333 |
| V 0.000000 0.153960 0.133333 |
| V 0.000000 0.038490 0.200000 |
| V 0.000000 −0.192450 0.066667 |
| V −0.500000 −0.577350 0.000000 |
| V −0.500000 0.288675 −0.500000 |
| V −0.500000 0.288675 0.500000 |
| V −0.500000 −0.144338 −0.250000 |
| V −0.500000 0.288675 0.000000 |
| V −0.500000 −0.144338 0.250000 |
| V −0.500000 −0.360844 −0.125000 |
| V −0.500000 0.072168 −0.375000 |
| V −0.500000 0.288675 −0.250000 |
| V −0.500000 0.288675 0.250000 |
| V −0.500000 0.072168 0.375000 |
| V −0.500000 −0.360844 0.125000 |
| V −0.500000 0.000000 0.000000 |
| V −0.500000 −0.288676 0.000000 |
| V −0.500000 −0.072169 −0.125000 |
| V −0.500000 0.144337 −0.250000 |
| V −0.500000 0.144337 0.000000 |
| V −0.500000 0.144337 0.250000 |
| V −0.500000 −0.072169 0.125000 |

| Sub-template Table-8 (4× prism Core) |
|---|
| V −0.500000 −0.240563 −0.083334 |
| V −0.500000 0.048112 −0.250000 |
| V −0.500000 0.192450 −0.166667 |
| V −0.500000 0.192450 0.166667 |
| V −0.500000 0.048112 0.250000 |
| V −0.500000 −0.240563 0.083334 |
| V −1.000000 −1.154701 0.000000 |
| V −1.000000 0.577350 −1.000000 |
| V −1.000000 0.577350 1.000000 |
| V −1.000000 −0.288675 −0.500000 |
| V −1.000000 0.577350 0.000000 |
| V −1.000000 −0.288675 0.500000 |
| V −1.000000 −0.721688 −0.250000 |
| V −1.000000 0.144337 −0.750000 |
| V −1.000000 0.577350 −0.500000 |
| V −1.000000 0.577350 0.500000 |
| V −1.000000 0.144337 0.750000 |
| V −1.000000 −0.721688 0.250000 |
| V −1.000000 0.000000 0.000000 |
| V −1.000000 −0.577351 0.000000 |
| V −1.000000 −0.144338 −0.250000 |
| V −1.000000 0.288675 −0.500000 |
| V −1.000000 0.288675 0.000000 |
| V −1.000000 0.288675 0.500000 |
| V −1.000000 −0.144338 0.250000 |
| V −1.000000 −0.481126 −0.166667 |
| V −1.000000 0.096225 −0.500000 |
| V −1.000000 0.384900 −0.333333 |
| V −1.000000 0.384900 0.333333 |
| V −1.000000 0.096225 0.500000 |
| V −1.000000 −0.481126 0.166667 |
| H 0 6 19 13 25 31 44 38 |
| H 6 3 14 19 31 28 39 44 |
| H 13 19 14 12 38 44 39 37 |
| H 14 3 7 20 39 28 32 45 |
| H 20 7 1 15 45 32 26 40 |
| H 12 14 20 15 37 39 45 40 |
| H 12 15 21 16 37 40 46 41 |
| H 21 15 1 8 46 40 26 33 |
| H 16 21 8 4 41 46 33 29 |
| H 24 11 0 13 49 36 25 38 |
| H 12 18 24 13 37 43 49 38 |
| H 18 5 11 24 43 30 36 49 |
| H 10 5 18 23 35 30 43 48 |
| H 23 18 12 17 48 43 37 42 |
| H 2 10 23 17 27 35 48 42 |
| H 17 12 16 22 42 37 41 47 |
| H 22 16 4 9 47 41 29 34 |
| H 2 17 22 9 27 42 47 34 |
| H 25 31 44 38 50 56 69 63 |
| H 31 28 39 44 56 53 64 69 |
| H 38 44 39 37 63 69 64 62 |
| H 39 28 32 45 64 53 57 70 |
| H 45 32 26 40 70 57 51 65 |
| H 37 39 45 40 62 64 70 65 |
| H 37 40 46 41 62 65 71 66 |
| H 46 40 26 33 71 65 51 58 |
| H 41 46 33 29 66 71 58 54 |
| H 49 36 25 38 74 61 50 63 |
| H 37 43 49 38 62 68 74 63 |
| H 43 30 36 49 68 55 61 74 |
| H 35 30 43 48 60 55 68 73 |
| H 48 43 37 42 73 68 62 67 |
| H 27 35 48 42 52 60 73 67 |
| H 42 37 41 47 67 62 66 72 |
| H 47 41 29 34 72 66 54 59 |
| H 27 42 47 34 52 67 72 59 |
| H 50 56 69 63 75 81 94 88 |
| H 56 53 64 69 81 78 89 94 |
| H 63 69 64 62 88 94 89 87 |
| H 64 53 57 70 89 78 82 95 |
| H 70 57 51 65 95 82 76 90 |
| H 62 64 70 65 87 89 95 90 |
| H 62 65 71 66 87 90 96 91 |
| H 71 65 51 58 96 90 76 83 |
| H 66 71 58 54 91 96 83 79 |
| H 74 61 50 63 99 86 75 88 |

| Sub-template Table-8 (4× prism Core) |
|---|
| H 62 68 74 63 87 93 99 88 |
| H 68 55 61 74 93 80 86 99 |
| H 60 55 68 73 85 80 93 98 |
| H 73 68 62 67 98 93 87 92 |
| H 52 60 73 67 77 85 98 92 |
| H 67 62 66 72 92 87 91 97 |
| H 72 66 54 59 97 91 79 84 |
| H 52 67 72 59 77 92 97 84 |
| H 75 81 94 88 100 106 119 113 |
| H 81 78 89 94 106 103 114 119 |
| H 88 94 89 87 113 119 114 112 |
| H 89 78 82 95 114 103 107 120 |
| H 95 82 76 90 120 107 101 115 |
| H 87 89 95 90 112 114 120 115 |
| H 87 90 96 91 112 115 121 116 |
| H 96 90 76 83 121 115 101 108 |
| H 91 96 83 79 116 121 108 104 |
| H 99 86 75 88 124 111 100 113 |
| H 87 93 99 88 112 118 124 113 |
| H 93 80 86 99 118 105 111 124 |
| H 85 80 93 98 110 105 118 123 |
| H 98 93 87 92 123 118 112 117 |
| H 77 85 98 92 102 110 123 117 |
| H 92 87 91 97 117 112 116 122 |
| H 97 91 79 84 122 116 104 109 |
| H 77 92 97 84 102 117 122 109 |
| CN1 4 |
| CN2 4 |
| SLOT 0 |
| 2 9 4 8 1 |
| 27 34 29 33 26 |
| 52 59 54 58 51 |
| 77 84 79 83 76 |
| 102 109 104 108 101 |
| SLOT 1 |
| 0 11 5 10 2 |
| 25 36 30 35 27 |
| 50 61 55 60 52 |
| 75 86 80 85 77 |
| 100 111 105 110 102 |
| SLOT 2 |
| 1 7 3 6 0 |
| 26 32 28 31 25 |
| 51 57 53 56 50 |
| 76 82 78 81 75 |
| 101 107 103 106 100 |

| Sub-template Table-9 (4 × 4 Double Hoop Single Triangular Core: Left Wingface is a triangular pattern) | | | |
|---|---|---|---|
| V | −1.000000 | 1.000000 | 1.000000 |
| V | −1.000000 | 1.000000 | 0.500000 |
| V | −1.000000 | 1.000000 | 0.000000 |
| V | −1.000000 | 1.000000 | −0.500000 |
| V | −1.000000 | 1.000000 | −1.000000 |
| V | −0.500000 | 0.500000 | 0.500000 |
| V | −0.500000 | 0.500000 | 0.250000 |
| V | −0.500000 | 0.500000 | 0.000000 |
| V | −0.500000 | 0.500000 | −0.250000 |
| V | −0.500000 | 0.500000 | −0.500000 |
| V | 0.000000 | 0.400000 | 0.400000 |
| V | 0.000000 | 0.400000 | 0.200000 |
| V | 0.000000 | 0.400000 | 0.000000 |
| V | 0.000000 | 0.400000 | −0.200000 |
| V | 0.000000 | 0.400000 | −0.400000 |
| V | 0.500000 | 0.500000 | 0.500000 |
| V | 0.500000 | 0.500000 | 0.250000 |
| V | 0.500000 | 0.500000 | 0.000000 |
| V | 0.500000 | 0.500000 | −0.250000 |
| V | 0.500000 | 0.500000 | −0.500000 |
| V | 1.000000 | 1.000000 | 1.000000 |

Sub-template Table-9 (4 × 4 Double Hoop Single Triangular Core: Left Wingface is a triangular pattern)

| | | | |
|---|---|---|---|
| V | 1.000000 | 1.000000 | 0.500000 |
| V | 1.000000 | 1.000000 | 0.000000 |
| V | 1.000000 | 1.000000 | −0.500000 |
| V | 1.000000 | 1.000000 | −1.000000 |
| V | −0.500000 | 0.250000 | 0.250000 |
| V | −0.500000 | 0.250000 | 0.125000 |
| V | −0.500000 | 0.250000 | 0.000000 |
| V | −0.500000 | 0.250000 | −0.125000 |
| V | −0.500000 | 0.250000 | −0.250000 |
| V | −0.250000 | 0.225000 | 0.225000 |
| V | −0.250000 | 0.225000 | 0.112500 |
| V | −0.250000 | 0.225000 | 0.000000 |
| V | −0.250000 | 0.225000 | −0.112500 |
| V | −0.250000 | 0.225000 | −0.225000 |
| V | 0.000000 | 0.200000 | 0.200000 |
| V | 0.000000 | 0.200000 | 0.100000 |
| V | 0.000000 | 0.200000 | 0.000000 |
| V | 0.000000 | 0.200000 | −0.100000 |
| V | 0.000000 | 0.200000 | −0.200000 |
| V | 0.250000 | 0.225000 | 0.225000 |
| V | 0.250000 | 0.225000 | 0.112500 |
| V | 0.250000 | 0.225000 | 0.000000 |
| V | 0.250000 | 0.225000 | −0.112500 |
| V | 0.250000 | 0.225000 | −0.225000 |
| V | 0.500000 | 0.250000 | 0.250000 |
| V | 0.500000 | 0.250000 | 0.125000 |
| V | 0.500000 | 0.250000 | 0.000000 |
| V | 0.500000 | 0.250000 | −0.125000 |
| V | 0.500000 | 0.250000 | −0.250000 |
| V | −0.400000 | 0.000000 | 0.192000 |
| V | −0.400000 | 0.000000 | 0.096000 |
| V | −0.400000 | 0.000000 | 0.000000 |
| V | −0.400000 | 0.000000 | −0.096000 |
| V | −0.400000 | 0.000000 | −0.192000 |
| V | −0.200000 | 0.000000 | 0.176000 |
| V | −0.200000 | 0.000000 | 0.088000 |
| V | −0.200000 | 0.000000 | 0.000000 |
| V | −0.200000 | 0.000000 | −0.088000 |
| V | −0.200000 | 0.000000 | −0.176000 |
| V | 0.000000 | 0.000000 | 0.160000 |
| V | 0.000000 | 0.000000 | 0.080000 |
| V | 0.000000 | 0.000000 | 0.000000 |
| V | 0.000000 | 0.000000 | −0.080000 |
| V | 0.000000 | 0.000000 | −0.160000 |
| V | 0.200000 | 0.000000 | 0.176000 |
| V | 0.200000 | 0.000000 | 0.088000 |
| V | 0.200000 | 0.000000 | 0.000000 |
| V | 0.200000 | 0.000000 | −0.088000 |
| V | 0.200000 | 0.000000 | −0.176000 |
| V | 0.400000 | 0.000000 | 0.192000 |
| V | 0.400000 | 0.000000 | 0.096000 |
| V | 0.400000 | 0.000000 | 0.000000 |
| V | 0.400000 | 0.000000 | −0.096000 |
| V | 0.400000 | 0.000000 | −0.192000 |
| V | −0.500000 | −0.250000 | 0.250000 |
| V | −0.500000 | −0.250000 | 0.125000 |
| V | −0.500000 | −0.250000 | 0.000000 |
| V | −0.500000 | −0.250000 | −0.125000 |
| V | −0.500000 | −0.250000 | −0.250000 |
| V | −0.250000 | −0.225000 | 0.225000 |
| V | −0.250000 | −0.225000 | 0.112500 |
| V | −0.250000 | −0.225000 | 0.000000 |
| V | −0.250000 | −0.225000 | −0.112500 |
| V | −0.250000 | −0.225000 | −0.225000 |
| V | 0.000000 | −0.200000 | 0.200000 |
| V | 0.000000 | −0.200000 | 0.100000 |
| V | 0.000000 | −0.200000 | 0.000000 |
| V | 0.000000 | −0.200000 | −0.100000 |
| V | 0.000000 | −0.200000 | −0.200000 |
| V | 0.250000 | −0.225000 | 0.225000 |
| V | 0.250000 | −0.225000 | 0.112500 |
| V | 0.250000 | −0.225000 | 0.000000 |
| V | 0.250000 | −0.225000 | −0.212500 |
| V | 0.250000 | −0.225000 | −0.225000 |
| V | 0.500000 | −0.250000 | 0.250000 |
| V | 0.500000 | −0.250000 | 0.125000 |
| V | 0.500000 | −0.250000 | 0.000000 |
| V | 0.500000 | −0.250000 | −0.125000 |
| V | 0.500000 | −0.250000 | −0.250000 |
| V | −1.000000 | −1.000000 | 1.000000 |
| V | −1.000000 | −1.000000 | 0.500000 |
| V | −1.000000 | −1.000000 | 0.000000 |
| V | −1.000000 | −1.000000 | −0.500000 |
| V | −1.000000 | −1.000000 | −1.000000 |
| V | −0.500000 | −0.500000 | 0.500000 |
| V | −0.500000 | −0.500000 | 0.250000 |
| V | −0.500000 | −0.500000 | 0.000000 |
| V | −0.500000 | −0.500000 | −0.250000 |
| V | −0.500000 | −0.500000 | −0.500000 |
| V | 0.000000 | −0.400000 | 0.400000 |
| V | 0.000000 | −0.400000 | 0.200000 |
| V | 0.000000 | −0.400000 | 0.000000 |
| V | 0.000000 | −0.400000 | −0.200000 |
| V | 0.000000 | −0.400000 | −0.400000 |
| V | 0.500000 | −0.500000 | 0.500000 |
| V | 0.500000 | −0.500000 | 0.250000 |
| V | 0.500000 | −0.500000 | 0.000000 |
| V | 0.500000 | −0.500000 | −0.250000 |
| V | 0.500000 | −0.500000 | −0.500000 |
| V | 1.000000 | −1.000000 | 1.000000 |
| V | 1.000000 | −1.000000 | 0.500000 |
| V | 1.000000 | −1.000000 | 0.000000 |
| V | 1.000000 | −1.000000 | −0.500000 |
| V | 1.000000 | −1.000000 | −1.000000 |
| V | −1.000000 | 0.400000 | −0.600000 |
| V | −1.000000 | 0.500000 | −0.500000 |
| V | −1.000000 | 0.600000 | −0.400000 |
| V | −1.000000 | 0.500000 | 0.000000 |
| V | −1.000000 | 0.600000 | 0.400000 |
| V | −1.000000 | 0.500000 | 0.500000 |
| V | −1.000000 | 0.400000 | 0.600000 |
| V | −1.000000 | 0.500000 | 1.000000 |
| V | −1.000000 | 0.000000 | −0.500000 |
| V | −1.000000 | 0.000000 | 0.000000 |
| V | −1.000000 | 0.000000 | 0.500000 |
| V | −1.000000 | 0.000000 | 1.000000 |
| V | −0.590000 | 0.171100 | −0.208860 |
| V | −0.575000 | 0.186875 | −0.165312 |
| V | −0.560000 | 0.201600 | −0.125440 |
| V | −0.575000 | 0.186875 | 0.000000 |
| V | −0.560000 | 0.201600 | 0.125440 |
| V | −0.575000 | 0.186875 | 0.165312 |
| V | −0.590000 | 0.171100 | 0.208860 |
| V | −0.575000 | 0.186875 | 0.330625 |
| V | −0.650000 | 0.097500 | −0.211250 |
| V | −0.650000 | 0.097500 | 0.000000 |
| V | −0.650000 | 0.097500 | 0.211250 |
| V | −0.650000 | 0.097500 | 0.422500 |
| V | −0.520000 | 0.000000 | −0.162240 |
| V | −0.500000 | 0.000000 | −0.125000 |
| V | −0.480000 | 0.000000 | −0.095232 |
| V | −0.500000 | 0.000000 | 0.000000 |
| V | −0.480000 | 0.000000 | 0.095232 |
| V | −0.500000 | 0.000000 | 0.125000 |
| V | −0.520000 | 0.000000 | 0.162240 |
| V | −0.500000 | 0.000000 | 0.250000 |
| V | −0.600000 | 0.000000 | −0.180000 |
| V | −0.600000 | 0.000000 | 0.000000 |
| V | −0.600000 | 0.000000 | 0.180000 |
| V | −0.600000 | 0.000000 | 0.360000 |
| V | −0.590000 | −0.171100 | −0.208860 |
| V | −0.575000 | −0.186875 | −0.165312 |
| V | −0.560000 | −0.201600 | −0.125440 |
| V | −0.575000 | −0.186875 | 0.000000 |
| V | −0.560000 | −0.201600 | 0.125440 |
| V | −0.575000 | −0.186875 | 0.165312 |
| V | −0.590000 | −0.171100 | 0.208860 |
| V | −0.575000 | −0.186875 | 0.330625 |
| V | −0.650000 | −0.097500 | −0.211250 |
| V | −0.650000 | −0.097500 | 0.000000 |

Sub-template Table-9 (4 × 4 Double Hoop Single Triangular Core: Left Wingface is a triangular pattern)

| | | | |
|---|---:|---:|---:|
| V | -0.650000 | -0.097500 | 0.211250 |
| V | -0.650000 | -0.097500 | 0.422500 |
| V | -1.000000 | -0.400000 | -0.600000 |
| V | -1.000000 | -0.500000 | -0.500000 |
| V | -1.000000 | -0.600000 | -0.400000 |
| V | -1.000000 | -0.500000 | 0.000000 |
| V | -1.000000 | -0.600000 | 0.400000 |
| V | -1.000000 | -0.500000 | 0.500000 |
| V | -1.000000 | -0.400000 | 0.600000 |
| V | -1.000000 | -0.500000 | 1.000000 |
| V | 1.000000 | 0.500000 | 0.500000 |
| V | 1.000000 | 0.500000 | 0.000000 |
| V | 1.000000 | 0.500000 | -0.500000 |
| V | 1.000000 | 0.500000 | -1.000000 |
| V | 1.000000 | 0.000000 | 0.500000 |
| V | 1.000000 | 0.000000 | 0.000000 |
| V | 1.000000 | 0.000000 | -0.500000 |
| V | 1.000000 | 0.000000 | -1.000000 |
| V | 0.575000 | 0.186875 | 0.165312 |
| V | 0.575000 | 0.186875 | 0.000000 |
| V | 0.575000 | 0.186875 | -0.165312 |
| V | 0.575000 | 0.186875 | -0.330625 |
| V | 0.650000 | 0.097500 | 0.211250 |
| V | 0.650000 | 0.097500 | 0.000000 |
| V | 0.650000 | 0.097500 | -0.211250 |
| V | 0.650000 | 0.097500 | -0.422500 |
| V | 0.500000 | 0.000000 | 0.125000 |
| V | 0.500000 | 0.000000 | 0.000000 |
| V | 0.500000 | 0.000000 | -0.125000 |
| V | 0.500000 | 0.000000 | -0.250000 |
| V | 0.600000 | 0.000000 | 0.180000 |
| V | 0.600000 | 0.000000 | 0.000000 |
| V | 0.600000 | 0.000000 | -0.180000 |
| V | 0.600000 | 0.000000 | -0.360000 |
| V | 0.575000 | -0.186875 | 0.165312 |
| V | 0.575000 | -0.186875 | 0.000000 |
| V | 0.575000 | -0.186875 | -0.165312 |
| V | 0.575000 | -0.186875 | -0.330625 |
| V | 0.650000 | -0.097500 | 0.211250 |
| V | 0.650000 | -0.097500 | 0.000000 |
| V | 0.650000 | -0.097500 | -0.211250 |
| V | 0.650000 | -0.097500 | -0.422500 |
| V | 1.000000 | -0.500000 | 0.500000 |
| V | 1.000000 | -0.500000 | 0.000000 |
| V | 1.000000 | -0.500000 | -0.500000 |
| V | 1.000000 | -0.500000 | -1.000000 |
| V | -0.500000 | 0.250000 | 0.500000 |
| V | 0.000000 | 0.200000 | 0.400000 |
| V | 0.500000 | 0.250000 | 0.500000 |
| V | 1.000000 | 0.500000 | 1.000000 |
| V | -0.500000 | 0.000000 | 0.500000 |
| V | 0.000000 | 0.000000 | 0.400000 |
| V | 0.500000 | 0.000000 | 0.500000 |
| V | 1.000000 | 0.000000 | 1.000000 |
| V | -0.287500 | 0.148688 | 0.263062 |
| V | 0.000000 | 0.130000 | 0.230000 |
| V | 0.287500 | 0.148688 | 0.263062 |
| V | 0.575000 | 0.186875 | 0.330625 |
| V | -0.325000 | 0.069750 | 0.302250 |
| V | 0.000000 | 0.060000 | 0.260000 |
| V | 0.325000 | 0.069750 | 0.302250 |
| V | 0.650000 | 0.097500 | 0.422500 |
| V | -0.250000 | 0.000000 | 0.225000 |
| V | 0.000000 | 0.000000 | 0.200000 |
| V | 0.250000 | 0.000000 | 0.225000 |
| V | 0.500000 | 0.000000 | 0.250000 |
| V | -0.300000 | 0.000000 | 0.276000 |
| V | 0.000000 | 0.000000 | 0.240000 |
| V | 0.300000 | 0.000000 | 0.276000 |
| V | 0.600000 | 0.000000 | 0.360000 |
| V | -0.287500 | -0.148688 | 0.263062 |
| V | 0.000000 | -0.130000 | 0.230000 |
| V | 0.287500 | -0.148688 | 0.263062 |
| V | 0.575000 | -0.186875 | 0.330625 |
| V | -0.325000 | -0.069750 | 0.302250 |
| V | 0.000000 | -0.060000 | 0.260000 |
| V | 0.325000 | -0.069750 | 0.302250 |
| V | 0.650000 | -0.097500 | 0.422500 |
| V | -0.500000 | -0.250000 | 0.500000 |
| V | 0.000000 | -0.200000 | 0.400000 |
| V | 0.500000 | -0.250000 | 0.500000 |
| V | 1.000000 | -0.500000 | 1.000000 |
| V | 0.500000 | 0.250000 | -0.500000 |
| V | 0.000000 | 0.200000 | -0.400000 |
| V | -0.500000 | 0.250000 | -0.500000 |
| V | -1.000000 | 0.500000 | -1.000000 |
| V | 0.500000 | 0.000000 | -0.500000 |
| V | 0.000000 | 0.000000 | -0.400000 |
| V | -0.500000 | 0.000000 | -0.500000 |
| V | -1.000000 | 0.000000 | -1.000000 |
| V | 0.287500 | 0.148688 | -0.263062 |
| V | 0.000000 | 0.130000 | -0.230000 |
| V | -0.287500 | 0.148688 | -0.263062 |
| V | -0.575000 | 0.186875 | -0.330625 |
| V | 0.325000 | 0.069750 | -0.302250 |
| V | 0.000000 | 0.060000 | -0.260000 |
| V | -0.325000 | 0.069750 | -0.302250 |
| V | -0.650000 | 0.097500 | -0.422500 |
| V | 0.250000 | 0.000000 | -0.225000 |
| V | 0.000000 | 0.000000 | -0.200000 |
| V | -0.250000 | 0.000000 | -0.225000 |
| V | -0.500000 | 0.000000 | -0.250000 |
| V | 0.300000 | 0.000000 | -0.276000 |
| V | 0.000000 | 0.000000 | -0.240000 |
| V | -0.300000 | 0.000000 | -0.276000 |
| V | -0.600000 | 0.000000 | -0.360000 |
| V | 0.287500 | -0.148688 | -0.263062 |
| V | 0.000000 | -0.130000 | -0.230000 |
| V | -0.287500 | -0.148688 | -0.263062 |
| V | -0.575000 | -0.186875 | -0.330625 |
| V | 0.325000 | -0.069750 | -0.302250 |
| V | 0.000000 | -0.060000 | -0.260000 |
| V | -0.325000 | -0.069750 | -0.302250 |
| V | -0.650000 | -0.097500 | -0.422500 |
| V | 0.500000 | -0.250000 | -0.500000 |
| V | 0.000000 | -0.200000 | -0.400000 |
| V | -0.500000 | -0.250000 | -0.500000 |
| V | -1.000000 | -0.500000 | -1.000000 |

| | | | | | | | | |
|---|---:|---:|---:|---:|---:|---:|---:|---:|
| H | 25 | 26 | 31 | 30 | 0 | 1 | 6 | 5 |
| H | 26 | 27 | 32 | 31 | 1 | 2 | 7 | 6 |
| H | 27 | 28 | 33 | 32 | 2 | 3 | 8 | 7 |
| H | 28 | 29 | 34 | 33 | 3 | 4 | 9 | 8 |
| H | 30 | 31 | 36 | 35 | 5 | 6 | 11 | 10 |
| H | 31 | 32 | 37 | 36 | 6 | 7 | 12 | 11 |
| H | 32 | 33 | 38 | 37 | 7 | 8 | 13 | 12 |
| H | 33 | 34 | 39 | 38 | 8 | 9 | 14 | 13 |
| H | 35 | 36 | 41 | 40 | 10 | 11 | 16 | 15 |
| H | 36 | 37 | 42 | 41 | 11 | 12 | 17 | 16 |
| H | 37 | 38 | 43 | 42 | 12 | 13 | 18 | 17 |
| H | 38 | 39 | 44 | 43 | 13 | 14 | 19 | 18 |
| H | 40 | 41 | 46 | 45 | 15 | 16 | 21 | 20 |
| H | 41 | 42 | 47 | 46 | 16 | 17 | 22 | 21 |
| H | 42 | 43 | 48 | 47 | 17 | 18 | 23 | 22 |
| H | 43 | 44 | 49 | 48 | 18 | 19 | 24 | 23 |
| H | 50 | 51 | 56 | 55 | 25 | 26 | 31 | 30 |
| H | 51 | 52 | 57 | 56 | 26 | 27 | 32 | 31 |
| H | 52 | 53 | 58 | 57 | 27 | 28 | 33 | 32 |
| H | 53 | 54 | 59 | 58 | 28 | 29 | 34 | 33 |
| H | 55 | 56 | 61 | 60 | 30 | 31 | 36 | 35 |
| H | 56 | 57 | 62 | 61 | 31 | 32 | 37 | 36 |
| H | 57 | 58 | 63 | 62 | 32 | 33 | 38 | 37 |
| H | 58 | 59 | 64 | 63 | 33 | 34 | 39 | 38 |
| H | 60 | 61 | 66 | 65 | 35 | 36 | 41 | 40 |
| H | 61 | 62 | 67 | 66 | 36 | 37 | 42 | 41 |
| H | 62 | 63 | 68 | 67 | 37 | 38 | 43 | 42 |
| H | 63 | 64 | 69 | 68 | 38 | 39 | 44 | 43 |
| H | 65 | 66 | 71 | 70 | 40 | 41 | 46 | 45 |
| H | 66 | 67 | 72 | 71 | 41 | 42 | 47 | 46 |
| H | 67 | 68 | 73 | 72 | 42 | 43 | 48 | 47 |
| H | 68 | 69 | 74 | 73 | 43 | 44 | 49 | 48 |

-continued

Sub-template Table-9 (4 × 4 Double Hoop Single Triangular Core: Left Wingface is a triangular pattern)

| | | | | | | | |
|---|---|---|---|---|---|---|---|
| H | 75 | 76 | 81 | 80 | 50 | 51 | 56 | 55 |
| H | 76 | 77 | 82 | 81 | 51 | 52 | 57 | 56 |
| H | 77 | 78 | 83 | 82 | 52 | 53 | 58 | 57 |
| H | 78 | 79 | 84 | 83 | 53 | 54 | 59 | 58 |
| H | 80 | 81 | 86 | 85 | 55 | 56 | 61 | 60 |
| H | 81 | 82 | 87 | 86 | 56 | 57 | 62 | 61 |
| H | 82 | 83 | 88 | 87 | 57 | 58 | 63 | 62 |
| H | 83 | 84 | 89 | 88 | 58 | 59 | 64 | 63 |
| H | 85 | 86 | 91 | 90 | 60 | 61 | 66 | 65 |
| H | 86 | 87 | 92 | 91 | 61 | 62 | 67 | 66 |
| H | 87 | 88 | 93 | 92 | 62 | 63 | 68 | 67 |
| H | 88 | 89 | 94 | 93 | 63 | 64 | 69 | 68 |
| H | 90 | 91 | 96 | 95 | 65 | 66 | 71 | 70 |
| H | 91 | 92 | 97 | 96 | 66 | 67 | 72 | 71 |
| H | 92 | 93 | 98 | 97 | 67 | 68 | 73 | 72 |
| H | 93 | 94 | 99 | 98 | 68 | 69 | 74 | 73 |
| H | 100 | 101 | 106 | 105 | 75 | 76 | 81 | 80 |
| H | 101 | 102 | 107 | 106 | 76 | 77 | 82 | 81 |
| H | 102 | 103 | 108 | 107 | 77 | 78 | 83 | 82 |
| H | 103 | 104 | 109 | 108 | 78 | 79 | 84 | 83 |
| H | 105 | 106 | 111 | 110 | 80 | 81 | 86 | 85 |
| H | 106 | 107 | 112 | 111 | 81 | 82 | 87 | 86 |
| H | 107 | 108 | 113 | 112 | 82 | 83 | 88 | 87 |
| H | 108 | 109 | 114 | 113 | 83 | 84 | 89 | 88 |
| H | 110 | 111 | 116 | 115 | 85 | 86 | 91 | 90 |
| H | 111 | 112 | 117 | 116 | 86 | 87 | 92 | 91 |
| H | 112 | 113 | 118 | 117 | 87 | 88 | 93 | 92 |
| H | 113 | 114 | 119 | 118 | 88 | 89 | 94 | 93 |
| H | 115 | 116 | 121 | 120 | 90 | 91 | 96 | 95 |
| H | 116 | 117 | 122 | 121 | 91 | 92 | 97 | 96 |
| H | 117 | 118 | 123 | 122 | 92 | 93 | 98 | 97 |
| H | 118 | 119 | 124 | 123 | 93 | 94 | 99 | 98 |
| H | 136 | 132 | 131 | 135 | 148 | 144 | 143 | 147 |
| H | 132 | 0 | 130 | 131 | 144 | 25 | 142 | 143 |
| H | 135 | 131 | 130 | 134 | 147 | 143 | 142 | 146 |
| H | 130 | 0 | 1 | 129 | 142 | 25 | 26 | 141 |
| H | 134 | 130 | 129 | 128 | 146 | 142 | 141 | 140 |
| H | 129 | 1 | 2 | 128 | 141 | 26 | 27 | 140 |
| H | 134 | 128 | 127 | 126 | 146 | 140 | 139 | 138 |
| H | 128 | 2 | 3 | 127 | 140 | 27 | 28 | 139 |
| H | 126 | 127 | 3 | 4 | 138 | 139 | 28 | 29 |
| H | 134 | 126 | 125 | 133 | 146 | 138 | 137 | 145 |
| H | 125 | 126 | 4 | 256 | 137 | 138 | 29 | 264 |
| H | 133 | 125 | 256 | 260 | 145 | 137 | 264 | 268 |
| H | 148 | 144 | 143 | 147 | 160 | 156 | 155 | 159 |
| H | 144 | 25 | 142 | 143 | 156 | 50 | 154 | 155 |
| H | 147 | 143 | 142 | 146 | 159 | 155 | 154 | 158 |
| H | 142 | 25 | 26 | 141 | 154 | 50 | 51 | 153 |
| H | 146 | 142 | 141 | 140 | 158 | 154 | 153 | 152 |
| H | 141 | 26 | 27 | 140 | 153 | 51 | 52 | 152 |
| H | 146 | 140 | 139 | 138 | 158 | 152 | 151 | 150 |
| H | 140 | 27 | 28 | 139 | 152 | 52 | 53 | 151 |
| H | 138 | 139 | 28 | 29 | 150 | 151 | 53 | 54 |
| H | 146 | 138 | 137 | 145 | 158 | 150 | 149 | 157 |
| H | 137 | 138 | 29 | 264 | 149 | 150 | 54 | 272 |
| H | 145 | 137 | 264 | 268 | 157 | 149 | 272 | 276 |
| H | 160 | 156 | 155 | 159 | 172 | 168 | 167 | 171 |
| H | 156 | 50 | 154 | 155 | 168 | 75 | 166 | 167 |
| H | 159 | 155 | 154 | 158 | 171 | 167 | 166 | 170 |
| H | 154 | 50 | 51 | 153 | 166 | 75 | 76 | 165 |
| H | 158 | 154 | 153 | 152 | 170 | 166 | 165 | 164 |
| H | 153 | 51 | 52 | 152 | 165 | 76 | 77 | 164 |
| H | 158 | 152 | 151 | 150 | 170 | 164 | 163 | 162 |
| H | 152 | 52 | 53 | 151 | 164 | 77 | 78 | 163 |
| H | 150 | 151 | 53 | 54 | 162 | 163 | 78 | 79 |
| H | 158 | 150 | 149 | 157 | 170 | 162 | 161 | 169 |
| H | 149 | 150 | 54 | 272 | 161 | 162 | 79 | 280 |
| H | 157 | 149 | 272 | 276 | 169 | 161 | 280 | 284 |
| H | 172 | 168 | 167 | 171 | 136 | 180 | 179 | 135 |
| H | 168 | 75 | 166 | 167 | 180 | 100 | 178 | 179 |
| H | 171 | 167 | 166 | 170 | 135 | 179 | 178 | 134 |
| H | 166 | 75 | 76 | 165 | 178 | 100 | 101 | 177 |
| H | 170 | 166 | 165 | 164 | 134 | 178 | 177 | 176 |
| H | 165 | 76 | 77 | 164 | 177 | 101 | 102 | 176 |
| H | 170 | 164 | 163 | 162 | 134 | 176 | 175 | 174 |
| H | 164 | 77 | 78 | 163 | 176 | 102 | 103 | 175 |
| H | 162 | 163 | 78 | 79 | 174 | 175 | 103 | 104 |
| H | 170 | 162 | 161 | 169 | 134 | 174 | 173 | 133 |
| H | 161 | 162 | 79 | 280 | 173 | 174 | 104 | 288 |
| H | 169 | 161 | 280 | 284 | 133 | 173 | 288 | 260 |
| H | 260 | 268 | 276 | 284 | 133 | 145 | 157 | 169 |
| H | 133 | 145 | 157 | 169 | 134 | 146 | 158 | 170 |
| H | 134 | 146 | 158 | 170 | 135 | 147 | 159 | 171 |
| H | 135 | 147 | 159 | 171 | 136 | 148 | 160 | 172 |
| H | 188 | 184 | 183 | 187 | 196 | 192 | 191 | 195 |
| H | 184 | 24 | 23 | 183 | 192 | 49 | 48 | 191 |
| H | 187 | 183 | 182 | 186 | 195 | 191 | 190 | 194 |
| H | 183 | 23 | 22 | 182 | 191 | 48 | 47 | 190 |
| H | 186 | 182 | 181 | 185 | 194 | 190 | 189 | 193 |
| H | 182 | 22 | 21 | 181 | 190 | 47 | 46 | 189 |
| H | 185 | 181 | 220 | 224 | 193 | 189 | 228 | 232 |
| H | 181 | 21 | 20 | 220 | 189 | 46 | 45 | 228 |
| H | 196 | 192 | 191 | 195 | 204 | 200 | 199 | 203 |
| H | 192 | 49 | 48 | 191 | 200 | 74 | 73 | 199 |
| H | 195 | 191 | 190 | 194 | 203 | 199 | 198 | 202 |
| H | 191 | 48 | 47 | 190 | 199 | 73 | 72 | 198 |
| H | 194 | 190 | 189 | 193 | 202 | 198 | 197 | 201 |
| H | 190 | 47 | 46 | 189 | 198 | 72 | 71 | 197 |
| H | 193 | 189 | 228 | 232 | 201 | 197 | 236 | 240 |
| H | 189 | 46 | 45 | 228 | 197 | 71 | 70 | 236 |
| H | 204 | 200 | 199 | 203 | 212 | 208 | 207 | 211 |
| H | 200 | 74 | 73 | 199 | 208 | 99 | 98 | 207 |
| H | 203 | 199 | 198 | 202 | 211 | 207 | 206 | 210 |
| H | 199 | 73 | 72 | 198 | 207 | 98 | 97 | 206 |
| H | 202 | 198 | 197 | 201 | 210 | 206 | 205 | 209 |
| H | 198 | 72 | 71 | 197 | 206 | 97 | 96 | 205 |
| H | 201 | 197 | 236 | 240 | 209 | 205 | 244 | 248 |
| H | 197 | 71 | 70 | 236 | 205 | 96 | 95 | 244 |
| H | 212 | 208 | 207 | 211 | 188 | 216 | 215 | 187 |
| H | 208 | 99 | 98 | 207 | 216 | 124 | 123 | 215 |
| H | 211 | 207 | 206 | 210 | 187 | 215 | 214 | 186 |
| H | 207 | 98 | 97 | 206 | 215 | 123 | 122 | 214 |
| H | 210 | 206 | 205 | 209 | 186 | 214 | 213 | 185 |
| H | 206 | 97 | 96 | 205 | 214 | 122 | 121 | 213 |
| H | 209 | 205 | 244 | 248 | 185 | 213 | 252 | 224 |
| H | 205 | 96 | 95 | 244 | 213 | 121 | 120 | 252 |
| H | 224 | 232 | 240 | 248 | 185 | 193 | 201 | 209 |
| H | 185 | 193 | 201 | 209 | 186 | 194 | 202 | 210 |
| H | 186 | 194 | 202 | 210 | 187 | 195 | 203 | 211 |
| H | 187 | 195 | 203 | 211 | 188 | 196 | 204 | 212 |
| H | 224 | 220 | 219 | 223 | 232 | 228 | 227 | 231 |
| H | 220 | 20 | 15 | 219 | 228 | 45 | 40 | 227 |
| H | 223 | 219 | 218 | 222 | 231 | 227 | 226 | 230 |
| H | 219 | 15 | 10 | 218 | 227 | 40 | 35 | 226 |
| H | 222 | 218 | 217 | 221 | 230 | 226 | 225 | 229 |
| H | 218 | 10 | 5 | 217 | 226 | 35 | 30 | 225 |
| H | 221 | 217 | 132 | 136 | 229 | 225 | 144 | 148 |
| H | 217 | 5 | 0 | 132 | 225 | 30 | 25 | 144 |
| H | 232 | 228 | 227 | 231 | 240 | 236 | 235 | 239 |
| H | 228 | 45 | 40 | 227 | 236 | 70 | 65 | 235 |
| H | 231 | 227 | 226 | 230 | 239 | 235 | 234 | 238 |
| H | 227 | 40 | 35 | 226 | 235 | 65 | 60 | 234 |
| H | 230 | 226 | 225 | 229 | 238 | 234 | 233 | 237 |
| H | 226 | 35 | 30 | 225 | 234 | 60 | 55 | 233 |
| H | 229 | 225 | 144 | 148 | 237 | 233 | 156 | 160 |
| H | 225 | 30 | 25 | 144 | 233 | 55 | 50 | 156 |
| H | 240 | 236 | 235 | 239 | 248 | 244 | 243 | 247 |
| H | 236 | 70 | 65 | 235 | 244 | 95 | 90 | 243 |
| H | 239 | 235 | 234 | 238 | 247 | 243 | 242 | 246 |
| H | 235 | 65 | 60 | 234 | 243 | 90 | 85 | 242 |
| H | 238 | 234 | 233 | 237 | 246 | 242 | 241 | 245 |
| H | 234 | 60 | 55 | 233 | 242 | 85 | 80 | 241 |
| H | 237 | 233 | 156 | 160 | 245 | 241 | 168 | 172 |
| H | 233 | 55 | 50 | 156 | 241 | 80 | 75 | 168 |
| H | 248 | 244 | 243 | 247 | 224 | 252 | 251 | 223 |
| H | 244 | 95 | 90 | 243 | 252 | 120 | 115 | 251 |
| H | 247 | 243 | 242 | 246 | 223 | 251 | 250 | 222 |
| H | 243 | 90 | 85 | 242 | 251 | 115 | 110 | 250 |
| H | 246 | 242 | 241 | 245 | 222 | 250 | 249 | 221 |
| H | 242 | 85 | 80 | 241 | 250 | 110 | 105 | 249 |

-continued

Sub-template Table-9 (4 × 4 Double Hoop Single Triangular Core: Left Wingface is a triangular pattern)

| | | | | | | | | |
|---|---|---|---|---|---|---|---|---|
| H | 245 | 241 | 168 | 172 | 221 | 249 | 180 | 136 |
| H | 241 | 80 | 75 | 168 | 249 | 105 | 100 | 180 |
| H | 136 | 148 | 160 | 172 | 221 | 229 | 237 | 245 |
| H | 221 | 229 | 237 | 245 | 222 | 230 | 238 | 246 |
| H | 222 | 230 | 238 | 246 | 223 | 231 | 239 | 247 |
| H | 223 | 231 | 239 | 247 | 224 | 232 | 240 | 248 |
| H | 260 | 256 | 255 | 259 | 268 | 264 | 263 | 267 |
| H | 256 | 4 | 9 | 255 | 264 | 29 | 34 | 263 |
| H | 259 | 255 | 254 | 258 | 267 | 263 | 262 | 266 |
| H | 255 | 9 | 14 | 254 | 263 | 34 | 39 | 262 |
| H | 258 | 254 | 253 | 257 | 266 | 262 | 261 | 265 |
| H | 254 | 14 | 19 | 253 | 262 | 39 | 44 | 261 |
| H | 257 | 253 | 184 | 188 | 265 | 261 | 192 | 196 |
| H | 253 | 19 | 24 | 184 | 261 | 44 | 49 | 192 |
| H | 268 | 264 | 263 | 267 | 276 | 272 | 271 | 275 |
| H | 264 | 29 | 34 | 263 | 272 | 54 | 59 | 271 |
| H | 267 | 263 | 262 | 266 | 275 | 271 | 270 | 274 |
| H | 263 | 34 | 39 | 262 | 271 | 59 | 64 | 270 |
| H | 266 | 262 | 261 | 265 | 274 | 270 | 269 | 273 |
| H | 262 | 39 | 44 | 261 | 270 | 64 | 69 | 269 |
| H | 265 | 261 | 192 | 196 | 273 | 269 | 200 | 204 |
| H | 261 | 44 | 49 | 192 | 269 | 69 | 74 | 200 |
| H | 276 | 272 | 271 | 275 | 284 | 280 | 279 | 283 |
| H | 272 | 54 | 59 | 271 | 280 | 79 | 84 | 279 |
| H | 275 | 271 | 270 | 274 | 283 | 279 | 278 | 282 |
| H | 271 | 59 | 64 | 270 | 279 | 84 | 89 | 278 |
| H | 274 | 270 | 269 | 273 | 282 | 278 | 277 | 281 |
| H | 270 | 64 | 69 | 269 | 278 | 89 | 94 | 277 |
| H | 273 | 269 | 200 | 204 | 281 | 277 | 208 | 212 |
| H | 269 | 69 | 74 | 200 | 277 | 94 | 99 | 208 |
| H | 284 | 280 | 279 | 283 | 260 | 288 | 287 | 259 |
| H | 280 | 79 | 84 | 279 | 288 | 104 | 109 | 287 |
| H | 283 | 279 | 278 | 282 | 259 | 287 | 286 | 258 |
| H | 279 | 84 | 89 | 278 | 287 | 109 | 114 | 286 |
| H | 282 | 278 | 277 | 281 | 258 | 286 | 285 | 257 |
| H | 278 | 89 | 94 | 277 | 286 | 114 | 119 | 285 |
| H | 281 | 277 | 208 | 212 | 257 | 285 | 216 | 188 |
| H | 277 | 94 | 99 | 208 | 285 | 119 | 124 | 216 |
| H | 188 | 196 | 204 | 212 | 257 | 265 | 273 | 281 |
| H | 257 | 265 | 273 | 281 | 258 | 266 | 274 | 282 |
| H | 258 | 266 | 274 | 282 | 259 | 267 | 275 | 283 |
| H | 259 | 267 | 275 | 283 | 260 | 268 | 276 | 284 |

CN1 4
CN2 4
SLOT 0
| | | | | |
|---|---|---|---|---|
| 20 | 21 | 22 | 23 | 24 |
| 15 | 16 | 17 | 18 | 19 |
| 10 | 11 | 12 | 13 | 14 |
| 5 | 6 | 7 | 8 | 9 |
| 0 | 1 | 2 | 3 | 4 |

SLOT 1
| | | | | |
|---|---|---|---|---|
| 124 | 123 | 122 | 121 | 120 |
| 119 | 118 | 117 | 116 | 115 |
| 114 | 113 | 112 | 111 | 110 |
| 109 | 108 | 107 | 106 | 105 |
| 104 | 103 | 102 | 101 | 100 |

SLOT 2
| | | | | |
|---|---|---|---|---|
| 120 | 252 | 224 | 220 | 20 |
| 115 | 251 | 223 | 219 | 15 |
| 120 | 250 | 222 | 218 | 10 |
| 105 | 249 | 221 | 217 | 5 |
| 100 | 180 | 136 | 132 | 0 |

SLOT 3
| | | | | |
|---|---|---|---|---|
| 24 | 184 | 188 | 216 | 124 |
| 19 | 253 | 257 | 285 | 119 |
| 14 | 254 | 258 | 286 | 114 |
| 9 | 255 | 259 | 287 | 109 |
| 4 | 256 | 260 | 288 | 104 |

Sub-template Table-10 (4 × 4 Double Hoop Single Triangular Core: Right Wingface is a triangular pattern)

| | | | |
|---|---|---|---|
| V | −1.000000 | 1.000000 | 1.000000 |
| V | −1.000000 | 1.000000 | 0.500000 |
| V | −1.000000 | 1.000000 | 0.000000 |
| V | −1.000000 | 1.000000 | −0.500000 |
| V | −1.000000 | 1.000000 | −1.000000 |
| V | −0.500000 | 0.500000 | 0.500000 |
| V | −0.500000 | 0.500000 | 0.250000 |
| V | −0.500000 | 0.500000 | 0.000000 |
| V | −0.500000 | 0.500000 | −0.250000 |
| V | −0.500000 | 0.500000 | −0.500000 |
| V | 0.000000 | 0.400000 | 0.400000 |
| V | 0.000000 | 0.400000 | 0.200000 |
| V | 0.000000 | 0.400000 | 0.000000 |
| V | 0.000000 | 0.400000 | −0.200000 |
| V | 0.000000 | 0.400000 | −0.400000 |
| V | 0.500000 | 0.500000 | 0.500000 |
| V | 0.500000 | 0.500000 | 0.250000 |
| V | 0.500000 | 0.500000 | 0.000000 |
| V | 0.500000 | 0.500000 | −0.250000 |
| V | 0.500000 | 0.500000 | −0.500000 |
| V | 1.000000 | 1.000000 | 1.000000 |
| V | 1.000000 | 1.000000 | 0.500000 |
| V | 1.000000 | 1.000000 | 0.000000 |
| V | 1.000000 | 1.000000 | −0.500000 |
| V | 1.000000 | 1.000000 | −1.000000 |
| V | −0.500000 | 0.250000 | 0.250000 |
| V | −0.500000 | 0.250000 | 0.125000 |
| V | −0.500000 | 0.250000 | 0.000000 |
| V | −0.500000 | 0.250000 | −0.125000 |
| V | −0.500000 | 0.250000 | −0.250000 |
| V | −0.250000 | 0.225000 | 0.225000 |
| V | −0.250000 | 0.225000 | 0.112500 |
| V | −0.250000 | 0.225000 | 0.000000 |
| V | −0.250000 | 0.225000 | −0.112500 |
| V | −0.250000 | 0.225000 | −0.225000 |
| V | 0.000000 | 0.200000 | 0.200000 |
| V | 0.000000 | 0.200000 | 0.100000 |
| V | 0.000000 | 0.200000 | 0.000000 |
| V | 0.000000 | 0.200000 | −0.100000 |
| V | 0.000000 | 0.200000 | −0.200000 |
| V | 0.250000 | 0.225000 | 0.225000 |
| V | 0.250000 | 0.225000 | 0.112500 |
| V | 0.250000 | 0.225000 | 0.000000 |
| V | 0.250000 | 0.225000 | −0.112500 |
| V | 0.250000 | 0.225000 | −0.225000 |
| V | 0.500000 | 0.250000 | 0.250000 |
| V | 0.500000 | 0.250000 | 0.125000 |
| V | 0.500000 | 0.250000 | 0.000000 |
| V | 0.500000 | 0.250000 | −0.125000 |
| V | 0.500000 | 0.250000 | −0.250000 |
| V | −0.400000 | 0.000000 | 0.192000 |
| V | −0.400000 | 0.000000 | 0.096000 |
| V | −0.400000 | 0.000000 | 0.000000 |
| V | −0.400000 | 0.000000 | −0.096000 |
| V | −0.400000 | 0.000000 | −0.192000 |
| V | −0.200000 | 0.000000 | 0.176000 |
| V | −0.200000 | 0.000000 | 0.088000 |
| V | −0.200000 | 0.000000 | 0.000000 |
| V | −0.200000 | 0.000000 | −0.088000 |
| V | −0.200000 | 0.000000 | −0.176000 |
| V | 0.000000 | 0.000000 | 0.160000 |
| V | 0.000000 | 0.000000 | 0.080000 |
| V | 0.000000 | 0.000000 | 0.000000 |
| V | 0.000000 | 0.000000 | −0.080000 |
| V | 0.000000 | 0.000000 | −0.160000 |
| V | 0.200000 | 0.000000 | 0.176000 |
| V | 0.200000 | 0.000000 | 0.088000 |
| V | 0.200000 | 0.000000 | 0.000000 |
| V | 0.200000 | 0.000000 | −0.088000 |
| V | 0.200000 | 0.000000 | −0.176000 |
| V | 0.400000 | 0.000000 | 0.192000 |
| V | 0.400000 | 0.000000 | 0.096000 |
| V | 0.400000 | 0.000000 | 0.000000 |
| V | 0.400000 | 0.000000 | −0.096000 |
| V | 0.400000 | 0.000000 | −0.192000 |

Sub-template Table-10 (4 × 4 Double Hoop Single Triangular Core: Right Wingface 15 a triangular pattern)

| | | | |
|---|---|---|---|
| V | −0.500000 | −0.250000 | 0.250000 |
| V | −0.500000 | −0.250000 | 0.125000 |
| V | −0.500000 | −0.250000 | 0.000000 |
| V | −0.500000 | −0.250000 | −0.125000 |
| V | −0.500000 | −0.250000 | −0.250000 |
| V | −0.250000 | −0.225000 | 0.225000 |
| V | −0.250000 | −0.225000 | 0.112500 |
| V | −0.250000 | −0.225000 | 0.000000 |
| V | −0.250000 | −0.225000 | −0.112500 |
| V | −0.250000 | −0.225000 | −0.225000 |
| V | 0.000000 | −0.200000 | 0.200000 |
| V | 0.000000 | −0.200000 | 0.100000 |
| V | 0.000000 | −0.200000 | 0.000000 |
| V | 0.000000 | −0.200000 | −0.100000 |
| V | 0.000000 | −0.200000 | −0.200000 |
| V | 0.250000 | −0.225000 | 0.225000 |
| V | 0.250000 | −0.225000 | 0.112500 |
| V | 0.250000 | −0.225000 | 0.000000 |
| V | 0.250000 | −0.225000 | −0.112500 |
| V | 0.250000 | −0.225000 | −0.225000 |
| V | 0.500000 | −0.250000 | 0.250000 |
| V | 0.500000 | −0.250000 | 0.125000 |
| V | 0.500000 | −0.250000 | 0.000000 |
| V | 0.500000 | −0.250000 | −0.125000 |
| V | 0.500000 | −0.250000 | −0.250000 |
| V | −1.000000 | −1.000000 | 1.000000 |
| V | −1.000000 | −1.000000 | 0.500000 |
| V | −1.000000 | −1.000000 | 0.000000 |
| V | −1.000000 | −1.000000 | −0.500000 |
| V | −1.000000 | −1.000000 | −1.000000 |
| V | −0.500000 | −0.500000 | 0.500000 |
| V | −0.500000 | −0.500000 | 0.250000 |
| V | −0.500000 | −0.500000 | 0.000000 |
| V | −0.500000 | −0.500000 | −0.250000 |
| V | −0.500000 | −0.500000 | −0.500000 |
| V | 0.000000 | −0.400000 | 0.400000 |
| V | 0.000000 | −0.400000 | 0.200000 |
| V | 0.000000 | −0.400000 | 0.000000 |
| V | 0.000000 | −0.400000 | −0.200000 |
| V | 0.000000 | −0.400000 | −0.400000 |
| V | 0.500000 | −0.500000 | 0.500000 |
| V | 0.500000 | −0.500000 | 0.250000 |
| V | 0.500000 | −0.500000 | 0.000000 |
| V | 0.500000 | −0.500000 | −0.250000 |
| V | 0.500000 | −0.500000 | −0.500000 |
| V | 1.000000 | −1.000000 | 1.000000 |
| V | 1.000000 | −1.000000 | 0.500000 |
| V | 1.000000 | −1.000000 | 0.000000 |
| V | 1.000000 | −1.000000 | −0.500000 |
| V | 1.000000 | −1.000000 | −1.000000 |
| V | −1.000000 | 0.500000 | −0.500000 |
| V | −1.000000 | 0.500000 | 0.000000 |
| V | −1.000000 | 0.500000 | 0.500000 |
| V | −1.000000 | 0.500000 | 1.000000 |
| V | −1.000000 | 0.000000 | −0.500000 |
| V | −1.000000 | 0.000000 | 0.000000 |
| V | −1.000000 | 0.000000 | 0.500000 |
| V | −1.000000 | 0.000000 | 1.000000 |
| V | −0.575000 | 0.186875 | −0.165312 |
| V | −0.575000 | 0.186875 | 0.000000 |
| V | −0.575000 | 0.186875 | 0.165312 |
| V | −0.575000 | 0.186875 | 0.330625 |
| V | −0.650000 | 0.097500 | −0.211250 |
| V | −0.650000 | 0.097500 | 0.000000 |
| V | −0.650000 | 0.097500 | 0.211250 |
| V | −0.650000 | 0.097500 | 0.422500 |
| V | −0.500000 | 0.000000 | −0.125000 |
| V | −0.500000 | 0.000000 | 0.000000 |
| V | −0.500000 | 0.000000 | 0.125000 |
| V | −0.500000 | 0.000000 | 0.250000 |
| V | −0.600000 | 0.000000 | −0.180000 |
| V | −0.600000 | 0.000000 | 0.000000 |
| V | −0.600000 | 0.000000 | 0.180000 |
| V | −0.600000 | 0.000000 | 0.360000 |
| V | −0.575000 | −0.186875 | −0.165312 |
| V | −0.575000 | −0.186875 | 0.000000 |
| V | −0.575000 | −0.186875 | 0.165312 |
| V | −0.575000 | −0.186875 | 0.330625 |
| V | −0.650000 | −0.097500 | −0.211250 |
| V | −0.650000 | −0.097500 | 0.000000 |
| V | −0.650000 | −0.097500 | 0.211250 |
| V | −0.650000 | −0.097500 | 0.422500 |
| V | −1.000000 | −0.500000 | −0.500000 |
| V | −1.000000 | −0.500000 | 0.000000 |
| V | −1.000000 | −0.500000 | 0.500000 |
| V | −1.000000 | −0.500000 | 1.000000 |
| V | 1.000000 | 0.400000 | 0.600000 |
| V | 1.000000 | 0.500000 | 0.500000 |
| V | 1.000000 | 0.600000 | 0.400000 |
| V | 1.000000 | 0.500000 | 0.000000 |
| V | 1.000000 | 0.600000 | −0.400000 |
| V | 1.000000 | 0.500000 | −0.500000 |
| V | 1.000000 | 0.400000 | −0.600000 |
| V | 1.000000 | 0.500000 | −1.000000 |
| V | 1.000000 | 0.000000 | 0.500000 |
| V | 1.000000 | 0.000000 | 0.000000 |
| V | 1.000000 | 0.000000 | −0.500000 |
| V | 1.000000 | 0.000000 | −1.000000 |
| V | 0.590000 | 0.171100 | 0.208860 |
| V | 0.575000 | 0.186875 | 0.165312 |
| V | 0.560000 | 0.201600 | 0.125440 |
| V | 0.575000 | 0.186875 | 0.000000 |
| V | 0.560000 | 0.201600 | −0.125440 |
| V | 0.575000 | 0.186875 | −0.165312 |
| V | 0.590000 | 0.171100 | −0.208860 |
| V | 0.575000 | 0.186875 | −0.330625 |
| V | 0.650000 | 0.097500 | 0.211250 |
| V | 0.650000 | 0.097500 | 0.000000 |
| V | 0.650000 | 0.097500 | −0.211250 |
| V | 0.650000 | 0.097500 | −0.422500 |
| V | 0.520000 | 0.000000 | 0.162240 |
| V | 0.500000 | 0.000000 | 0.125000 |
| V | 0.480000 | 0.000000 | 0.095232 |
| V | 0.500000 | 0.000000 | 0.000000 |
| V | 0.480000 | 0.000000 | −0.095232 |
| V | 0.500000 | 0.000000 | −0.125000 |
| V | 0.520000 | 0.000000 | −0.162240 |
| V | 0.500000 | 0.000000 | −0.250000 |
| V | 0.600000 | 0.000000 | 0.180000 |
| V | 0.600000 | 0.000000 | 0.000000 |
| V | 0.600000 | 0.000000 | −0.180000 |
| V | 0.600000 | 0.000000 | −0.360000 |
| V | 0.590000 | −0.171100 | 0.208860 |
| V | 0.575000 | −0.186875 | 0.165312 |
| V | 0.560000 | −0.201600 | 0.125440 |
| V | 0.575000 | −0.186875 | 0.000000 |
| V | 0.560000 | −0.201600 | −0.125440 |
| V | 0.575000 | −0.186875 | −0.165312 |
| V | 0.590000 | −0.171100 | −0.208860 |
| V | 0.575000 | −0.186875 | −0.330625 |
| V | 0.650000 | −0.097500 | 0.211250 |
| V | 0.650000 | −0.097500 | 0.000000 |
| V | 0.650000 | −0.097500 | −0.211250 |
| V | 0.650000 | −0.097500 | −0.422500 |
| V | 1.000000 | −0.400000 | 0.600000 |
| V | 1.000000 | −0.500000 | 0.500000 |
| V | 1.000000 | −0.600000 | 0.400000 |
| V | 1.000000 | −0.500000 | 0.000000 |
| V | 1.000000 | −0.600000 | −0.400000 |
| V | 1.000000 | −0.500000 | −0.500000 |
| V | 1.000000 | −0.400000 | −0.600000 |
| V | 1.000000 | −0.500000 | −1.000000 |
| V | −0.500000 | 0.250000 | 0.500000 |
| V | 0.000000 | 0.200000 | 0.400000 |
| V | 0.500000 | 0.250000 | 0.500000 |
| V | 1.000000 | 0.500000 | 1.000000 |
| V | −0.500000 | 0.000000 | 0.500000 |
| V | 0.000000 | 0.000000 | 0.400000 |
| V | 0.500000 | 0.000000 | 0.500000 |
| V | 1.000000 | 0.000000 | 1.000000 |

Sub-template Table-10 (4 × 4 Double Hoop Single Triangular Core: Right Wingface 15 a triangular pattern)

| | | | | | | | |
|---|---|---|---|---|---|---|---|
| V | −0.287500 | 0.148688 | 0.263062 | | | | |
| V | 0.000000 | 0.130000 | 0.230000 | | | | |
| V | 0.287500 | 0.148688 | 0.263062 | | | | |
| V | 0.575000 | 0.186875 | 0.330625 | | | | |
| V | −0.325000 | 0.069750 | 0.302250 | | | | |
| V | 0.000000 | 0.060000 | 0.260000 | | | | |
| V | 0.325000 | 0.069750 | 0.302250 | | | | |
| V | 0.650000 | 0.097500 | 0.422500 | | | | |
| V | −0.250000 | 0.000000 | 0.225000 | | | | |
| V | 0.000000 | 0.000000 | 0.200000 | | | | |
| V | 0.250000 | 0.000000 | 0.225000 | | | | |
| V | 0.500000 | 0.000000 | 0.250000 | | | | |
| V | −0.300000 | 0.000000 | 0.276000 | | | | |
| V | 0.000000 | 0.000000 | 0.240000 | | | | |
| V | 0.300000 | 0.000000 | 0.276000 | | | | |
| V | 0.600000 | 0.000000 | 0.360000 | | | | |
| V | −0.287500 | −0.148688 | 0.263062 | | | | |
| V | 0.000000 | −0.130000 | 0.230000 | | | | |
| V | 0.287500 | −0.148688 | 0.263062 | | | | |
| V | 0.575000 | −0.186875 | 0.330625 | | | | |
| V | −0.325000 | −0.069750 | 0.302250 | | | | |
| V | 0.000000 | −0.060000 | 0.260000 | | | | |
| V | 0.325000 | −0.069750 | 0.302250 | | | | |
| V | 0.650000 | −0.097500 | 0.422500 | | | | |
| V | −0.500000 | −0.250000 | 0.500000 | | | | |
| V | 0.000000 | −0.200000 | 0.400000 | | | | |
| V | 0.500000 | −0.250000 | 0.500000 | | | | |
| V | 1.000000 | −0.500000 | 1.000000 | | | | |
| V | 0.500000 | 0.250000 | −0.500000 | | | | |
| V | 0.000000 | 0.200000 | −0.400000 | | | | |
| V | −0.500000 | 0.250000 | −0.500000 | | | | |
| V | −1.000000 | 0.500000 | −1.000000 | | | | |
| V | 0.500000 | 0.000000 | −0.500000 | | | | |
| V | 0.000000 | 0.000000 | −0.400000 | | | | |
| V | −0.500000 | 0.000000 | −0.500000 | | | | |
| V | −1.000000 | 0.000000 | −1.000000 | | | | |
| V | 0.287500 | 0.148688 | −0.263062 | | | | |
| V | 0.000000 | 0.130000 | −0.230000 | | | | |
| V | −0.287500 | 0.148688 | 0.263062 | | | | |
| V | −0.575000 | 0.186875 | −0.330625 | | | | |
| V | 0.325000 | 0.069750 | −0.302250 | | | | |
| V | 0.000000 | 0.060000 | −0.260000 | | | | |
| V | −0.325000 | 0.069750 | −0.302250 | | | | |
| V | −0.650000 | 0.097500 | −0.422500 | | | | |
| V | 0.250000 | 0.000000 | −0.225000 | | | | |
| V | 0.000000 | 0.000000 | −0.200000 | | | | |
| V | −0.250000 | 0.000000 | −0.225000 | | | | |
| V | −0.500000 | 0.000000 | −0.250000 | | | | |
| V | 0.300000 | 0.000000 | −0.276000 | | | | |
| V | 0.000000 | 0.000000 | −0.240000 | | | | |
| V | −0.300000 | 0.000000 | −0.276000 | | | | |
| V | −0.600000 | 0.000000 | −0.360000 | | | | |
| V | 0.287500 | −0.148688 | −0.263062 | | | | |
| V | 0.000000 | −0.130000 | −0.230000 | | | | |
| V | −0.287500 | −0.148688 | −0.263062 | | | | |
| V | −0.575000 | −0.186875 | −0.330625 | | | | |
| V | 0.325000 | −0.069750 | −0.302250 | | | | |
| V | 0.000000 | −0.060000 | −0.260000 | | | | |
| V | −0.325000 | −0.069750 | −0.302250 | | | | |
| V | −0.650000 | −0.097500 | −0.422500 | | | | |
| V | 0.500000 | −0.250000 | −0.500000 | | | | |
| V | 0.000000 | −0.200000 | −0.400000 | | | | |
| V | −0.500000 | −0.250000 | −0.500000 | | | | |
| V | −1.000000 | −0.500000 | −1.000000 | | | | |
| H | 25 | 26 | 31 | 30 | 0 | 1 | 6 | 5 |
| H | 26 | 27 | 32 | 31 | 1 | 2 | 7 | 6 |
| H | 27 | 28 | 33 | 32 | 2 | 3 | 8 | 7 |
| H | 28 | 29 | 34 | 33 | 3 | 4 | 9 | 8 |
| H | 30 | 31 | 36 | 35 | 5 | 6 | 11 | 10 |
| H | 31 | 32 | 37 | 36 | 6 | 7 | 12 | 11 |
| H | 32 | 33 | 38 | 37 | 7 | 8 | 13 | 12 |
| H | 33 | 34 | 39 | 38 | 8 | 9 | 14 | 13 |
| H | 35 | 36 | 41 | 40 | 10 | 11 | 16 | 15 |
| H | 36 | 37 | 42 | 41 | 11 | 12 | 17 | 16 |
| H | 37 | 38 | 43 | 42 | 12 | 13 | 18 | 17 |
| H | 38 | 39 | 44 | 43 | 13 | 14 | 19 | 18 |
| H | 40 | 41 | 46 | 45 | 15 | 16 | 21 | 20 |
| H | 41 | 42 | 47 | 46 | 16 | 17 | 22 | 21 |
| H | 42 | 43 | 48 | 47 | 17 | 18 | 23 | 22 |
| H | 43 | 44 | 49 | 48 | 18 | 19 | 24 | 23 |
| H | 50 | 51 | 56 | 55 | 25 | 26 | 31 | 30 |
| H | 51 | 52 | 57 | 56 | 26 | 27 | 32 | 31 |
| H | 52 | 53 | 58 | 57 | 27 | 28 | 33 | 32 |
| H | 53 | 54 | 59 | 58 | 28 | 29 | 34 | 33 |
| H | 55 | 56 | 61 | 60 | 30 | 31 | 36 | 35 |
| H | 56 | 57 | 62 | 61 | 31 | 32 | 37 | 36 |
| H | 57 | 58 | 63 | 62 | 32 | 33 | 38 | 37 |
| H | 58 | 59 | 64 | 63 | 33 | 34 | 39 | 38 |
| H | 60 | 61 | 66 | 65 | 35 | 36 | 41 | 40 |
| H | 61 | 62 | 67 | 66 | 36 | 37 | 42 | 41 |
| H | 62 | 63 | 68 | 67 | 37 | 38 | 43 | 42 |
| H | 63 | 64 | 69 | 68 | 38 | 39 | 44 | 43 |
| H | 65 | 66 | 71 | 70 | 40 | 41 | 46 | 45 |
| H | 66 | 67 | 72 | 71 | 41 | 42 | 47 | 46 |
| H | 67 | 68 | 73 | 72 | 42 | 43 | 48 | 47 |
| H | 68 | 69 | 74 | 73 | 43 | 44 | 49 | 48 |
| H | 75 | 76 | 81 | 80 | 50 | 51 | 56 | 55 |
| H | 76 | 77 | 82 | 81 | 51 | 52 | 57 | 56 |
| H | 77 | 78 | 83 | 82 | 52 | 53 | 58 | 57 |
| H | 78 | 79 | 84 | 83 | 53 | 54 | 59 | 58 |
| H | 80 | 81 | 86 | 85 | 55 | 56 | 61 | 60 |
| H | 81 | 82 | 87 | 86 | 56 | 57 | 62 | 61 |
| H | 82 | 83 | 88 | 87 | 57 | 58 | 63 | 62 |
| H | 83 | 84 | 89 | 88 | 58 | 59 | 64 | 63 |
| H | 85 | 86 | 91 | 90 | 60 | 61 | 66 | 65 |
| H | 86 | 87 | 92 | 91 | 61 | 62 | 67 | 66 |
| H | 87 | 88 | 93 | 92 | 62 | 63 | 68 | 67 |
| H | 88 | 89 | 94 | 93 | 63 | 64 | 69 | 68 |
| H | 90 | 91 | 96 | 95 | 65 | 66 | 71 | 70 |
| H | 91 | 92 | 97 | 96 | 66 | 67 | 72 | 71 |
| H | 92 | 93 | 98 | 97 | 67 | 68 | 73 | 72 |
| H | 93 | 94 | 99 | 98 | 68 | 69 | 74 | 73 |
| H | 100 | 101 | 106 | 105 | 75 | 76 | 81 | 80 |
| H | 101 | 102 | 107 | 106 | 76 | 77 | 82 | 81 |
| H | 102 | 103 | 108 | 107 | 77 | 78 | 83 | 82 |
| H | 103 | 104 | 109 | 108 | 78 | 79 | 84 | 83 |
| H | 105 | 106 | 111 | 110 | 80 | 81 | 86 | 85 |
| H | 106 | 107 | 112 | 111 | 81 | 82 | 87 | 86 |
| H | 107 | 108 | 113 | 112 | 82 | 83 | 88 | 87 |
| H | 108 | 109 | 114 | 113 | 83 | 84 | 89 | 88 |
| H | 110 | 111 | 116 | 115 | 85 | 86 | 91 | 90 |
| H | 111 | 112 | 117 | 116 | 86 | 87 | 92 | 91 |
| H | 112 | 113 | 118 | 117 | 87 | 88 | 93 | 92 |
| H | 113 | 114 | 119 | 118 | 88 | 89 | 94 | 93 |
| H | 115 | 116 | 121 | 120 | 90 | 91 | 96 | 95 |
| H | 116 | 117 | 122 | 121 | 91 | 92 | 97 | 96 |
| H | 117 | 118 | 123 | 122 | 92 | 93 | 98 | 97 |
| H | 118 | 119 | 124 | 123 | 93 | 94 | 99 | 98 |
| H | 132 | 128 | 127 | 131 | 140 | 136 | 135 | 139 |
| H | 128 | 0 | 1 | 127 | 136 | 25 | 26 | 135 |
| H | 131 | 127 | 126 | 130 | 139 | 135 | 134 | 138 |
| H | 127 | 1 | 2 | 126 | 135 | 26 | 27 | 134 |
| H | 130 | 126 | 125 | 129 | 138 | 134 | 133 | 137 |
| H | 126 | 2 | 3 | 125 | 134 | 27 | 28 | 133 |
| H | 129 | 125 | 256 | 260 | 137 | 133 | 264 | 268 |
| H | 125 | 3 | 4 | 256 | 133 | 28 | 29 | 264 |
| H | 140 | 136 | 135 | 139 | 148 | 144 | 143 | 147 |
| H | 136 | 25 | 26 | 135 | 144 | 50 | 51 | 143 |
| H | 139 | 135 | 134 | 138 | 147 | 143 | 142 | 146 |
| H | 135 | 26 | 27 | 134 | 143 | 51 | 52 | 142 |
| H | 138 | 134 | 133 | 137 | 146 | 142 | 141 | 145 |
| H | 134 | 27 | 28 | 133 | 142 | 52 | 53 | 141 |
| H | 137 | 133 | 264 | 268 | 145 | 141 | 272 | 276 |
| H | 133 | 28 | 29 | 264 | 141 | 53 | 54 | 272 |
| H | 148 | 144 | 143 | 147 | 156 | 152 | 151 | 155 |
| H | 144 | 50 | 51 | 143 | 152 | 75 | 76 | 151 |
| H | 147 | 143 | 142 | 146 | 155 | 151 | 150 | 154 |
| H | 143 | 51 | 52 | 142 | 151 | 76 | 77 | 150 |
| H | 146 | 142 | 141 | 145 | 154 | 150 | 149 | 153 |
| H | 142 | 52 | 53 | 141 | 150 | 77 | 78 | 149 |

-continued

Sub-template Table-10 (4 × 4 Double Hoop
Single Triangular Core: Right Wingface 15
a triangular pattern)

| | | | | | | | | |
|---|---|---|---|---|---|---|---|---|
| H | 145 | 141 | 272 | 276 | 153 | 149 | 280 | 284 |
| H | 141 | 53 | 54 | 272 | 149 | 78 | 79 | 280 |
| H | 156 | 152 | 151 | 155 | 132 | 160 | 159 | 131 |
| H | 152 | 75 | 76 | 151 | 160 | 100 | 101 | 159 |
| H | 155 | 151 | 150 | 154 | 131 | 159 | 158 | 130 |
| H | 151 | 76 | 77 | 150 | 159 | 101 | 102 | 158 |
| H | 154 | 150 | 149 | 153 | 130 | 158 | 157 | 129 |
| H | 150 | 77 | 78 | 149 | 158 | 102 | 103 | 157 |
| H | 153 | 149 | 280 | 284 | 129 | 157 | 288 | 260 |
| H | 149 | 78 | 79 | 280 | 157 | 103 | 104 | 288 |
| H | 260 | 268 | 276 | 284 | 129 | 137 | 145 | 153 |
| H | 129 | 137 | 145 | 153 | 130 | 138 | 146 | 154 |
| H | 130 | 138 | 146 | 154 | 131 | 139 | 147 | 155 |
| H | 1 | 139 | 147 | 155 | 132 | 140 | 148 | 156 |
| H | 172 | 168 | 167 | 171 | 184 | 180 | 179 | 183 |
| H | 168 | 24 | 166 | 167 | 180 | 49 | 178 | 179 |
| H | 171 | 167 | 166 | 170 | 183 | 179 | 178 | 182 |
| H | 166 | 24 | 23 | 165 | 178 | 49 | 48 | 177 |
| H | 170 | 166 | 165 | 164 | 182 | 178 | 177 | 176 |
| H | 165 | 23 | 22 | 164 | 177 | 48 | 47 | 176 |
| H | 170 | 164 | 163 | 162 | 182 | 176 | 175 | 174 |
| H | 164 | 22 | 21 | 163 | 176 | 47 | 46 | 175 |
| H | 162 | 163 | 21 | 20 | 174 | 175 | 46 | 45 |
| H | 170 | 162 | 161 | 169 | 182 | 174 | 173 | 181 |
| H | 161 | 162 | 20 | 220 | 173 | 174 | 45 | 228 |
| H | 169 | 161 | 220 | 224 | 181 | 173 | 228 | 232 |
| H | 184 | 180 | 179 | 183 | 196 | 192 | 191 | 195 |
| H | 180 | 49 | 178 | 179 | 192 | 74 | 190 | 191 |
| H | 183 | 179 | 178 | 182 | 195 | 191 | 190 | 194 |
| H | 178 | 49 | 48 | 177 | 190 | 74 | 73 | 189 |
| H | 182 | 178 | 177 | 176 | 194 | 190 | 189 | 188 |
| H | 177 | 48 | 47 | 176 | 189 | 73 | 72 | 188 |
| H | 182 | 176 | 175 | 174 | 194 | 188 | 187 | 186 |
| H | 176 | 47 | 46 | 175 | 188 | 72 | 71 | 187 |
| H | 174 | 175 | 46 | 45 | 186 | 187 | 71 | 70 |
| H | 182 | 174 | 173 | 181 | 194 | 186 | 185 | 193 |
| H | 173 | 174 | 45 | 228 | 185 | 186 | 70 | 236 |
| H | 181 | 173 | 228 | 232 | 193 | 185 | 236 | 240 |
| H | 196 | 192 | 191 | 195 | 208 | 204 | 203 | 207 |
| H | 192 | 74 | 190 | 191 | 204 | 99 | 202 | 203 |
| H | 195 | 191 | 190 | 194 | 207 | 203 | 202 | 206 |
| H | 190 | 74 | 73 | 189 | 202 | 99 | 98 | 201 |
| H | 194 | 190 | 189 | 188 | 206 | 202 | 201 | 200 |
| H | 189 | 73 | 72 | 188 | 201 | 98 | 97 | 200 |
| H | 194 | 188 | 187 | 186 | 206 | 200 | 199 | 198 |
| H | 188 | 72 | 71 | 187 | 200 | 97 | 96 | 199 |
| H | 186 | 187 | 71 | 70 | 198 | 199 | 96 | 95 |
| H | 194 | 186 | 185 | 193 | 206 | 198 | 197 | 205 |
| H | 185 | 186 | 70 | 236 | 197 | 198 | 95 | 244 |
| H | 193 | 185 | 236 | 240 | 205 | 197 | 244 | 248 |
| H | 208 | 204 | 203 | 207 | 172 | 216 | 215 | 171 |
| H | 204 | 99 | 202 | 203 | 216 | 124 | 214 | 215 |
| H | 207 | 203 | 202 | 206 | 171 | 215 | 214 | 170 |
| H | 202 | 99 | 98 | 201 | 214 | 124 | 123 | 213 |
| H | 206 | 202 | 201 | 200 | 170 | 214 | 213 | 212 |
| H | 201 | 98 | 97 | 200 | 213 | 123 | 122 | 212 |
| H | 206 | 200 | 199 | 198 | 170 | 212 | 211 | 210 |
| H | 200 | 97 | 96 | 199 | 212 | 122 | 121 | 211 |
| H | 198 | 199 | 96 | 95 | 210 | 211 | 121 | 120 |
| H | 206 | 198 | 197 | 205 | 170 | 210 | 209 | 169 |
| H | 197 | 198 | 95 | 244 | 209 | 210 | 120 | 252 |
| H | 205 | 197 | 244 | 248 | 169 | 209 | 252 | 224 |
| H | 224 | 232 | 240 | 248 | 169 | 181 | 193 | 205 |
| H | 169 | 181 | 193 | 205 | 170 | 182 | 194 | 206 |
| H | 170 | 182 | 194 | 206 | 171 | 183 | 195 | 207 |
| H | 171 | 183 | 195 | 207 | 172 | 184 | 196 | 208 |
| H | 224 | 220 | 219 | 223 | 232 | 228 | 227 | 231 |
| H | 220 | 20 | 15 | 219 | 228 | 45 | 40 | 227 |
| H | 223 | 219 | 218 | 222 | 231 | 227 | 226 | 230 |
| H | 219 | 15 | 10 | 218 | 227 | 40 | 35 | 226 |
| H | 222 | 218 | 217 | 221 | 230 | 226 | 225 | 229 |
| H | 218 | 10 | 5 | 217 | 226 | 35 | 30 | 225 |
| H | 221 | 217 | 128 | 132 | 229 | 225 | 136 | 140 |
| H | 217 | 5 | 0 | 128 | 225 | 30 | 25 | 136 |
| H | 232 | 228 | 227 | 231 | 240 | 236 | 235 | 239 |
| H | 228 | 45 | 40 | 227 | 236 | 70 | 65 | 235 |
| H | 231 | 227 | 226 | 230 | 239 | 235 | 234 | 238 |
| H | 227 | 40 | 35 | 226 | 235 | 65 | 60 | 234 |
| H | 230 | 226 | 225 | 229 | 238 | 234 | 233 | 237 |
| H | 226 | 35 | 30 | 225 | 234 | 60 | 55 | 233 |
| H | 229 | 225 | 136 | 140 | 237 | 233 | 144 | 148 |
| H | 225 | 30 | 25 | 136 | 233 | 55 | 50 | 144 |
| H | 240 | 236 | 235 | 239 | 248 | 244 | 243 | 247 |
| H | 236 | 70 | 65 | 235 | 244 | 95 | 90 | 243 |
| H | 239 | 235 | 234 | 238 | 247 | 243 | 242 | 246 |
| H | 235 | 65 | 60 | 234 | 243 | 90 | 85 | 242 |
| H | 238 | 234 | 233 | 237 | 246 | 242 | 241 | 245 |
| H | 234 | 60 | 55 | 233 | 242 | 85 | 80 | 241 |
| H | 237 | 233 | 144 | 148 | 245 | 241 | 152 | 156 |
| H | 233 | 55 | 50 | 144 | 241 | 80 | 75 | 152 |
| H | 248 | 244 | 243 | 247 | 224 | 252 | 251 | 223 |
| H | 244 | 95 | 90 | 243 | 252 | 120 | 115 | 251 |
| H | 247 | 243 | 242 | 246 | 223 | 251 | 250 | 222 |
| H | 243 | 90 | 85 | 242 | 251 | 115 | 110 | 250 |
| H | 246 | 242 | 241 | 245 | 222 | 250 | 249 | 221 |
| H | 242 | 85 | 80 | 241 | 250 | 110 | 105 | 249 |
| H | 245 | 241 | 152 | 156 | 221 | 249 | 160 | 132 |
| H | 241 | 80 | 75 | 152 | 249 | 105 | 100 | 160 |
| H | 132 | 140 | 148 | 156 | 221 | 229 | 237 | 245 |
| H | 221 | 229 | 237 | 245 | 222 | 230 | 238 | 246 |
| H | 222 | 230 | 238 | 246 | 223 | 231 | 239 | 247 |
| H | 223 | 231 | 239 | 247 | 224 | 232 | 240 | 248 |
| H | 260 | 256 | 255 | 259 | 268 | 264 | 263 | 267 |
| H | 256 | 4 | 9 | 255 | 264 | 29 | 34 | 263 |
| H | 259 | 255 | 254 | 258 | 267 | 263 | 262 | 266 |
| H | 255 | 9 | 14 | 254 | 263 | 34 | 39 | 262 |
| H | 258 | 254 | 253 | 257 | 266 | 262 | 261 | 265 |
| H | 254 | 14 | 19 | 253 | 262 | 39 | 44 | 261 |
| H | 257 | 253 | 168 | 172 | 265 | 261 | 180 | 184 |
| H | 253 | 19 | 24 | 168 | 261 | 44 | 49 | 180 |
| H | 268 | 264 | 263 | 267 | 276 | 272 | 271 | 275 |
| H | 264 | 29 | 34 | 263 | 272 | 54 | 59 | 271 |
| H | 267 | 263 | 262 | 266 | 275 | 271 | 270 | 274 |
| H | 263 | 34 | 39 | 262 | 271 | 59 | 64 | 270 |
| H | 266 | 262 | 261 | 265 | 274 | 270 | 269 | 273 |
| H | 262 | 39 | 44 | 261 | 270 | 64 | 69 | 269 |
| H | 265 | 261 | 180 | 184 | 273 | 269 | 192 | 196 |
| H | 261 | 44 | 49 | 180 | 269 | 69 | 74 | 192 |
| H | 276 | 272 | 271 | 275 | 284 | 280 | 279 | 283 |
| H | 272 | 54 | 59 | 271 | 280 | 79 | 84 | 279 |
| H | 275 | 271 | 270 | 274 | 283 | 279 | 278 | 282 |
| H | 271 | 59 | 64 | 270 | 279 | 84 | 89 | 278 |
| H | 274 | 270 | 269 | 273 | 282 | 278 | 277 | 281 |
| H | 270 | 64 | 69 | 269 | 278 | 89 | 94 | 277 |
| H | 273 | 269 | 192 | 196 | 281 | 277 | 204 | 208 |
| H | 269 | 69 | 74 | 192 | 277 | 94 | 99 | 204 |
| H | 284 | 280 | 279 | 283 | 260 | 288 | 287 | 259 |
| H | 280 | 79 | 84 | 279 | 288 | 104 | 109 | 287 |
| H | 283 | 279 | 278 | 282 | 259 | 287 | 286 | 258 |
| H | 279 | 84 | 89 | 278 | 287 | 109 | 114 | 286 |
| H | 282 | 278 | 277 | 281 | 258 | 286 | 285 | 257 |
| H | 278 | 89 | 94 | 277 | 286 | 114 | 119 | 285 |
| H | 281 | 277 | 204 | 208 | 257 | 285 | 216 | 172 |
| H | 277 | 94 | 99 | 204 | 285 | 119 | 124 | 216 |
| H | 172 | 184 | 196 | 208 | 257 | 265 | 273 | 281 |
| H | 257 | 265 | 273 | 281 | 258 | 266 | 274 | 282 |
| H | 258 | 266 | 274 | 282 | 259 | 267 | 275 | 283 |
| H | 259 | 267 | 275 | 283 | 260 | 268 | 276 | 284 |

CN1 4
CN2 4
SLOT 0

| 20 | 21 | 22 | 23 | 24 |
|---|---|---|---|---|
| 15 | 16 | 17 | 18 | 19 |
| 10 | 11 | 12 | 13 | 14 |
| 5 | 6 | 7 | 8 | 9 |
| 0 | 1 | 2 | 3 | 4 |

SLOT 1

| 124 | 123 | 122 | 121 | 120 |
|---|---|---|---|---|
| 119 | 118 | 117 | 116 | 115 |
| 114 | 113 | 112 | 111 | 110 |

-continued

Sub-template Table-10 (4 × 4 Double Hoop
Single Triangular Core: Right Wingface 15
a triangular pattern)

| | | | | |
|---|---|---|---|---|
| 109 | 108 | 107 | 106 | 105 |
| 104 | 103 | 102 | 101 | 100 |
| SLOT 2 | | | | |
| 120 | 252 | 224 | 220 | 20 |
| 115 | 251 | 223 | 219 | 15 |
| 120 | 250 | 222 | 218 | 10 |
| 105 | 249 | 221 | 217 | 5 |
| 100 | 180 | 136 | 132 | 0 |
| SLOT 3 | | | | |
| 24 | 184 | 188 | 216 | 124 |
| 19 | 253 | 257 | 285 | 119 |
| 14 | 254 | 258 | 286 | 114 |
| 9 | 255 | 259 | 287 | 109 |
| 4 | 256 | 260 | 288 | 104 |

Sub-template Table-11 (1 × 4 Rectangular Cap)

```
V 0.500000 1.000000 1.000000
V 1.000000 1.000000 1.000000
V 1.000000 1.000000 -1.000000
V 0.500000 1.000000 -1.000000
V 0.000000 1.000000 -1.000000
V 0.000000 1.000000 1.000000
V 0.325000 0.575000 0.575000
V 0.500000 0.500000 0.500000
V 0.500000 0.500000 -0.500000
V 0.325000 0.575000 -0.575000
V 0.150000 0.650000 -0.650000
V 0.150000 0.650000 0.650000
V 0.000000 0.500000 0.500000
V 0.000000 0.400000 0.400000
V 0.000000 0.400000 -0.400000
V 0.000000 0.500000 -0.500000
V 0.000000 0.600000 -0.600000
V 0.000000 0.600000 0.600000
V -0.325000 0.575000 0.575000
V -0.500000 0.500000 0.500000
V -0.500000 0.500000 -0.500000
V -0.325000 0.575000 -0.575000
V -0.150000 0.650000 -0.650000
V -0.150000 0.650000 0.650000
V -0.500000 1.000000 1.000000
V -1.000000 1.000000 1.000000
V -1.000000 1.000000 -1.000000
V -0.500000 1.000000 -1.000000
H 5 0 3 4 11 6 9 10
H 0 1 2 3 6 7 8 9
H 11 6 9 10 17 12 15 16
H 6 7 8 9 12 13 14 15
H 17 12 15 16 23 18 21 22
H 12 13 14 15 18 19 20 21
H 23 18 21 22 5 24 27 4
H 18 19 20 21 24 25 26 27
H 4 10 16 22 5 11 17 23
CNF 4
CNS 1
BFACE
1 2
7 8
13 14
19 20
25 26
FFACE 0
0
6
12
18
24
5 11 17 23
FFACE 1
```

-continued

Sub-template Table-11 (1 × 4 Rectangular Cap)

```
3
9
15
21
27
4 10 16 22
```

Sub-template Table-12 (4 × 4 Rectangular Cap)

| | | | |
|---|---|---|---|
| V | 0.500000 | 1.000000 | -0.500000 |
| V | 0.500000 | 1.000000 | 0.000000 |
| V | 0.500000 | 1.000000 | 0.500000 |
| V | 0.500000 | 1.000000 | 1.000000 |
| V | 1.000000 | 1.000000 | 1.000000 |
| V | 1.000000 | 1.000000 | 0.500000 |
| V | 1.000000 | 1.000000 | 0.000000 |
| V | 1.000000 | 1.000000 | -0.500000 |
| V | 1.000000 | 1.000000 | -1.000000 |
| V | 0.500000 | 1.000000 | -1.000000 |
| V | 0.000000 | 1.000000 | -0.000000 |
| V | 0.000000 | 1.000000 | -0.500000 |
| V | 0.000000 | 1.000000 | 1.000000 |
| V | 0.000000 | 1.000000 | 0.500000 |
| V | 0.000000 | 1.000000 | 1.000000 |
| V | 0.325000 | 0.575000 | -0.287500 |
| V | 0.325000 | 0.575000 | 0.000000 |
| V | 0.325000 | 0.575000 | 0.287500 |
| V | 0.325000 | 0.575000 | 0.575000 |
| V | 0.500000 | 0.500000 | 0.500000 |
| V | 0.500000 | 0.500000 | 0.250000 |
| V | 0.500000 | 0.500000 | 0.000000 |
| V | 0.500000 | 0.500000 | -0.250000 |
| V | 0.500000 | 0.500000 | -0.500000 |
| V | 0.325000 | 0.575000 | -0.575000 |
| V | 0.150000 | 0.650000 | -0.650000 |
| V | 0.150000 | 0.650000 | -0.325000 |
| V | 0.150000 | 0.650000 | 0.000000 |
| V | 0.150000 | 0.650000 | 0.325000 |
| V | 0.150000 | 0.650000 | 0.650000 |
| V | 0.000000 | 0.500000 | -0.250000 |
| V | 0.000000 | 0.500000 | 0.000000 |
| V | 0.000000 | 0.500000 | 0.250000 |
| V | 0.000000 | 0.500000 | 0.500000 |
| V | 0.000000 | 0.400000 | 0.400000 |
| V | 0.000000 | 0.400000 | 0.200000 |
| V | 0.000000 | 0.400000 | 0.000000 |
| V | 0.000000 | 0.400000 | -0.200000 |
| V | 0.000000 | 0.400000 | -0.400000 |
| V | 0.000000 | 0.500000 | -0.500000 |
| V | 0.000000 | 0.600000 | -0.600000 |
| V | 0.000000 | 0.600000 | -0.300000 |
| V | 0.000000 | 0.600000 | 0.000000 |
| V | 0.000000 | 0.600000 | 0.300000 |
| V | 0.000000 | 0.600000 | 0.600000 |
| V | -0.325000 | 0.575000 | -0.287500 |
| V | -0.325000 | 0.575000 | 0.000000 |
| V | -0.325000 | 0.575000 | 0.287500 |
| V | -0.325000 | 0.575000 | 0.575000 |
| V | -0.500000 | 0.500000 | 0.500000 |
| V | -0.500000 | 0.500000 | 0.250000 |
| V | -0.500000 | 0.500000 | 0.000000 |
| V | -0.500000 | 0.500000 | -0.250000 |
| V | -0.500000 | 0.500000 | -0.500000 |
| V | -0.325000 | 0.575000 | -0.575000 |
| V | -0.150000 | 0.650000 | -0.650000 |
| V | -0.150000 | 0.650000 | -0.325000 |
| V | -0.150000 | 0.650000 | 0.000000 |
| V | -0.150000 | 0.650000 | 0.325000 |
| V | -0.150000 | 0.650000 | 0.650000 |
| V | -0.500000 | 1.000000 | -0.500000 |
| V | -0.500000 | 1.000000 | 0.000000 |
| V | -0.500000 | 1.000000 | 0.500000 |

-continued

| Sub-template Table-12 (4 × 4 Rectangular Cap) | | | |
|---|---|---|---|
| V | −0.500000 | 1.000000 | 1.000000 |
| V | −1.000000 | 1.000000 | 1.000000 |
| V | −1.000000 | 1.000000 | 0.500000 |
| V | −1.000000 | 1.000000 | 0.000000 |
| V | −1.000000 | 1.000000 | −0.500000 |
| V | −1.000000 | 1.000000 | −1.000000 |
| V | −0.500000 | 1.000000 | −1.000000 |
| H 14 3 2 13 29 18 17 28 | | | |
| H 3 4 5 2 18 19 20 17 | | | |
| H 13 2 1 12 28 17 16 27 | | | |
| H 2 5 6 1 17 20 21 16 | | | |
| H 12 1 0 11 27 16 15 26 | | | |
| H 1 6 7 0 16 21 22 15 | | | |
| H 11 0 9 10 26 15 24 25 | | | |
| H 0 7 8 9 15 22 23 24 | | | |
| H 29 18 17 28 44 33 32 43 | | | |
| H 18 19 20 17 33 34 35 32 | | | |
| H 28 17 16 27 43 32 31 42 | | | |
| H 17 20 21 16 32 35 36 31 | | | |
| H 27 16 15 26 42 31 30 41 | | | |
| H 16 21 22 15 31 36 37 30 | | | |
| H 26 15 24 25 41 30 39 40 | | | |
| H 15 22 23 24 30 37 38 39 | | | |
| H 44 33 32 43 59 48 47 58 | | | |
| H 33 34 35 32 48 49 50 47 | | | |
| H 43 32 31 42 58 47 46 57 | | | |
| H 32 35 36 31 47 50 51 46 | | | |
| H 42 31 30 41 57 46 45 56 | | | |
| H 31 36 37 30 46 51 52 45 | | | |
| H 41 30 39 40 56 45 54 55 | | | |
| H 30 37 38 39 45 52 53 54 | | | |
| H 59 48 47 58 14 63 62 13 | | | |
| H 48 49 50 47 63 64 65 62 | | | |
| H 58 47 46 57 13 62 61 12 | | | |
| H 47 50 51 46 62 65 66 61 | | | |
| H 57 46 45 56 12 61 60 11 | | | |
| H 46 51 52 45 61 66 67 60 | | | |
| H 56 45 54 55 11 60 69 10 | | | |
| H 45 52 53 54 60 67 68 69 | | | |
| H 10 25 40 55 11 26 41 56 | | | |
| H 11 26 41 56 12 27 42 57 | | | |
| H 12 27 42 57 13 28 43 58 | | | |
| H 13 28 43 58 14 29 44 59 | | | |
| CNF 4 | | | |
| CNS 4 | | | |
| BFACE | | | |
| 4 5 6 7 8 | | | |
| 19 20 21 22 23 | | | |
| 34 35 36 37 38 | | | |
| 49 50 51 52 53 | | | |
| 64 65 66 67 68 | | | |
| FFACE0 | | | |
| 3 | | | |
| 18 | | | |
| 33 | | | |
| 48 | | | |
| 63 | | | |
| 14 29 44 59 | | | |
| FFACE 1 | | | |
| 9 | | | |
| 24 | | | |
| 39 | | | |
| 54 | | | |
| 69 | | | |
| 10 25 40 55 | | | |

| Sub-template Table-13 (4 × 4 Triangular Cap) | | | |
|---|---|---|---|
| V | 0.400000 | 1.000000 | −0.600000 |
| V | 0.500000 | 1.000000 | −0.500000 |
| V | 0.600000 | 1.000000 | −0.400000 |
| V | 0.500000 | 1.000000 | 0.000000 |
| V | 0.600000 | 1.000000 | 0.400000 |
| V | 0.500000 | 1.000000 | 0.500000 |
| V | 0.400000 | 1.000000 | 0.600000 |
| V | 0.500000 | 1.000000 | 1.000000 |
| V | 1.000000 | 1.000000 | 1.000000 |
| V | 1.000000 | 1.000000 | 0.500000 |
| V | 1.000000 | 1.000000 | 0.000000 |
| V | 1.000000 | 1.000000 | −0.500000 |
| V | 1.000000 | 1.000000 | −1.000000 |
| V | 0.500000 | 1.000000 | −1.000000 |
| V | 0.000000 | 1.000000 | −1.000000 |
| V | 0.000000 | 1.000000 | −0.500000 |
| V | 0.000000 | 1.000000 | 0.000000 |
| V | 0.000000 | 1.000000 | 0.500000 |
| V | 0.000000 | 1.000000 | 1.000000 |
| V | 0.290000 | 0.590000 | −0.354000 |
| V | 0.325000 | 0.575000 | −0.287500 |
| V | 0.360000 | 0.560000 | −0.224000 |
| V | 0.325000 | 0.575000 | 0.000000 |
| V | 0.360000 | 0.560000 | 0.224000 |
| V | 0.325000 | 0.575000 | 0.287500 |
| V | 0.290000 | 0.590000 | 0.354000 |
| V | 0.325000 | 0.575000 | 0.575000 |
| V | 0.500000 | 0.500000 | 0.500000 |
| V | 0.500000 | 0.500000 | 0.250000 |
| V | 0.500000 | 0.500000 | 0.000000 |
| V | 0.500000 | 0.500000 | −0.250000 |
| V | 0.500000 | 0.500000 | −0.500000 |
| V | 0.325000 | 0.575000 | −0.575000 |
| V | 0.150000 | 0.650000 | −0.650000 |
| V | 0.150000 | 0.650000 | −0.325000 |
| V | 0.150000 | 0.650000 | 0.000000 |
| V | 0.150000 | 0.650000 | 0.325000 |
| V | 0.150000 | 0.650000 | 0.650000 |
| V | 0.000000 | 0.520000 | −0.312000 |
| V | 0.000000 | 0.500000 | −0.250000 |
| V | 0.000000 | 0.480000 | −0.192000 |
| V | 0.000000 | 0.500000 | 0.000000 |
| V | 0.000000 | 0.480000 | 0.192000 |
| V | 0.000000 | 0.500000 | 0.250000 |
| V | 0.000000 | 0.520000 | 0.312000 |
| V | 0.000000 | 0.500000 | 0.500000 |
| V | 0.000000 | 0.400000 | 0.400000 |
| V | 0.000000 | 0.400000 | 0.200000 |
| V | 0.000000 | 0.400000 | 0.000000 |
| V | 0.000000 | 0.400000 | −0.200000 |
| V | 0.000000 | 0.400000 | −0.400000 |
| V | 0.000000 | 0.500000 | −0.500000 |
| V | 0.000000 | 0.600000 | −0.600000 |
| V | 0.000000 | 0.600000 | −0.300000 |
| V | 0.000000 | 0.600000 | 0.000000 |
| V | 0.000000 | 0.600000 | 0.300000 |
| V | 0.000000 | 0.600000 | 0.600000 |
| V | −0.290000 | 0.590000 | −0.354000 |
| V | −0.325000 | 0.575000 | −0.287500 |
| V | −0.360000 | 0.560000 | −0.224000 |
| V | −0.325000 | 0.575000 | 0.000000 |
| V | −0.360000 | 0.560000 | 0.224000 |
| V | −0.325000 | 0.575000 | 0.287500 |
| V | −0.290000 | 0.590000 | 0.354000 |
| V | −0.325000 | 0.575000 | 0.575000 |
| V | −0.500000 | 0.500000 | 0.500000 |
| V | −0.500000 | 0.500000 | 0.250000 |
| V | −0.500000 | 0.500000 | 0.000000 |
| V | −0.500000 | 0.500000 | −0.250000 |
| V | −0.500000 | 0.500000 | −0.500000 |
| V | −0.325000 | 0.575000 | −0.575000 |
| V | −0.150000 | 0.650000 | −0.650000 |
| V | −0.150000 | 0.650000 | −0.325000 |
| V | −0.150000 | 0.650000 | 0.000000 |
| V | −0.150000 | 0.650000 | 0.325000 |
| V | −0.150000 | 0.650000 | 0.650000 |
| V | −0.400000 | 1.000000 | −0.600000 |
| V | −0.500000 | 1.000000 | −0.500000 |
| V | −0.600000 | 1.000000 | −0.400000 |
| V | −0.500000 | 1.000000 | 0.000000 |
| V | −0.600000 | 1.000000 | 0.400000 |

-continued

| Sub-template Table-13 (4 × 4 Triangular Cap) | | | |
|---|---|---|---|
| V | −0.500000 | 1.000000 | 0.500000 |
| V | −0.400000 | 1.000000 | 0.600000 |
| V | −0.500000 | 1.000000 | 1.000000 |
| V | −1.000000 | 1.000000 | 1.000000 |
| V | −1.000000 | 1.000000 | 0.500000 |
| V | −1.000000 | 1.000000 | 0.000000 |
| V | −1.000000 | 1.000000 | −0.500000 |

H 16 5 4 3 35 24 23 22
H 4 9 10 3 23 28 29 22
H 16 3 2 1 35 22 21 20
H 3 10 11 2 22 29 30 21
H 1 2 11 12 20 21 30 31
H 16 1 0 15 35 20 19 34
H 0 1 12 13 19 20 31 32
H 15 0 13 14 34 19 32 33
H 37 26 25 36 56 45 44 55
H 26 27 24 25 45 46 43 44
H 36 25 24 35 55 44 43 54
H 24 27 28 23 43 46 47 42
H 35 24 23 22 54 43 42 41
H 23 28 29 22 42 47 48 41
H 35 22 21 20 54 41 40 39
H 22 29 30 21 41 48 49 40
H 20 21 30 31 39 40 49 50
H 35 20 19 34 54 39 38 53
H 19 20 31 32 38 39 50 51
H 34 19 32 33 53 38 51 52
H 56 45 44 55 75 64 63 74
H 45 46 43 44 64 65 62 63
H 55 44 43 54 74 63 62 73
H 43 46 47 42 62 65 66 61
H 54 43 42 41 73 62 61 60
H 42 47 48 41 61 66 67 60
H 54 41 40 39 73 60 59 58
H 41 48 49 40 60 67 68 59
H 39 40 49 50 58 59 68 69
H 54 39 38 53 73 58 57 72
H 38 39 50 51 57 58 69 70
H 53 38 51 52 72 57 70 71
H 75 64 63 74 18 83 82 17
H 64 65 62 63 83 84 81 82
H 74 63 62 73 17 82 81 16
H 62 65 66 61 81 84 85 80
H 73 62 61 60 16 81 80 79
H 61 66 67 60 80 85 86 79
H 73 60 59 58 16 79 78 77
H 60 67 68 59 79 86 87 78
H 58 59 68 69 77 78 87 88
H 73 58 57 72 16 77 76 15
H 57 58 69 70 76 77 88 89
H 72 57 70 71 15 76 89 14
H 14 33 52 71 15 34 53 72
H 15 34 53 72 16 35 54 73
H 16 35 54 73 17 36 55 74
H 17 36 55 74 18 37 56 75
CNF 4
CNS 4
BFACE
8 9 10 11 12
27 28 29 30 31
46 47 48 49 50
65 66 67 68 69
84 85 86 87 88
FFACE 0
7
26
45
64
83
18 37 56 75
FFACE 1
13
32
70
89
14 33 52 71

| Sub-template Table-14 (2 × 4 Rectangular Cap) | | | |
|---|---|---|---|
| V | 0.500000 | 1.000000 | 0.000000 |
| V | 0.500000 | 1.000000 | 1.000000 |
| V | 1.000000 | 1.000000 | 1.000000 |
| V | 1.000000 | 1.000000 | 0.000000 |
| V | 1.000000 | 1.000000 | −1.000000 |
| V | 0.500000 | 1.000000 | −1.000000 |
| V | 0.000000 | 1.000000 | −1.000000 |
| V | 0.000000 | 1.000000 | 0.000000 |
| V | 0.000000 | 1.000000 | 1.000000 |
| V | 0.325000 | 0.575000 | 0.000000 |
| V | 0.325000 | 0.575000 | 0.575000 |
| V | 0.500000 | 0.500000 | 0.500000 |
| V | 0.500000 | 0.500000 | 0.000000 |
| V | 0.500000 | 0.500000 | −0.500000 |
| V | 0.325000 | 0.575000 | −0.575000 |
| V | 0.150000 | 0.650000 | −0.650000 |
| V | 0.150000 | 0.650000 | 0.000000 |
| V | 0.150000 | 0.650000 | 0.650000 |
| V | 0.000000 | 0.500000 | 0.000000 |
| V | 0.000000 | 0.500000 | 0.500000 |
| V | 0.000000 | 0.400000 | 0.400000 |
| V | 0.000000 | 0.400000 | 0.000000 |
| V | 0.000000 | 0.400000 | −0.400000 |
| V | 0.000000 | 0.500000 | −0.500000 |
| V | 0.000000 | 0.600000 | −0.600000 |
| V | 0.000000 | 0.600000 | 0.000000 |
| V | 0.000000 | 0.600000 | 0.600000 |
| V | −0.325000 | 0.575000 | 0.000000 |
| V | −0.325000 | 0.575000 | 0.575000 |
| V | −0.500000 | 0.500000 | 0.500000 |
| V | −0.500000 | 0.500000 | 0.000000 |
| V | −0.500000 | 0.500000 | −0.500000 |
| V | −0.325000 | 0.575000 | −0.575000 |
| V | −0.150000 | 0.650000 | −0.650000 |
| V | −0.150000 | 0.650000 | 0.000000 |
| V | −0.150000 | 0.650000 | 0.650000 |
| V | −0.500000 | 1.000000 | 0.000000 |
| V | −0.500000 | 1.000000 | 1.000000 |
| V | −1.000000 | 1.000000 | 1.000000 |
| V | −1.000000 | 1.000000 | 0.000000 |
| V | −1.000000 | 1.000000 | −1.000000 |
| V | −0.500000 | 1.000000 | −1.000000 |

H 8 1 0 7 17 10 9 16
H 1 2 3 0 10 11 12 9
H 7 0 5 6 16 9 14 15
H 0 3 4 5 9 12 13 14
H 17 10 9 16 26 19 18 25
H 10 11 12 9 19 20 21 18
H 16 9 14 15 25 18 23 24
H 9 12 13 14 18 21 22 23
H 26 19 18 25 35 28 27 34
H 19 20 21 18 28 29 30 27
H 25 18 23 24 34 27 32 33
H 18 21 22 23 27 30 31 32
H 35 28 27 34 8 37 36 7
H 28 29 30 27 37 38 39 36
H 34 27 32 33 7 36 41 6
H 27 30 31 32 36 39 40 41
H 6 15 24 33 7 16 25 34
H 7 16 25 34 8 17 26 35
CNF 4
CNS 2
BFACE
2 3 4
11 12 13
20 21 22
29 30 31
38 39 40
FFACE 0
1
10
19
28
37
8 17 26 35
FFACE 1
5

Sub-template Table-14 (2 × 4 Rectangular Cap)

14
23
32
41
6 15 24 33

Sub-template Table-15 (2 × 4 Triangular Cap)

| | | | |
|---|---:|---:|---:|
| V | 0.300000 | 1.000000 | −0.200000 |
| V | 0.500000 | 1.000000 | 0.000000 |
| V | 0.700000 | 1.000000 | 0.200000 |
| V | 0.500000 | 1.000000 | 1.000000 |
| V | 1.000000 | 1.000000 | 1.000000 |
| V | 1.000000 | 1.000000 | 0.000000 |
| V | 1.000000 | 1.000000 | −1.000000 |
| V | 0.500000 | 1.000000 | −1.000000 |
| V | 0.000000 | 1.000000 | −1.000000 |
| V | 0.000000 | 1.000000 | 0.000000 |
| V | 0.000000 | 1.000000 | 1.000000 |
| V | 0.255000 | 0.605000 | −0.121000 |
| V | 0.325000 | 0.575000 | 0.000000 |
| V | 0.395000 | 0.545000 | 0.109000 |
| V | 0.325000 | 0.575000 | 0.575000 |
| V | 0.500000 | 0.500000 | 0.500000 |
| V | 0.500000 | 0.500000 | 0.000000 |
| V | 0.500000 | 0.500000 | −0.500000 |
| V | 0.325000 | 0.575000 | −0.575000 |
| V | 0.150000 | 0.650000 | −0.650000 |
| V | 0.150000 | 0.650000 | 0.000000 |
| V | 0.150000 | 0.650000 | 0.650000 |
| V | 0.000000 | 0.540000 | −0.108000 |
| V | 0.000000 | 0.500000 | 0.000000 |
| V | 0.000000 | 0.460000 | 0.092000 |
| V | 0.000000 | 0.500000 | 0.500000 |
| V | 0.000000 | 0.400000 | 0.400000 |
| V | 0.000000 | 0.400000 | 0.000000 |
| V | 0.000000 | 0.400000 | −0.400000 |
| V | 0.000000 | 0.500000 | −0.500000 |
| V | 0.000000 | 0.600000 | −0.600000 |
| V | 0.000000 | 0.600000 | 0.000000 |
| V | 0.000000 | 0.600000 | 0.600000 |
| V | −0.255000 | 0.605000 | −0.121000 |
| V | −0.325000 | 0.575000 | 0.000000 |
| V | −0.395000 | 0.545000 | 0.109000 |
| V | −0.325000 | 0.575000 | 0.575000 |
| V | −0.500000 | 0.500000 | 0.500000 |
| V | −0.500000 | 0.500000 | 0.000000 |
| V | −0.500000 | 0.500000 | −0.500000 |
| V | −0.325000 | 0.575000 | −0.575000 |
| V | −0.150000 | 0.650000 | −0.650000 |
| V | −0.150000 | 0.650000 | 0.000000 |
| V | −0.150000 | 0.650000 | 0.650000 |
| V | −0.300000 | 1.000000 | −0.200000 |
| V | −0.500000 | 1.000000 | 0.000000 |
| V | −0.700000 | 1.000000 | 0.200000 |
| V | −0.500000 | 1.000000 | 1.000000 |
| V | −1.000000 | 1.000000 | 1.000000 |
| V | −1.000000 | 1.000000 | 0.000000 |
| V | −1.000000 | 1.000000 | −1.000000 |
| V | −0.500000 | 1.000000 | −1.000000 |

H 10 3 2 1 21 14 13 12
H 3 4 5 2 14 15 16 13
H 1 2 5 6 12 13 16 17
H 10 1 0 9 21 12 11 20
H 0 1 6 7 11 12 17 18
H 9 0 7 8 20 11 18 19
H 21 14 13 12 32 25 24 23
H 14 15 16 13 25 26 27 24
H 12 13 16 17 23 24 27 28
H 21 12 11 20 32 23 22 31
H 11 12 17 18 22 23 28 29
H 20 11 18 19 31 22 29 30
H 32 25 24 23 43 36 35 34
H 25 26 27 24 36 37 38 35
H 23 24 27 28 34 35 38 39
H 32 23 22 31 43 34 33 42
H 22 23 28 29 33 34 39 40
H 31 22 29 30 42 33 40 41
H 43 36 35 34 10 47 46 45
H 36 37 38 35 47 48 49 46
H 34 35 38 39 45 46 49 50
H 43 34 33 42 10 45 44 9
H 33 34 39 40 44 45 50 51
H 42 33 40 41 9 44 51 8
H 8 19 30 41 9 20 31 42
H 9 20 31 42 10 21 32 43
CNF 4
CNS 2
BFACE
4 5 6
15 16 17
26 27 28
37 38 39
48 49 50
FFACE 0
3
14
25
36
47
10 21 32 43
FFACE 1
7
18
29
40
51
8 19 30 41

Sub-template Table-16 (For a Solution to Schneiders' Open Problem Discussed with Reference to FIGS. 38–44)

| | | | |
|---|---:|---:|---:|
| V | 0.500000 | 0.600000 | 0.500000 |
| V | 0.500000 | 0.600000 | 0.000000 |
| V | 0.500000 | 0.600000 | −0.500000 |
| V | 1.500000 | −0.100000 | 1.500000 |
| V | 1.500000 | −0.100000 | 0.000000 |
| V | 1.500000 | −0.100000 | −1.500000 |
| V | 0.375000 | 0.500000 | 0.312500 |
| V | 0.375000 | 0.500000 | 0.000000 |
| V | 0.375000 | 0.500000 | −0.312500 |
| V | 0.625000 | 0.200000 | 0.520833 |
| V | 0.625000 | 0.200000 | 0.000000 |
| V | 0.625000 | 0.200000 | −0.520833 |
| V | 0.000000 | 0.550000 | 0.213333 |
| V | 0.000000 | 0.550000 | 0.000000 |
| V | 0.000000 | 0.550000 | −0.213333 |
| V | 0.000000 | 0.350000 | 0.320000 |
| V | 0.000000 | 0.350000 | 0.000000 |
| V | 0.000000 | 0.350000 | −0.320000 |
| V | −0.375000 | 0.500000 | 0.312500 |
| V | −0.375000 | 0.500000 | 0.000000 |
| V | −0.375000 | 0.500000 | −0.312500 |
| V | −0.625000 | 0.200000 | 0.520833 |
| V | −0.625000 | 0.200000 | 0.000000 |
| V | −0.625000 | 0.200000 | −0.520833 |
| V | −0.500000 | 0.600000 | 0.500000 |
| V | −0.500000 | 0.600000 | 0.000000 |
| V | −0.500000 | 0.600000 | −0.500000 |
| V | −1.500000 | −0.100000 | 1.500000 |
| V | −1.500000 | −0.100000 | 0.000000 |
| V | −1.500000 | −0.100000 | −1.500000 |
| V | 0.150000 | 0.670000 | −0.076667 |

Sub-template Table-16 (For a Solution to Schneiders' Open Problem Discussed with Reference to FIGS. 38–44)

| | | | |
|---|---|---|---|
| V | 0.250000 | 0.650000 | 0.000000 |
| V | 0.350000 | 0.630000 | 0.090000 |
| V | 0.250000 | 0.650000 | 0.416667 |
| V | 0.000000 | 0.700000 | 0.000000 |
| V | 0.000000 | 0.700000 | 0.333333 |
| V | 0.177863 | 0.565678 | −0.063439 |
| V | 0.231563 | 0.547438 | 0.000000 |
| V | 0.287363 | 0.528778 | 0.063306 |
| V | 0.231563 | 0.547438 | 0.317508 |
| V | −0.198750 | 0.247750 | 0.617229 |
| V | −0.750000 | 0.050000 | 1.250000 |
| V | 0.250000 | 0.650000 | −0.416667 |
| V | 0.000000 | 0.700000 | −0.333333 |
| V | 0.231563 | 0.547438 | −0.317508 |
| V | 0.101250 | 0.592250 | −0.314437 |
| V | 0.000000 | 0.575000 | −0.250000 |
| V | 0.000000 | 0.600000 | −0.280000 |
| V | −0.231563 | 0.547438 | −0.317508 |
| V | −0.101250 | 0.592250 | −0.314437 |
| V | −0.250000 | 0.650000 | −0.416667 |
| V | 0.000000 | 0.640000 | 0.433333 |
| V | 0.000000 | 0.600000 | 0.500000 |
| V | 0.000000 | 0.020000 | 1.300000 |
| V | 0.000000 | −0.100000 | 1.500000 |
| V | 0.000000 | 0.640000 | −0.433333 |
| V | 0.000000 | 0.600000 | −0.500000 |
| V | 0.000000 | 0.020000 | −1.300000 |
| V | 0.000000 | −0.100000 | −1.500000 |
| V | 0.000000 | 1.800000 | 0.000000 |
| V | −0.250000 | 1.300000 | −0.250000 |
| V | 0.000000 | 1.350000 | 0.166667 |
| V | 0.000000 | 1.350000 | −0.166667 |
| V | −0.125000 | 1.000000 | −0.125000 |
| V | −0.166667 | 1.100000 | −0.041667 |
| V | 0.000000 | 1.133333 | 0.000000 |
| V | −0.166667 | 1.100000 | −0.277778 |
| V | 0.250000 | 1.300000 | −0.250000 |
| V | 0.166667 | 1.100000 | −0.041667 |
| V | 0.166667 | 1.100000 | −0.277778 |
| V | 0.125000 | 1.000000 | −0.125000 |
| V | 0.000000 | 0.975000 | −0.333333 |
| V | 0.000000 | 1.066667 | −0.333333 |
| V | −0.250000 | 1.300000 | 0.250000 |
| V | −0.333333 | 1.066667 | 0.000000 |
| V | −0.166667 | 1.100000 | 0.277778 |
| V | −0.250000 | 0.975000 | 0.083333 |
| V | 0.250000 | 1.300000 | 0.250000 |
| V | 0.333333 | 1.066667 | 0.000000 |
| V | 0.166667 | 1.100000 | 0.277778 |
| V | 0.250000 | 0.975000 | 0.083333 |
| V | 0.000000 | 1.066667 | 0.333333 |
| V | 0.000000 | 0.975000 | 0.333333 |
| V | −0.750000 | 0.950000 | −0.750000 |
| V | −0.750000 | 0.950000 | 0.750000 |
| V | 0.750000 | 0.950000 | −0.750000 |
| V | 0.750000 | 0.950000 | 0.750000 |
| V | 0.000000 | 0.600000 | −1.000000 |
| V | −1.000000 | 0.600000 | 0.000000 |
| V | 0.000000 | 0.600000 | 1.000000 |
| V | 1.000000 | 0.600000 | 0.000000 |
| V | 0.000000 | 2.000000 | 0.000000 |
| V | 0.000000 | 0.020000 | 0.000000 |
| V | 0.000000 | −0.100000 | 0.000000 |

H 6 7 10 9 0 1 4 3
H 7 8 11 10 1 2 5 4
H 12 13 16 15 6 7 10 9
H 13 14 17 16 7 8 11 10
H 18 19 22 21 12 13 16 15
H 19 20 23 22 13 14 17 16
H 24 25 28 27 18 19 22 21
H 25 26 29 28 19 20 23 22
H 35 33 32 31 41 39 38 37
H 33 0 1 32 39 6 7 38
H 31 32 1 2 37 38 7 8
H 35 31 30 34 41 37 36 40
H 30 31 2 85 36 37 8 87
H 34 30 85 86 40 36 87 88
H 41 39 38 37 47 45 44 43
H 39 6 7 38 45 12 13 44
H 37 38 7 8 43 44 13 14
H 41 37 36 40 47 43 42 46
H 36 37 8 87 42 43 14 89
H 40 36 87 88 46 42 89 90
H 47 45 44 43 53 51 50 49
H 45 12 13 44 51 18 19 50
H 43 44 13 14 49 50 19 20
H 47 43 42 46 53 49 48 52
H 42 43 14 89 48 49 20 91
H 46 42 89 90 52 48 91 92
H 53 51 50 49 33 57 56 55
H 51 18 19 50 57 24 25 56
H 49 50 19 20 55 56 25 26
H 53 49 48 52 35 55 54 34
H 48 49 20 91 54 55 26 93
H 52 48 91 92 34 54 93 86
H 86 88 90 92 34 40 46 52
H 34 40 46 52 35 41 47 53
H 61 59 58 60 65 63 62 64
H 59 5 4 58 63 11 10 62
H 60 58 76 77 64 62 78 79
H 58 4 3 76 62 10 9 78
H 65 63 62 64 69 67 66 68
H 63 11 10 62 67 17 16 66
H 64 62 78 79 68 66 80 81
H 62 10 9 78 66 16 15 80
H 69 67 66 68 73 71 70 72
H 67 17 16 66 71 23 22 70
H 68 66 80 81 72 70 82 83
H 66 16 15 80 70 22 21 82
H 73 71 70 72 61 75 74 60
H 71 23 22 70 75 29 28 74
H 72 70 82 83 60 74 84 77
H 70 22 21 82 74 28 27 84
H 77 79 81 83 60 64 68 72
H 60 64 68 72 61 65 69 73
H 77 76 33 35 79 78 39 41
H 76 3 0 33 78 9 6 39
H 79 78 39 41 81 80 45 47
H 78 9 6 39 80 15 12 45
H 81 80 45 47 83 82 51 53
H 80 15 12 45 82 21 18 51
H 83 82 51 53 77 84 57 35
H 82 21 18 51 84 27 24 57
H 35 41 47 53 77 79 81 83
H 86 85 59 61 88 87 63 65
H 85 2 5 59 87 8 11 63
H 88 87 63 65 90 89 67 69
H 87 8 11 63 89 14 17 67
H 90 89 67 69 92 91 71 73
H 89 14 17 67 91 20 23 71
H 92 91 71 73 86 93 75 61
H 91 20 23 71 93 26 29 75
H 61 65 69 73 86 88 90 92
H 84 77 76 96 57 35 33 94
H 27 84 96 97 24 57 94 95
H 97 96 76 3 95 94 33 0
H 59 61 75 100 85 86 93 98
H 5 59 100 101 2 85 98 99
H 101 100 75 29 99 98 93 26
H 55 26 93 54 107 103 109 106
H 54 93 86 34 106 109 105 108
H 35 55 54 34 104 107 106 108
H 106 109 105 108 107 103 102 104
H 34 86 85 30 108 105 112 113
H 30 85 2 31 113 112 110 111
H 35 34 30 31 104 108 113 111
H 108 105 112 113 104 102 110 111
H 86 93 98 85 105 109 114 112
H 93 26 99 98 109 103 115 114
H 98 99 2 85 114 115 110 112

-continued

Sub-template Table-16 (For a Solution to Schneiders' Open Problem Discussed with Reference to FIGS. 38–44)

H 105 109 114 112 102 103 115 110
H 57 56 55 35 118 119 107 104
H 56 25 26 55 119 117 103 107
H 24 25 56 57 116 117 119 118
H 118 119 107 104 116 117 103 102
H 32 31 2 1 123 111 110 121
H 35 31 32 33 104 111 123 122
H 33 32 1 0 122 123 121 120
H 111 110 121 123 104 102 120 122
H 57 35 33 94 118 104 122 125
H 24 57 94 95 116 118 125 124
H 95 94 33 0 124 125 122 120
H 118 104 122 125 116 102 120 124
H 28 29 26 25 131 126 103 117
H 27 28 25 24 127 131 117 116
H 27 24 95 97 127 116 124 132
H 131 126 103 117 127 134 102 116
H 74 60 58 135 84 77 76 96
H 75 61 59 100 74 60 58 135
H 97 95 0 3 132 124 120 129
H 127 116 124 132 134 102 120 129
H 3 0 1 4 129 120 121 133
H 4 1 2 5 133 121 110 128
H 129 120 121 133 134 102 110 128
H 5 2 99 101 128 110 115 130
H 101 99 26 29 130 115 103 126
H 128 110 115 130 134 102 103 126
H 136 135 58 4 97 96 76 3
H 101 100 59 5 136 135 58 4
H 101 29 75 100 136 28 74 135
H 136 28 74 135 97 27 84 96

Sub-template Table-17 (For a Solution to Schneiders' Open Problem Discussed with Reference to FIGS. 45A–49)

| | | | |
|---|---|---|---|
| V | 0.133975 | 0.606218 | 0.000000 |
| V | 1.000000 | 0.000000 | 1.000000 |
| V | 1.000000 | 0.000000 | −1.000000 |
| V | 0.566987 | 0.303109 | 0.445873 |
| V | 1.000000 | 0.000000 | 0.000000 |
| V | 0.566987 | 0.303109 | −0.445873 |
| V | 0.711325 | 0.202073 | 0.000000 |
| V | 0.211325 | 0.446410 | 0.000000 |
| V | 0.427831 | 0.186603 | 0.428479 |
| V | 0.427831 | 0.186603 | −0.428479 |
| V | 0.319578 | 0.316506 | 0.207474 |
| V | 0.427831 | 0.186603 | 0.000000 |
| V | 0.319578 | 0.316506 | −0.207474 |
| V | 0.355662 | 0.273205 | 0.000000 |
| V | 0.000000 | 0.459808 | 0.000000 |
| V | 0.000000 | 0.286602 | 0.300000 |
| V | 0.000000 | 0.286602 | −0.300000 |
| V | 0.000000 | 0.373205 | 0.150000 |
| V | 0.000000 | 0.286602 | 0.000000 |
| V | 0.000000 | 0.373205 | −0.150000 |
| V | 0.000000 | 0.344338 | 0.000000 |
| V | −0.211325 | 0.446410 | 0.000000 |
| V | −0.427831 | 0.186603 | 0.428479 |
| V | −0.427831 | 0.186603 | −0.428479 |
| V | −0.319578 | 0.316506 | 0.207474 |
| V | −0.427831 | 0.186603 | 0.000000 |
| V | −0.319578 | 0.316506 | −0.207474 |
| V | −0.355662 | 0.273205 | 0.000000 |
| V | −0.133975 | 0.606218 | 0.000000 |
| V | −1.000000 | 0.000000 | 1.000000 |
| V | −1.000000 | 0.000000 | −1.000000 |
| V | −0.566987 | 0.303109 | 0.445873 |
| V | −1.000000 | 0.000000 | 0.000000 |
| V | −0.566987 | 0.303109 | −0.445873 |

-continued

Sub-template Table-17 (For a Solution to Schneiders' Open Problem Discussed with Reference to FIGS. 45A–49)

| | | | |
|---|---|---|---|
| V | −0.711325 | 0.202073 | 0.000000 |
| V | 0.500000 | 0.100000 | 0.000000 |
| V | 0.500000 | 0.100000 | −0.875000 |
| V | 0.000000 | 0.200000 | 0.000000 |
| V | 0.000000 | 0.200000 | −0.750000 |
| V | 0.285127 | 0.204318 | 0.000000 |
| V | 0.285127 | 0.204318 | −0.472237 |
| V | 0.134845 | 0.223549 | 0.000000 |
| V | 0.134845 | 0.223549 | −0.509412 |
| V | 0.000000 | 0.272169 | 0.000000 |
| V | 0.000000 | 0.272169 | −0.375000 |
| V | 0.000000 | 0.257735 | 0.000000 |
| V | 0.000000 | 0.257735 | −0.450000 |
| V | −0.285127 | 0.204318 | 0.000000 |
| V | −0.285127 | 0.204318 | −0.472237 |
| V | −0.134845 | 0.223549 | 0.000000 |
| V | −0.134845 | 0.223549 | −0.509412 |
| V | −0.500000 | 0.100000 | 0.000000 |
| V | −0.500000 | 0.100000 | −0.875000 |
| V | 0.144115 | 0.430984 | −0.314412 |
| V | 0.283494 | 0.359808 | −0.410437 |
| V | 0.457513 | 0.281702 | −0.518627 |
| V | 0.066987 | 0.619615 | 0.000000 |
| V | 0.000000 | 0.633012 | 0.000000 |
| V | 0.000000 | 0.416506 | −0.375000 |
| V | 0.145760 | 0.385045 | −0.190318 |
| V | 0.204208 | 0.344993 | −0.230302 |
| V | 0.268545 | 0.306361 | −0.267204 |
| V | 0.123288 | 0.485668 | 0.000000 |
| V | 0.050407 | 0.521895 | 0.000000 |
| V | 0.092626 | 0.372722 | −0.251276 |
| V | 0.000000 | 0.406691 | −0.162000 |
| V | 0.000000 | 0.380422 | −0.187500 |
| V | 0.000000 | 0.357617 | −0.207000 |
| V | 0.000000 | 0.488675 | 0.000000 |
| V | 0.000000 | 0.517543 | 0.000000 |
| V | 0.000000 | 0.387639 | −0.225000 |
| V | −0.145760 | 0.385045 | −0.190318 |
| V | −0.204208 | 0.344993 | −0.230302 |
| V | −0.268545 | 0.306361 | −0.267204 |
| V | −0.123288 | 0.485668 | 0.000000 |
| V | −0.050407 | 0.521895 | 0.000000 |
| V | −0.092626 | 0.372722 | −0.251276 |
| V | −0.144115 | 0.430984 | −0.314412 |
| V | −0.283494 | 0.359808 | −0.410437 |
| V | −0.457513 | 0.281702 | −0.518627 |
| V | −0.066987 | 0.619615 | 0.000000 |
| V | 0.144115 | 0.430984 | 0.314412 |
| V | 0.283494 | 0.359808 | 0.410437 |
| V | 0.457513 | 0.281702 | 0.518627 |
| V | 0.500000 | 0.100000 | 0.875000 |
| V | 0.000000 | 0.416506 | 0.375000 |
| V | 0.000000 | 0.200000 | 0.750000 |
| V | 0.145760 | 0.385045 | 0.190318 |
| V | 0.204208 | 0.344993 | 0.230302 |
| V | 0.268545 | 0.306361 | 0.267204 |
| V | 0.285127 | 0.204318 | 0.472237 |
| V | 0.092626 | 0.372722 | 0.251276 |
| V | 0.134845 | 0.223549 | 0.509412 |
| V | 0.000000 | 0.406691 | 0.162000 |
| V | 0.000000 | 0.380422 | 0.187500 |
| V | 0.000000 | 0.357617 | 0.207000 |
| V | 0.000000 | 0.272169 | 0.375000 |
| V | 0.000000 | 0.387639 | 0.225000 |
| V | 0.000000 | 0.257735 | 0.450000 |
| V | −0.145760 | 0.385045 | 0.190318 |
| V | −0.204208 | 0.344993 | 0.230302 |
| V | −0.268545 | 0.306361 | 0.267204 |
| V | −0.285127 | 0.204318 | 0.472237 |
| V | −0.092626 | 0.372722 | 0.251276 |
| V | −0.134845 | 0.223549 | 0.509412 |
| V | −0.144115 | 0.430984 | 0.314412 |
| V | −0.283494 | 0.359808 | 0.410437 |
| V | −0.457513 | 0.281702 | 0.518627 |
| V | −0.500000 | 0.100000 | 0.875000 |

Sub-template Table-17 (For a Solution to Schneiders' Open Problem Discussed with Reference to FIGS. 45A–49)

| | | | |
|---|---|---|---|
| V | 0.000000 | 0.000000 | 1.000000 |
| V | 0.000000 | 0.000000 | 0.000000 |
| V | 0.000000 | 0.000000 | −1.000000 |
| V | 0.000000 | 0.066667 | 0.916667 |
| V | 0.000000 | 0.066667 | 0.000000 |
| V | 0.000000 | 0.066667 | −0.916667 |
| V | 0.000000 | 1.000000 | 0.000000 |
| V | 0.000000 | 0.816506 | 0.000000 |
| V | −0.066988 | 0.803109 | 0.000000 |
| V | 0.000000 | 0.600000 | 0.375000 |
| V | 0.000000 | 0.611004 | 0.250000 |
| V | −0.080743 | 0.594856 | 0.255906 |
| V | −0.059715 | 0.591663 | 0.210058 |
| V | −0.044658 | 0.746410 | 0.000000 |
| V | 0.066988 | 0.803109 | 0.000000 |
| V | 0.044658 | 0.746410 | 0.000000 |
| V | 0.080743 | 0.594856 | 0.255906 |
| V | 0.058640 | 0.602716 | 0.195054 |
| V | 0.000000 | 0.600000 | −0.375000 |
| V | −0.080743 | 0.594856 | −0.255906 |
| V | 0.080743 | 0.594856 | −0.255906 |
| V | 0.000000 | 0.611004 | −0.250000 |
| V | −0.058640 | 0.602716 | −0.195054 |
| V | 0.058640 | 0.602716 | −0.195054 |
| V | −0.500000 | 0.500000 | 0.500000 |
| V | −0.500000 | 0.500000 | −0.500000 |
| V | 0.500000 | 0.500000 | −0.500000 |
| V | 0.500000 | 0.500000 | 0.500000 |
| V | −0.440192 | 0.481865 | 0.389175 |
| V | −0.333333 | 0.400000 | 0.583333 |
| V | −0.330480 | 0.417504 | 0.469489 |
| V | −0.333333 | 0.400000 | −0.583333 |
| V | −0.301772 | 0.442216 | −0.439552 |
| V | −0.440192 | 0.481865 | −0.389175 |
| V | 0.333333 | 0.400000 | −0.583333 |
| V | 0.377992 | 0.535406 | −0.324312 |
| V | 0.307216 | 0.448872 | −0.431321 |
| V | 0.333333 | 0.400000 | 0.583333 |
| V | 0.377992 | 0.535406 | 0.324312 |
| V | 0.307216 | 0.448872 | 0.431321 |
| V | 0.000000 | 0.333333 | −0.666667 |
| V | −0.013889 | 0.275000 | −0.711806 |
| V | 0.000000 | 0.333333 | 0.666667 |
| V | 0.000000 | 0.300000 | 0.687500 |
| V | −0.666667 | 0.333333 | 0.000000 |
| V | −0.542379 | 0.393906 | 0.000000 |
| V | 0.666667 | 0.333333 | 0.000000 |
| V | 0.533494 | 0.401555 | 0.000000 |

H 0 3 6 5 7 10 13 12
H 6 3 1 4 13 10 8 11
H 2 5 6 4 9 12 13 11
H 7 10 13 12 14 17 20 19
H 13 10 8 11 20 17 15 18
H 9 12 13 11 16 19 20 18
H 14 17 20 19 21 24 27 26
H 20 17 15 18 27 24 22 25
H 16 19 20 18 23 26 27 25
H 21 24 27 26 28 31 34 33
H 27 24 22 25 34 31 29 32
H 23 26 27 25 30 33 34 32
H 38 36 35 37 42 40 39 41
H 36 2 4 35 40 9 11 39
H 37 35 84 86 41 39 90 92
H 35 4 1 84 39 11 8 90
H 42 40 39 41 46 44 43 45
H 40 9 11 39 44 16 18 43
H 41 39 90 92 45 43 96 98
H 39 11 8 90 43 18 15 96
H 46 44 43 45 50 48 47 49
H 44 16 18 43 48 23 25 47
H 45 43 96 98 49 47 102 104
H 43 18 15 96 47 25 22 102
H 50 48 47 49 38 52 51 37
H 48 23 25 47 52 30 32 51
H 49 47 102 104 37 51 108 86
H 47 25 22 102 51 32 29 108
H 86 92 98 104 37 41 45 49
H 37 41 45 49 38 42 46 50
H 42 40 61 60 38 36 55 54
H 40 9 12 61 36 2 5 55
H 60 61 12 7 54 55 5 0
H 42 60 59 64 38 54 53 58
H 59 60 7 62 53 54 0 56
H 64 59 62 63 58 53 56 57
H 46 44 67 66 42 40 61 60
H 44 16 19 67 40 9 12 61
H 66 67 19 14 60 61 12 7
H 46 66 65 70 42 60 59 64
H 65 66 14 68 59 60 7 62
H 70 65 68 69 64 59 62 63
H 50 48 73 72 46 44 67 66
H 48 23 26 73 44 16 19 67
H 72 73 26 21 66 67 19 14
H 50 72 71 76 46 66 65 70
H 71 72 21 74 65 66 14 68
H 76 71 74 75 70 65 68 69
H 38 52 79 78 50 48 73 72
H 52 30 33 79 48 23 26 73
H 78 79 33 28 72 73 26 21
H 38 78 77 58 50 72 71 76
H 77 78 28 80 71 72 21 74
H 58 77 80 57 76 71 74 75
H 58 64 70 76 57 63 69 75
H 38 42 46 50 58 64 70 76
H 86 84 83 82 92 90 89 88
H 84 1 3 83 90 8 10 89
H 82 83 3 0 88 89 10 7
H 86 82 81 85 92 88 87 91
H 81 82 0 56 87 88 7 62
H 85 81 56 57 91 87 62 63
H 92 90 89 88 98 96 95 94
H 90 8 10 89 96 15 17 95
H 88 89 10 7 94 95 17 14
H 92 88 87 91 98 94 93 97
H 87 88 7 62 93 94 14 68
H 91 87 62 63 97 93 68 69
H 98 96 95 94 104 102 101 100
H 96 15 17 95 102 22 24 101
H 94 95 17 14 100 101 24 21
H 98 94 93 97 104 100 99 103
H 93 94 14 68 99 100 21 74
H 97 93 68 69 103 99 74 75
H 104 102 101 100 86 108 107 106
H 102 22 24 101 108 29 31 107
H 100 101 24 21 106 107 31 28
H 104 100 99 103 86 106 105 85
H 99 100 21 74 105 106 28 80
H 103 99 74 75 85 105 80 57
H 57 63 69 75 85 91 97 103
H 85 91 97 103 86 92 98 104
H 52 38 36 114 51 37 35 113
H 51 37 35 113 108 86 84 112
H 30 52 114 111 32 51 113 110
H 32 51 113 110 29 108 112 109
H 111 114 36 2 110 113 35 4
H 110 113 35 4 109 112 84 1
H 105 80 57 85 121 122 116 119
H 106 28 80 105 120 117 122 121
H 106 105 85 86 120 121 119 118
H 120 121 119 118 117 122 116 115
H 85 57 56 81 119 116 124 126
H 81 56 0 82 126 124 123 125
H 86 85 81 82 118 119 126 125
H 118 119 126 125 115 116 124 123
H 80 28 78 77 122 117 128 131
H 57 80 77 58 116 122 131 130
H 58 77 78 38 130 131 128 127
H 116 122 131 130 115 117 128 127
H 56 57 58 53 124 116 130 132
H 0 56 53 54 123 124 132 129

-continued

Sub-template Table-17 (For a Solution to
Schneiders' Open Problem Discussed with
Reference to FIGS. 45A–49)

H 53 58 38 54 132 130 127 129
H 124 116 130 132 123 115 127 129
H 107 31 28 106 139 137 117 120
H 108 107 106 86 138 139 120 118
H 29 31 107 108 133 137 139 138
H 139 137 117 120 138 133 115 118
H 79 52 38 78 141 140 127 128
H 33 79 78 28 142 141 128 117
H 30 52 79 33 134 140 141 142
H 142 141 128 117 134 140 127 115
H 38 36 55 54 127 143 145 129
H 54 55 5 0 129 145 144 123
H 55 36 2 5 145 143 135 144
H 123 129 145 144 115 127 143 135
H 82 0 3 83 125 123 147 148
H 86 82 83 84 118 125 148 146
H 84 83 3 1 146 148 147 136
H 125 123 147 148 118 115 136 146
H 52 114 36 38 140 150 143 127
H 140 150 143 127 134 149 135 115
H 150 114 36 143 149 111 2 135
H 140 52 114 150 134 30 111 149
H 108 86 84 112 138 118 146 152
H 109 112 84 1 151 152 146 136
H 29 108 112 109 133 138 152 151
H 138 118 146 152 133 115 136 151
H 34 33 28 31 154 142 117 137
H 32 30 33 34 153 134 142 154
H 29 32 34 31 133 153 154 137
H 3 0 5 6 147 123 144 156
H 6 5 2 4 156 144 135 155
H 3 6 4 1 147 156 155 136
H 147 123 144 156 136 115 135 155
H 154 142 117 137 153 134 115 133

Figure 57:
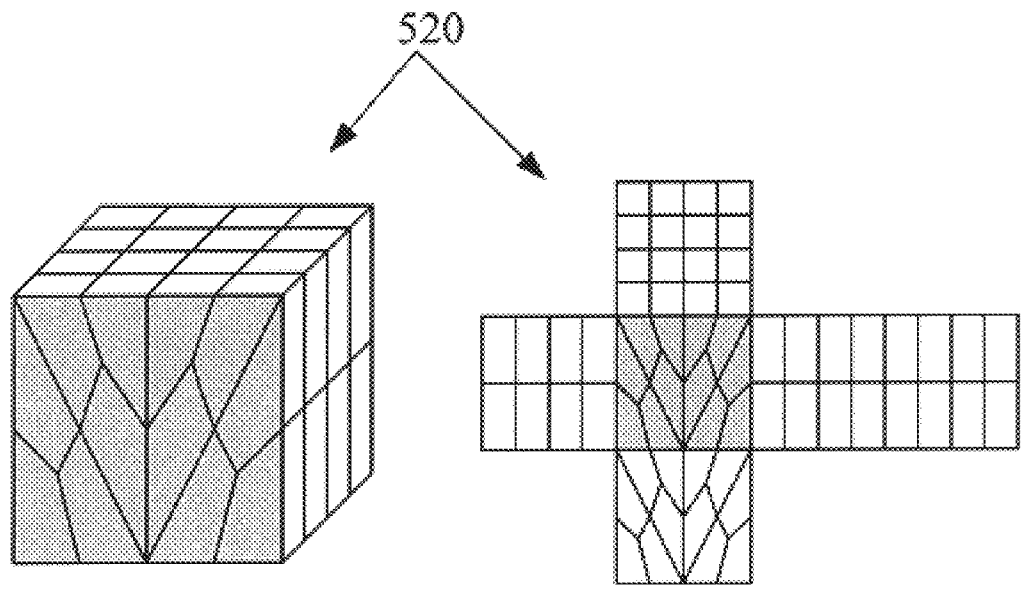
FIG. 57 shows an exemplary all-hex template generated for a hex element using the program given in FIGS. 56A–56K.

FIGS. 56A–56K provide some exemplary program instructions that assemble an all-hex template from a core and caps. The program is written in standard C++ language and is compiled and tested using Microsoft® Visual C++ 6.0 under Windows® 2000. The program given in FIGS. 56A–56K takes five parameters to assemble an all-hex template for a hex element, or four parameters for an all-hex template for a prism element. The first parameter specifies a data file of a core, and other parameters specify caps (four caps for a hex element, and three caps for a prism element as discussed hereinbefore). The output generated by the program is written to a file referred to as 'hexhoop.dat'. FIG. 57 shows an exemplary all-hex template 520 generated for a hex element using the program given in FIGS. 56A–56K. The following command may be executed by the program in FIGS. 56A–56K to output the template 520 shown in FIG. 57:

assemble core_4x2.dat structured4x4.dat triangle4x4.dat triangle2x4.dat structured2x4.

Figure 58:
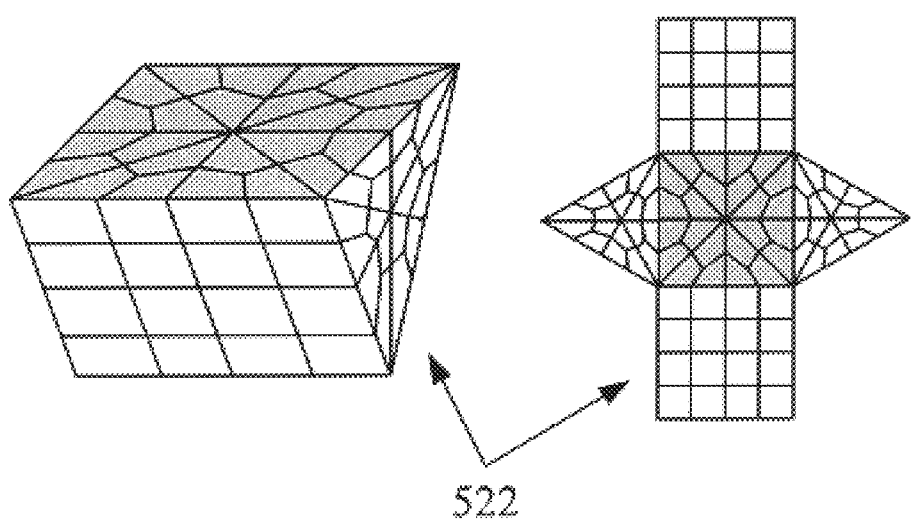
FIG. 58 shows an exemplary all-hex template generated for a prism element using the program given in FIGS. 56A–56K.

FIG. 58 shows an exemplary all-hex template 522 generated for a prism element using the program given in FIGS. 56A–56K. The following command may be executed by the program in FIGS. 56A–56K to output the template 522 shown in FIG. 58:

assemble core_4xprism.dat triangle4x4.dat structured4x4.dat structured4x4.dat

Figure 1:
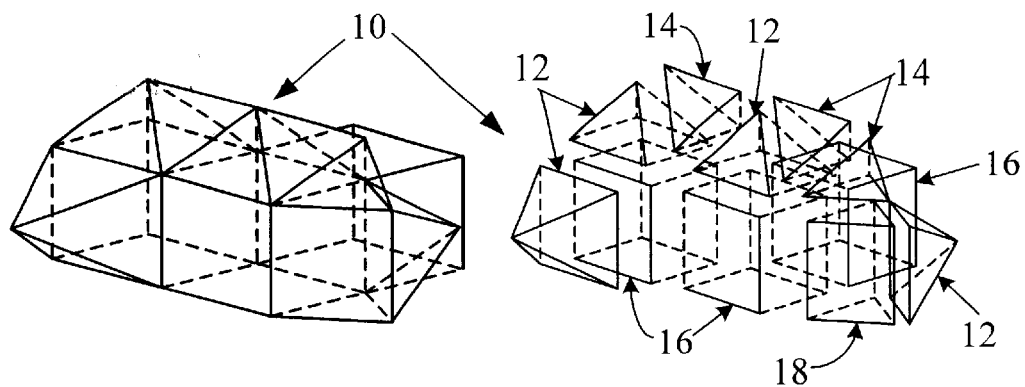
FIG. 1 shows a prior art hex-dominant mesh and its constituent elements.
Figure 2:
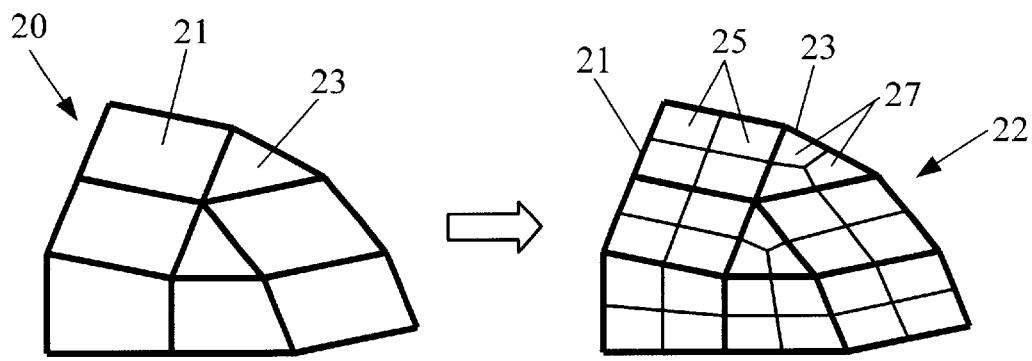
FIG. 2 illustrates a prior art conversion of a quad-dominant mesh into an all-quad mesh.
Figure 3:
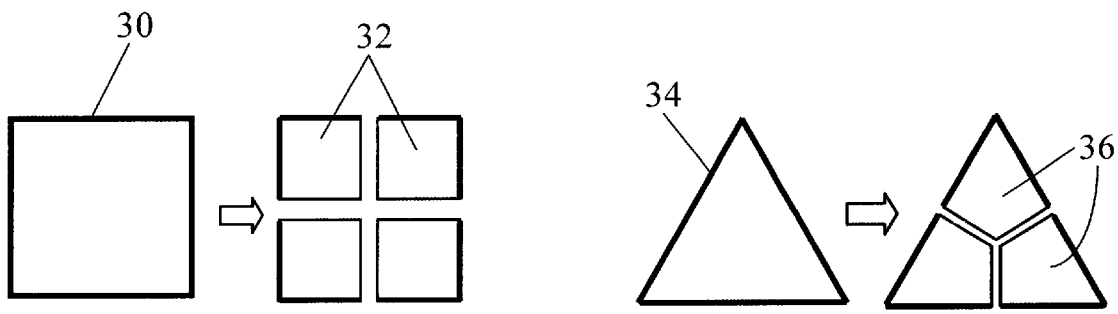
FIG. 3 illustrates two types of known templates for converting a quad-dominant mesh into an all-quad mesh.
Figure 4:
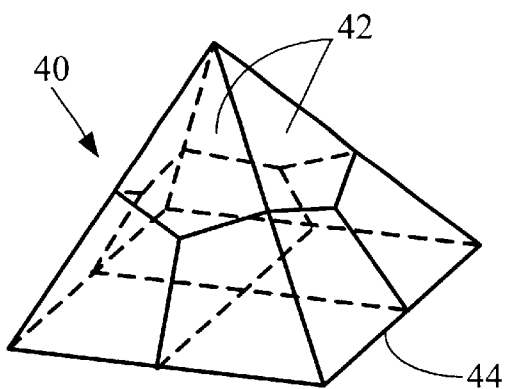
FIG. 4 shows a prior art pyramid element with four triangular faces and one quadrilateral face (not visible) at the bottom of the pyramid.
Figure 5:
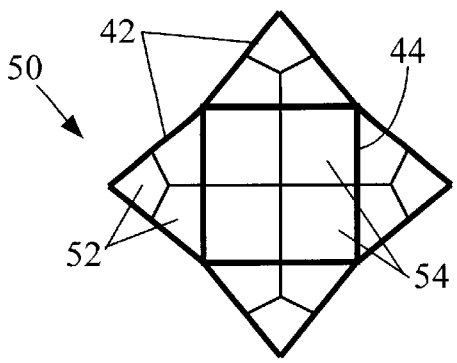
FIG. 5 illustrates a layout depicting the prior art all-quad division of the faces of the pyramid in FIG. 4.
Figure 6:
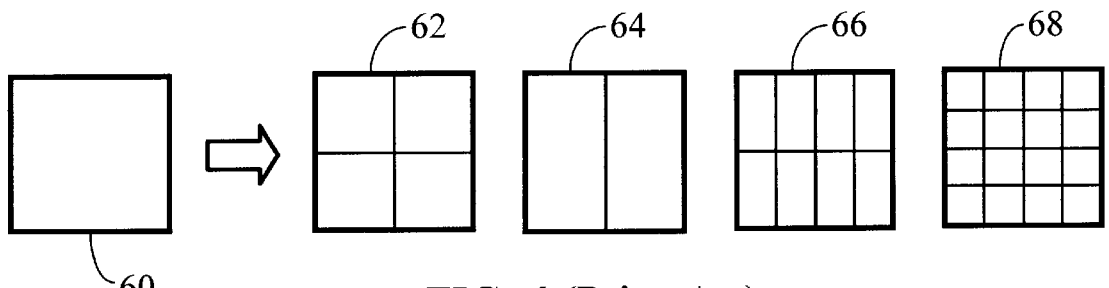
FIG. 6 illustrates some prior art examples of how a quadrilateral face of a pyramid is split into rectangular patterns.
Figure 59:
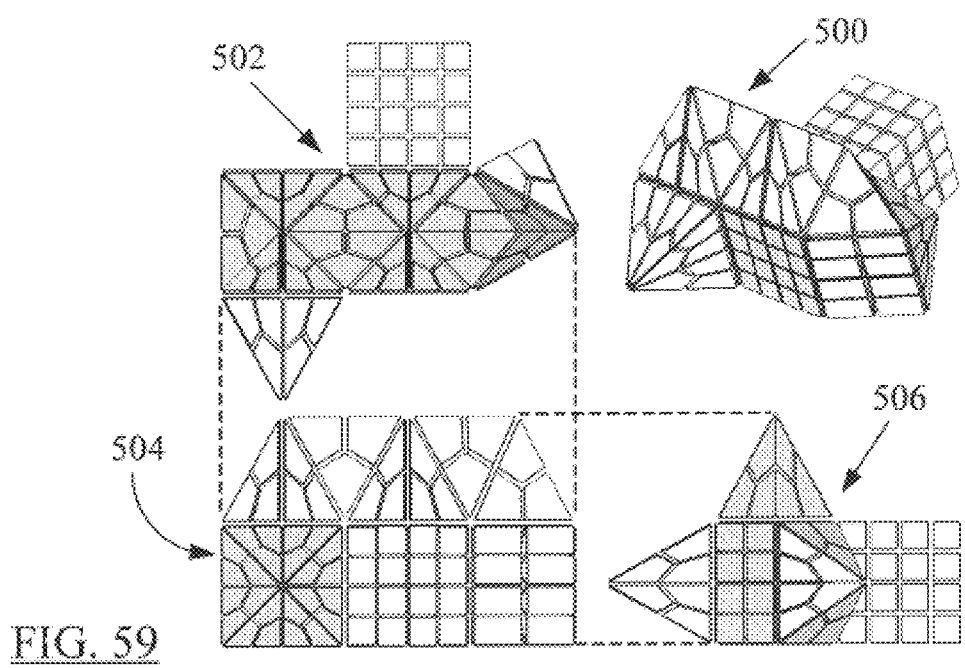
FIG. 59 shows an all-hex mesh generated according to the present invention using the hex-dominant mesh shown in FIG. 1 as the input.
Figure 60:
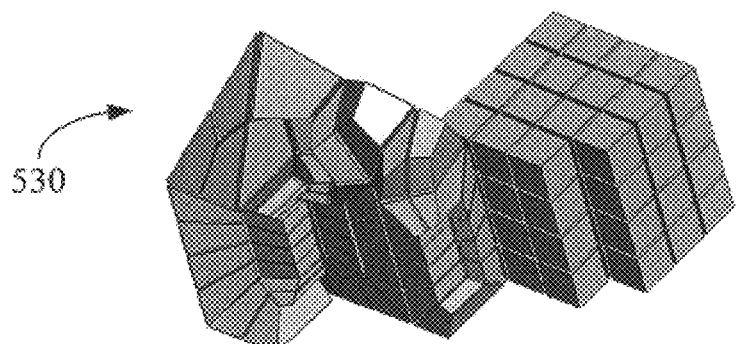
FIG. 60 shows a cross-sectional view of the all-hex mesh in FIG. 59.
Figure 61:
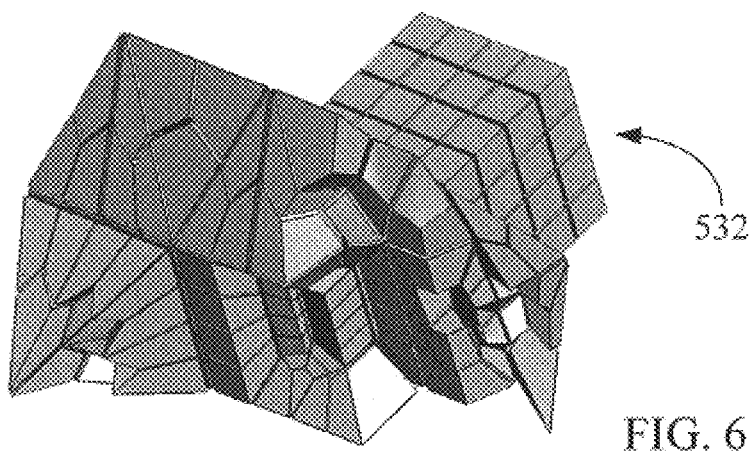
FIG. 61 shows another cross-sectional view of the all-hex mesh in FIG. 59.

FIG. 59 shows an all-hex mesh 500 generated according to the present invention using the hex-dominant mesh 10 shown in FIG. 1 as the input. The all-hex mesh 500 contains 542 hexes, whereas the input hex-dominant mesh 10 contains 3 hexes, 1 prism, 4 pyramids, and 3 tets as noted hereinbefore. A top view 502, a front view 504, and a side view 506 of the 3D view 500 are also shown in FIG. 59. FIG. 60 shows a cross-sectional view 530 of the all-hex mesh 500 in FIG. 59. And, FIG. 61 shows another cross-sectional view 532 of the all-hex mesh 500 in FIG. 59.

Figures 62, 63:
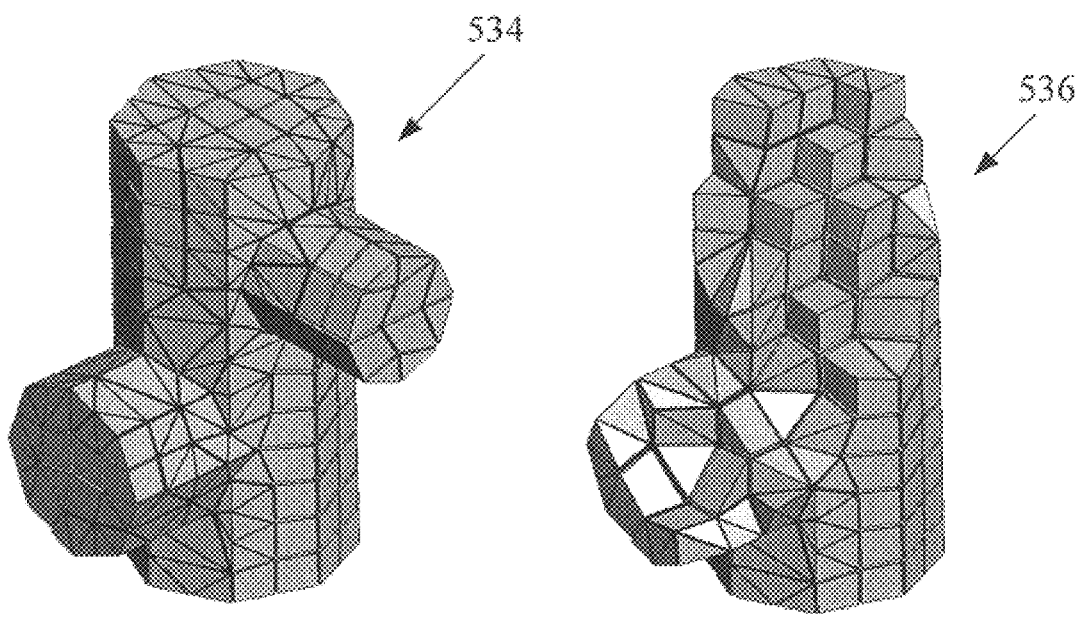
FIG. 62 depicts a hex-dominant mesh of an object consisting of three circular bars.
FIG. 63 shows a cross-sectional view of the hex-dominant mesh in FIG. 62.
Figures 64, 65:
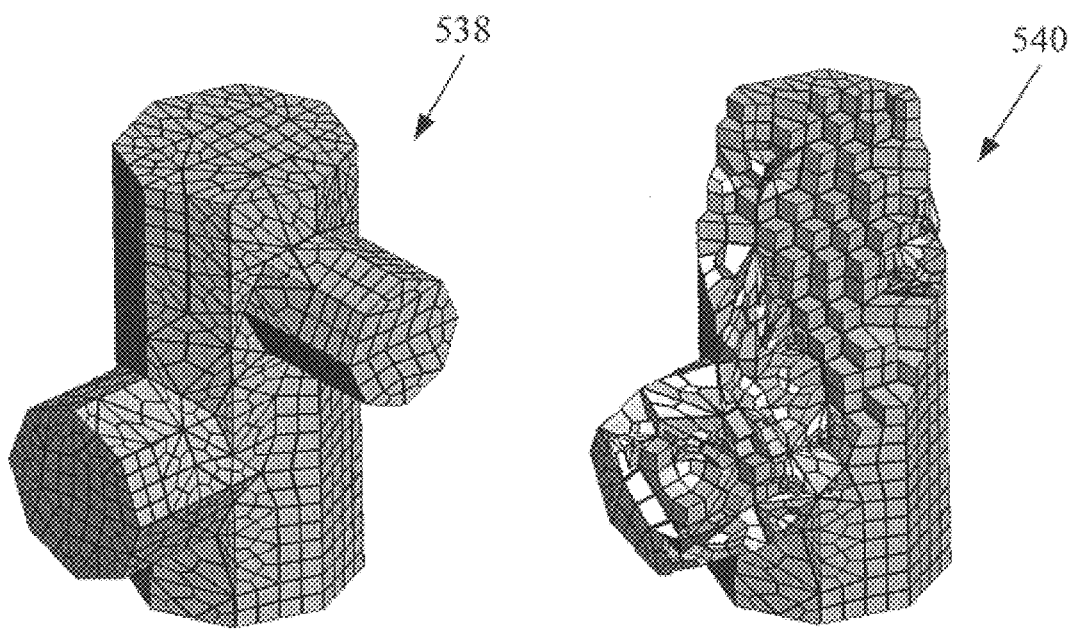
FIG. 64 illustrates an all-hex mesh generated according to the present invention using he hex-dominant mesh in FIG. 62 as the input.
FIG. 65 shows a cross-sectional view of the all-hex mesh illustrated in FIG. 64.

FIG. 62 depicts a hex-dominant mesh 534 of an object consisting of three circular bars. The hex-dominant mesh 534 contains 93 hexes, 127 prisms, 127 pyramids and 417 tets. FIG. 63 shows a cross-sectional view 536 of the hex-dominant mesh 534 in FIG. 62. FIG. 64 illustrates an all-hex mesh 538 generated according to the present invention using the hex-dominant mesh 534 in FIG. 62 as the input. The all-hex mesh 538 in FIG. 64 contains 14974 hexes. FIG. 65 shows a cross-sectional view 540 of the all-hex mesh 538 illustrated in FIG. 64.

Figure 66:
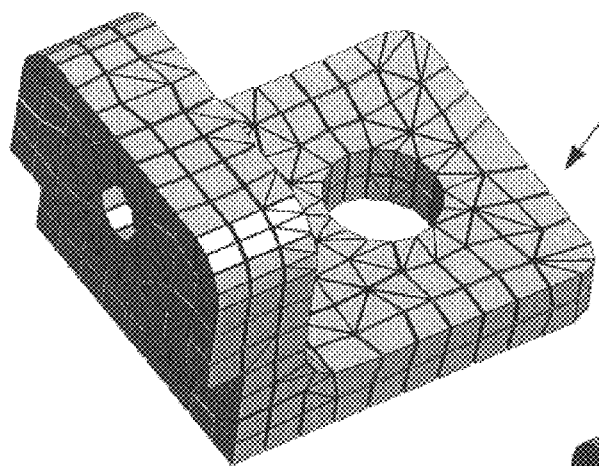
FIG. 66 depicts a hex-dominant mesh of a mechanical part.
Figure 67:
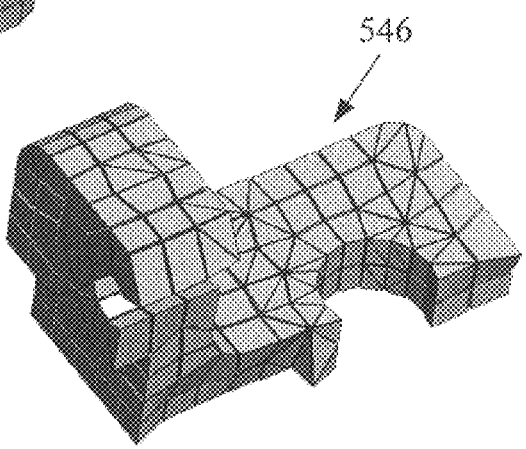
FIG. 67 shows a cross-sectional view of the hex-dominant mesh in FIG. 66.
Figure 68:
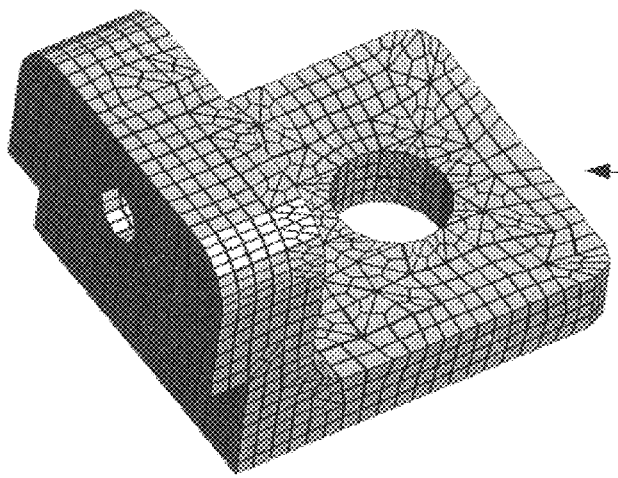
FIG. 68 illustrates an all-hex mesh generated according to the present invention using the hex-dominant mesh in FIG. 66 as the input.
Figure 69:
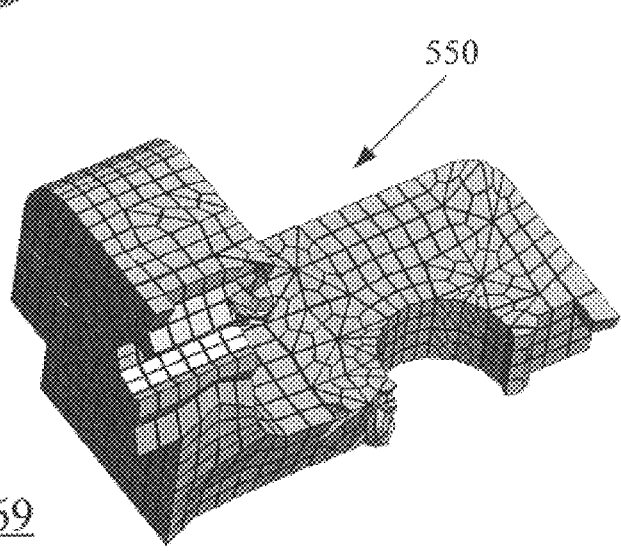
FIG. 69 shows a cross-sectional view of the all-hex mesh illustrated in FIG. 68.

FIG. 66 depicts a hex-dominant mesh 544 of a mechanical part. The hex-dominant mesh 544 contains 162 hexes, 137 prisms, 113 pyramids and 402 tets. FIG. 67 shows a cross-sectional view 546 of the hex-dominant mesh 544 in FIG. 66. FIG. 68 illustrates an all-hex mesh 548 generated according to the present invention using the hex-dominant mesh 544 in FIG. 66 as the input. The all-hex mesh 548 in FIG. 68 contains 17060 hexes. FIG. 69 shows a cross-sectional view 550 of the all-hex mesh 548 illustrated in FIG. 68.

Figure 8:
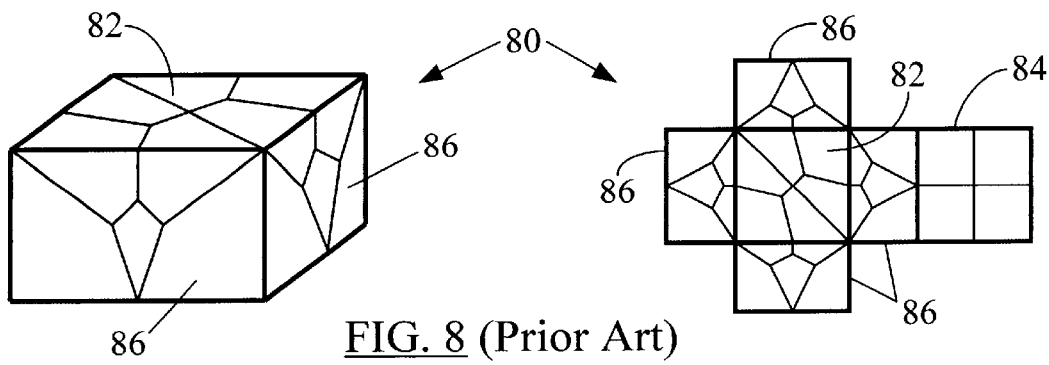
FIG. 8 illustrates the prior art Geode template.

It is noted that Mitchell's Geode template (discussed earlier hereinbefore with reference to FIG. 8) has one face that has a rectangular pattern, one face that has a pattern suitable to connect a diced pyramid element, and four faces that have an irregular pattern; and this combination cannot be changed. On the other hand, the combination of rectangular and triangular patterns on the faces of an all-hex template according to the present invention can be specified arbitrarily. Furthermore, the hexahedral elements used in the construction of an all-hex template according to the present invention are better shaped than the ones used in the Geode template. In the all-hex conversion method of the present invention, most of the interior quadrilaterals are lying on a plane. Finally, the all-hex conversion methodology of the present invention is applicable to any hex-dominant mesh created by various meshing algorithms presently available. In contrast, a condition of the Geode template is that a layer of Geode be inserted while creating a hex-dominant mesh, which is possible only when using the advancing front algorithm or its variation.

The foregoing describes a modular approach to designing all-hex mesh conversion templates where triangular and rectangular subdivision patterns may arbitrarily be combined on the exterior faces of the templates. The templates can be created for any arbitrary-shaped, complex geometric domain. The all-hex conversion software according to the present invention take as input any type of a hex-dominant mesh and converts it to an all-hex mesh automatically. An all-hex template according to the present invention is not a single specific template. Instead, it is a family of modular sub-templates. These sub-templates can be assembled to form all-hex conversion templates for hexes, pyramids, and prisms. There are two types of modular sub-templates, called a core and a cap. For a hex or prism element, one core is defined, which specifies the subdivision patterns of two faces of the input hex or prism. Then four caps are defined for a hex and three caps for a prism to specify the subdivision patterns of the other faces. One can mix and combine two subdivision patterns, rectangular and triangular, freely on the exterior surfaces of a hex, prism, and a pyramid. The all-hex conversion process according to the present invention is suitable for parallel implementation (e.g., two or more sub-templates may be generated in parallel), allowing faster processing and independence from memory size restrictions.

The methodology of the present invention may be used in mesh generation for finite element analysis in any engineering field and also in other applications using 3D meshes, such as, for example, volume rendering in computer graphics. Using an all-hex template of the present invention, a hexahedral element or a prism element that has one or more adjacent pyramid elements can be subdivided or diced during the conversion of a hex-dominant mesh into an all-hex mesh without losing the conformity of a mesh. The all-hex template can also be used to dice a pyramid element in such a way that the bottom quadrilateral face of the pyramid is subdivided into a rectangular pattern. In either way, a hex-dominant mesh is converted into an all-hex mesh successfully without losing the mesh conformity. The patterns of quadrilateral faces of a diced hexahedral/prism element can be chosen arbitrarily. Thus, the methodology of the present invention can be applied to any hex-dominant mesh created by various hex-dominant meshing methods presently available. Furthermore, the all-hex conversion software according to the present invention allows easy detection if any all-hex templates are used or not. In other words, if an all-hex mesh is created using the conversion software of the present invention, then one can easily detect the all-hex templates by parsing the mesh. Such a parser can be implemented as a computer program.

It is noted that because the all-hex template according to the present invention dices a mesh element into a set of smaller hexes, one may need to apply a post-process, such as Laplacian smoothing or optimization-based smoothing, to equidistribute the element sizes. Such a smoothing process is commonly used in most commercial meshers. The optimization-based smoothing is described in Patrick M. Knupp, "Hexahedral Mesh Untangling & Algebraic Mesh Quality Metrics", Proceedings of 9th International Meshing Roundtable, 2000, pp. 173–183, the disclosure of which is incorporated herein by reference in its entirety.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method to convert a hexahedral-dominant (hex-dominant) mesh structure into an all-hexahedral (all-hex) mesh structure, wherein said hex-dominant mesh structure includes at least one of the following constituent elements: one or more hexahedral elements, one or more prism elements, one or more pyramid elements, and one or more tetrahedral elements, said method comprising:

identifying a template shape corresponding to each constituent element in said hex-dominant mesh structure, wherein each said template shape has the same number of external surfaces as in the corresponding constituent element;

modularly constructing a plurality of sub-templates corresponding to each said template shape identified, wherein all sub-templates in said plurality of sub-templates, when assembled, produce a corresponding template shape identified, wherein each of said plurality of sub-templates is constituted of a plurality of hexahedral elements and supplies at least one of the external surfaces for the corresponding template shape, and wherein said at least one of the external surfaces supplied by each of said plurality of sub-templates has a subdivision pattern selected from the group consisting of a rectangular subdivision pattern and a triangular subdivision pattern;

assembling all sub-templates in said plurality of sub-templates to compose said corresponding template shape; and combining all template shapes composed by assembling corresponding sub-templates in the shape of said hex-dominant mesh structure, thereby generating said all-hex mesh structure for said hex-dominant mesh structure.

2. The method of claim 1, wherein identifying said template shape includes selecting said template shape having the same shape as that of the corresponding constituent element.

3. The method of claim 1, further comprising performing a smoothing operation onto said all-hex mesh structure generated by combining said template shapes.

4. The method of claim 1, wherein modularly constructing said plurality of sub-templates includes:

constructing a corresponding core for each said template shape; and constructing one or more corresponding caps for each said template shape.

5. The method of claim 4, wherein constructing said corresponding core includes:

creating two wing faces of said corresponding core using two of said plurality of hexahedral elements;

creating one or more slots between said two wing faces; and applying said subdivision pattern to at least one of said two wing faces.

6. The method of claim 4, wherein constructing said one or more corresponding caps for each said template shape includes performing the following for each of said one or more corresponding caps to be constructed:

creating a multi-element all-hex mesh using a subset of said plurality of hexahedral elements, wherein two hexahedral elements in said subset of said plurality of hexahedral elements form a first end and a second end respectively of said multi-element all-hex mesh;

subdividing a first top face of said first end into said subdivision pattern;

marching said subdivision pattern on said first top face through each hexahedral element in said subset of said plurality of hexahedral elements until a second top face of said second end is reached;

joining corners of said first and said second ends in such a manner as to make said first and said second top faces co-planar; and filling a volumetric region created within said multi-element all-hex mesh upon joining said corners of said first and said second ends with one or more of said plurality of hexahedral elements.

7. The method of claim 6, further comprising applying a deformation to said multi-element all-hex mesh after filling said volumetric region.

8. The method of claim 6, wherein joining said corners of said first and said second ends includes joining said corners of said first and said second ends without creating an overlap between said first and said second top faces.

9. The method of claim 4, wherein assembling all sub-templates in said plurality of sub-templates includes:
  generating a respective first set of nodes on each predetermined location on the outer surface of said corresponding core;
  generating a respective second set of nodes on each bottom face of each of said one or more corresponding caps;
  generating a respective third set of nodes on each front face of each of said one or more corresponding caps;
  generating a respective fourth set of nodes on each back face of each of said one or more corresponding caps;
  ordering all of said first, second, third, and fourth sets of nodes according to a predetermined order;
  orienting each of said one or more corresponding caps so as to fit into a respective predetermined location on the outer surface of said corresponding core;
  placing each of said one or more corresponding caps into said respective predetermined location; and
  for each of said one or more corresponding caps, joining said second set of nodes to said first set of nodes on said respective predetermined location and further joining said third and fourth sets of nodes to said fourth and third sets of nodes respectively on two adjacent caps, thereby placing said one or more corresponding caps in a hoop configuration around said corresponding core.

10. The method of claim 1, wherein modularly constructing said plurality of sub-templates includes performing construction of at least two of said plurality of sub-templates in parallel.

11. A method to convert a hexahedral-dominant (hex-dominant) mesh structure into an all-hexahedral (all-hex) mesh structure, wherein said hex-dominant mesh structure includes at least one of the following constituent elements: one or more hexahedral elements, one or more prism elements, one or more pyramid elements, and one or more tetrahedral elements, said method comprising:
  identifying a template shape corresponding to each constituent element in said hex-dominant mesh structure, wherein each said template shape has the same number of external surfaces as in the corresponding constituent and has the same shape as that of the corresponding constituent element;
  modularly constructing a plurality of sub-templates corresponding to each said template shape identified, wherein all sub-templates in said plurality of sub-templates, when assembled, produce a corresponding template shape identified, wherein each of said plurality of sub-templates is constituted of a plurality of hexahedral elements, and wherein each external surface for the corresponding template shape is supplied by one of said plurality of sub-templates and has a subdivision pattern selected from the group consisting of a rectangular subdivision pattern and a triangular subdivision pattern;
  assembling all sub-templates in said plurality of sub-templates to compose said corresponding template shape; and
  combining all template shapes composed by assembling corresponding sub-templates in the shape of said hex-dominant mesh structure, thereby generating said all-hex mesh structure for said hex-dominant mesh structure.

12. In a system for converting a hexahedral-dominant (hex-dominant) mesh structure into an all-hexahedral (all-hex mesh) structure, wherein said hex-dominant mesh structure includes at least one of the following constituent elements: one or more hexahedral elements, one or more prism elements, one or more pyramid elements, and one or more tetrahedral elements, a plurality of sub-templates for a template shape for a constituent element in said hex-dominant mesh structure, wherein all sub-templates in said plurality of sub-templates, when assembled, produce said template shape, said plurality of sub-templates comprises:
  a core for said template shape that supplies at least one of the external surfaces for the template shape, wherein said at least one of the external surfaces having a subdivision pattern selected from the group consisting of a rectangular subdivision pattern and a triangular subdivision pattern, wherein said core is constituted of a first plurality of hexahedral elements, and wherein said core is constructed by:
    creating two wing faces using two of said first plurality of hexahedral elements,
    creating one or more slots between said two wing faces, and
    applying said subdivision pattern to at least one of said two wing faces; and
  one or more caps for said template shape, wherein each cap supplies said at least one of the external surfaces for the template shape, wherein said at least one of the external surfaces having said subdivision pattern thereon, wherein each cap is constituted of a second plurality of hexahedral elements, and wherein said each cap is constructed by:
    creating a multi-element all-hex mesh using a subset of said second plurality of hexahedral elements, wherein two hexahedral elements in said subset of said second plurality of hexahedral elements form a first end and a second end respectively of said multi-element all-hex mesh,
    subdividing a first top face of said first end into said subdivision pattern,
    marching said subdivision pattern on said first top face through each hexahedral element in said subset of said second plurality of hexahedral elements until a second top face of said second end is reached,
    joining corners of said first and said second ends in such a manner as to make said first and said second top faces co-planar, and
    filling a volumetric region created within said multi-element all-hex mesh upon joining said corners of said first and said second ends with one or more of said second plurality of hexahedral elements.

* * * * *